US005805858A

United States Patent [19]
Kumamoto et al.

[11] Patent Number: 5,805,858
[45] Date of Patent: *Sep. 8, 1998

[54] APPARATUS AND METHOD OF AUTOMATICALLY CREATING SUPPLEMENTAL SEGMENT IN TWO-DIMENSIONAL DRAWINGS, AND CAD/CAM SYSTEM HAVING FUNCTION OF AUTOMATICALLY CREATING SUPPLEMENTAL SEGMENT IN TWO-DIMENSIONAL DRAWINGS

[75] Inventors: Hiroshi Kumamoto, Osaka; Koki Imai, Takatsuki, both of Japan

[73] Assignee: Omron Corporation, Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 429,178

[22] Filed: Apr. 26, 1995

[30] Foreign Application Priority Data

Apr. 28, 1994 [JP] Japan .................................. 6-111719

[51] Int. Cl.$^6$ ................................................. G06T 17/40
[52] U.S. Cl. ............................................ 395/500; 345/441
[58] Field of Search ...................... 395/500, 119, 395/141, 143, 120, 124; 364/522, 578, 512; 345/441, 423, 433, 426

[56] References Cited

U.S. PATENT DOCUMENTS

| | | | |
|---|---|---|---|
| 5,010,502 | 4/1991 | Diebel et al. | 364/522 |
| 5,101,475 | 3/1992 | Kaufman et al. | 395/124 |
| 5,428,715 | 6/1995 | Suzuki | 395/119 |
| 5,467,293 | 11/1995 | Summer et al. | 364/578 |
| 5,561,748 | 10/1996 | Niu et al. | 395/120 |

FOREIGN PATENT DOCUMENTS

| | | | |
|---|---|---|---|
| 63-140373 | 6/1968 | Japan | G06F 15/60 |
| 6-52264 | 2/1994 | Japan | G06F 15/60 |

OTHER PUBLICATIONS

Tomiyama et al., "Auxiliary Lines in Three View Drawings," IEEE Int. Conf. on Sys. Eng., Sep. 17–19, 1992, pp. 250–256.

Kitajima et al., "Reconstruction of CSG Solid," IEEE Int. Conf. on Sys. Eng., Sep. 17–19, 1992, pp. 220–224.

*Primary Examiner*—Kevin J. Teska
*Assistant Examiner*—Matthew Clay Loppnow
*Attorney, Agent, or Firm*—Dickstein Shapiro Morin & Oshinsky LLP

[57] ABSTRACT

The present invention is directed to an apparatus for and a method of automatically creating a supplemental segment in two-dimensional drawings. Two-dimensional drawing data concerning at least three views depicted based on orthogonal projection is previously stored in a drawing data storage device. Knowledge for recognizing three-dimensional solid model restored on the basis of the two-dimensional drawing data is previously stored in a knowledge storage device. The knowledge stored in the knowledge storage device is applied to the two-dimensional drawing data stored in the drawing data storage device, so that the three-dimensional solid model restored on the basis of the two-dimensional drawing data is recognized. An area where the supplemental segment is to be created is determined in the two-dimensional drawings on the basis of the recognized three-dimensional solid model. At least two end points of the supplemental segment to be created are determined in the determined area. The supplemental segment connecting the determined end points is finally created.

22 Claims, 37 Drawing Sheets

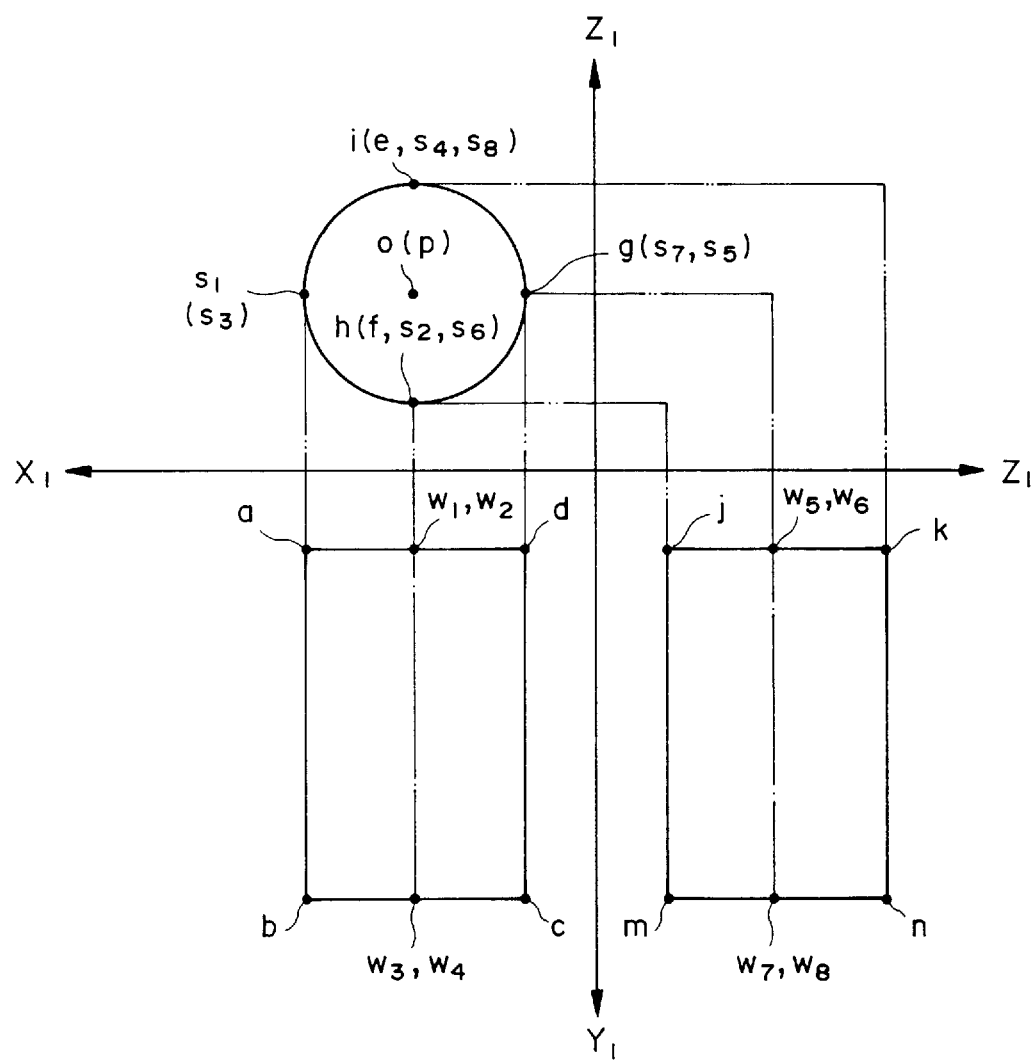

Fig.24a

| |
|---|
| KIND OF VIEW (FRONT, SIDE, TOP VIEWS) |
| NUMBER OF CURVED LINE SEGMENTS |
| NUMBER OF PRIMITIVES (LINE SEGMENT) |
| SIZE OF MINIMUM PRIMITIIVE |
| SIZE OF MAXIMUM PRIMITIIVE |
| MINIMUM DISTANCE BETWEEN PRIMITIVES |

Fig.24b

| SIDE VIEW |
|---|
| 0 |
| 11 |
| 20 |
| 160 |
| 20 |

Fig. 24c

| | AUXILIARY KNOWLEDGE FEATURE DATA 1 | AUXILIARY KNOWLEDE FEATURE DATA 2 | ... |
|---|---|---|---|
| NUMBER OF CURVED LINE SEGMENT | 0.8 | 0.2 | ... |
| NUMBER OF PRIMITIVES | 0.5 | 0.3 | ... |
| SIZE OF MINIMUM PRIMITIVE | 0.7 | 0.5 | ... |
| SIZE OF MAXIMUM PRIMITIVE | 0.3 | 0.6 | ... |
| MINIMUM DISTANCE BETWEEN PRIMITIVES | 0.9 | 0.4 | ... |
| AVERAGE VALUE | 0.64 | 0.4 | ... |

APPARATUS AND METHOD OF AUTOMATICALLY CREATING SUPPLEMENTAL SEGMENT IN TWO-DIMENSIONAL DRAWINGS, AND CAD/CAM SYSTEM HAVING FUNCTION OF AUTOMATICALLY CREATING SUPPLEMENTAL SEGMENT IN TWO-DIMENSIONAL DRAWINGS

BACKGROUND OF THE INVENTION

1. Field of the Invention

The present invention relates to an apparatus for and a method of automatically creating a supplemental segment in two-dimensional engineering drawings, and a CAD/CAM system having a function of automatically creating a supplemental segment in two-dimensional engineering drawings.

The two-dimensional drawings include a front view (an x - y plane view), a top view (a z - x plane view) and a right side view (a y - z plane view) (the three views are hereinafter referred to as "a set of three orthographic views" or simply "three views"), a left side view (a y - z plane view), a bottom view (a z - x plane view) and a rear view (an x - y plane view).

Examples of the supplemental (line) segment include a boundary (line) segment representing a portion where faces are smoothly connected (are continuous in the first differential, i.e., smooth connection), and a silhouette (line) segment representing a silhouette appears when a solid of revolution (a circular cylinder, a circular cone, a torus, a sphere or the like) is projected on the set of three orthographic views.

Examples of the CAD/CAM system include a system comprising only one of a CAD (Computer Aided Design) system and a CAM (Computer Aided Manufacturing) system, and a system comprising both the systems.

2. Description of the Background Art

When products and the like are designed by a CAD/CAM system or the like, an object to be designed is generally represented by a set of three orthographic views, that is, a front view, a top view and a side view, and two-dimensional drawing data concerning the set of three orthographic views is produced by a CAD system. A three-dimensional solid model is restored on the basis of the two-dimensional drawing data.

Examples of a method of restoring the three-dimensional solid model from the two-dimensional drawing data include one described in Japanese Patent Application Laid-Open (Kokai) No. 6-52264. In the restoring method, vertexes of a solid are created from corresponding points in the set of three orthographic views. An edge connecting the vertexes is then created. A candidate face is further created in an area enclosed by the edge, and it is judged whether the candidate face is true or false. A three-dimensional solid model is created by the combination of candidate faces which are judged to be true.

In order to restore an accurate three-dimensional solid model, a supplemental segment (a boundary segment and a silhouette segment) must be inputted in addition to a (line) segment constituting the contours of a solid and a segment corresponding to an edge of a solid whose faces are connected. When the supplemental segment is not inputted, the three-dimensional solid model cannot be restored from the set of three orthographic views. Even if the three-dimensional solid model can be restored, the restored three-dimensional solid model may be inaccurate in many cases.

The supplemental segment is also useful for the purpose of facilitating the understanding of two-dimensional drawings (the set of three orthographic views) produced on the basis of the three-dimensional solid model and representing a curved face which cannot be represented by the conventional drawing practice (using a solid line and a broken line).

Thus, supplemental segments are one or more segments which are added to a computer generated three dimensional solid model, which is otherwise formed of computer generated segments representing the contours of a solid and/or an edge of a solid whose faces are connected, which are used to accurately restore and/or better visually depict the three-dimensional solid model from the set of three orthographic views.

Consequently, a user (a person who inputs the set of three orthographic views) must accurately judge a portion where faces are smoothly connected and a portion of a silhouette of a curved face and input the supplemental segment when he or she inputs the set of three orthographic views, whereby the significant burden is imposed on the user.

SUMMARY OF THE INVENTION

An object of the present invention is to provide an apparatus for and a method of automatically creating a supplemental segment in two-dimensional drawings related to a set of three orthographic views.

An apparatus for automatically creating a supplemental segment in two-dimensional drawings according to the present invention comprises: drawing data storing means for storing two-dimensional drawing data concerning at least three views depicted based on orthogonal projection; knowledge storing means for storing knowledge for recognizing a three-dimensional solid model restored on the basis of the two-dimensional drawing data; recognizing means for applying the knowledge stored in the knowledge storing means to the two-dimensional drawing data stored in the drawing data storing means to recognize the three-dimensional solid model restored on the basis of the two-dimensional drawing data; supplemental segment area determining means for determining an area where the supplemental segment is to be created in the two-dimensional drawings on the basis of the three-dimensional solid model recognized by the recognizing means; end point determining means for determining at least two end points of the supplemental segment to be created in the area determined by the supplemental segment area determining means; and supplemental segment creating means for crating the supplemental segment connecting the end points determined by the end point determining means.

A method of automatically creating a supplemental segment in two-dimensional drawings according to the present invention comprises the steps of: previously storing in a drawing data storage device two-dimensional drawing data concerning at least three views depicted based on orthogonal projection; previously storing in a knowledge storage device knowledge for recognizing a three-dimensional solid model restored on the basis of the two-dimensional drawing data; applying the knowledge stored in the knowledge storage device to the two-dimensional drawing data stored in the drawing data storage device to recognize the three-dimensional solid model restored on the basis of the two-dimensional drawing data; determining an area where the supplemental segment is to be created in the two-dimensional drawings on the basis of the recognized three-dimensional solid model; determining at least two end points of the supplemental segment to be created in the determined area; and creating the supplemental segment connecting the determined end points.

The two-dimensional drawing data includes a point, a (line) segment (a straight line segment, a curved line segment (a circle, an ellipse, and arcs which are parts of the circle and the ellipse)), an area enclosed by a segment, and the like.

Examples of the drawing data storing means (storage device) and the knowledge storing means (storage device) include various types of storage devices such as a magnetic disk storage device, an optical disk storage device, and a semiconductor memory. It does not matter whether the storage device is provided inside an apparatus for automatically creating a supplemental segment or connected thereto in the exterior.

Examples of the recognized three-dimensional solid model include a circular cylinder, a circular cone, a sphere, a torus, and a tilted circular cylinder. Examples of the circular cylinder include one whose bottom face is a circle and one whose bottom face is a sector (including a semi-circle). Examples of the circular cone include a right circular cone, a circular truncated cone, and a right circular cone and a circular truncated cone whose bottom faces are a sector (including a semi-circle). Examples of the torus include one obtained by rotating a circle through an angle of 360° around the axis of rotation, one obtained by rotating a circle through an angle of less than 360°, one obtained by rotating a sector (including a semi-circle) through an angle of 360° around the axis of rotation, and one obtained by rotating a sector through an angle of less than 360°. Examples of the sphere include a part of a sphere such as a spherical segment of one base, a semi-sphere or a zone of sphere and the like. The tilted circular cylinder is not an oblique circular cylinder but a circular cylinder depicted with it being inclined from at least one coordinate axis in the set of three orthographic views. Examples of the tilted circular cylinder include one whose bottom face is a circle and one whose bottom face is a sector (including a semi-circle).

Examples of the supplemental segment include a boundary segment and a silhouette segment, as described above. The boundary segment and the silhouette segment include a straight line segment and a curved line segment (a circle, an ellipse, and arcs which are parts of the circle and the ellipse). For example, in a set of three orthographic views of a circular truncated cone shown in FIG. 12a, supplemental segments (silhouette segments) are required for silhouettes on a periphery face of the circular truncated cone. The silhouette segments are segments s1s5, s2s6, s3s7, s4s8 (a top view), w5w6 (a front view) and w7w8 (a side view) indicated by a one dot-and-dash line in FIG. 12b. FIG. 17 illustrates a spherical segment of one base (a solid indicated by an arc bslc on a top view) and a circular truncated cone smoothly connected thereto (a solid indicated by a trapezoid bchg on the top view). In this solid, supplemental segments (boundary segments) are required in a portion where the spherical segment of one base and the circular truncated cone are smoothly connected. The boundary segments are a straight line segment bc (on the top view), a circle passing through points v6, v7, v5 and v8 (on a front view), and a straight line segment de (on a side view) indicated by a one dot-and-dash line.

According to the present invention, a three-dimensional solid model restored from two-dimensional drawings is recognized, and an area where a supplemental segment is to be created is determined on the basis of the recognized three-dimensional solid model. In this area, end points between which the supplemental segment is to be created are determined, to create the supplemental segment.

According to the present invention, the supplemental segment is automatically created, whereby a user need not input the supplemental segment, thereby to make it possible to reduce the number of steps of input by the user and the burden on the user. Further, it is possible to restore an accurate three-dimensional solid model even if the supplemental segment is not inputted.

Preferably, auxiliary knowledge for judging whether or not a supplemental segment should be created between the determined end points is previously stored in the auxiliary knowledge storage device, and it is judged whether or not a supplemental segment should be created on the basis of the auxiliary knowledge. When it is judged that a supplemental segment should be created, the supplemental segment is created. It is possible to accurately determine a portion where the supplemental segment is to be created by using the auxiliary knowledge.

In many cases, the features of the two-dimensional drawings (the number of segments, the length of the segment, the size of an object to be designed, and the like) may generally differ for each design field (design field of ships, design field of housings of computer systems, design field of relay switches, or the like), and a portion where a supplemental segment is to be created may differ. Consequently, it is preferable that there are provided a plurality of types of auxiliary knowledge (for example, one type of auxiliary knowledge per design field). It is preferable that the features of two-dimensional drawing data are extracted, and a suitable type of auxiliary knowledge is selected out of the plurality of types of auxiliary knowledge stored in the auxiliary knowledge storage device on the basis of the extracted features of two-dimensional drawing data.

Consequently, it is possible to accurately determine the portion where the supplemental segment is to be created on the basis of the auxiliary knowledge adapted to each design field, for example.

Furthermore, it is preferable that the auxiliary knowledge is updated or renewed and learned on the basis of a command to eliminate an unnecessary supplemental segment out of created supplemental segments or a command to create a supplemental segment lacking for the supplemental segments which is issued from the exterior.

The command to eliminate and the command to create the supplemental segment will be issued from the user.

There is a case where an unnecessary supplemental segment is created, or a necessary supplemental segment is not created even if auxiliary knowledge is used. In such a case, correction (elimination of an unnecessary supplemental segment and addition (creation) of a necessary supplemental segment) is made by the user. The auxiliary knowledge is updated (leaned) on the basis of the results of the correction by the user. For example, the auxiliary knowledge is updated on the basis of data such as data as to whether a segment connected to the added supplemental segment is a straight line or a circle and data as to how many segments are connected to the eliminated supplemental segment.

This makes it possible to more accurately judge using the auxiliary knowledge the situations of the end points determined by the end point determining means (whether a segment on which the ends points exist is a straight line or a circle, the number of segments connected to the end points, and the like) where a supplemental segment is to be created.

It is also possible to eliminate or create, on the basis of the command to eliminate an unnecessary supplemental segment out of created supplemental segments or the command to create a supplemental segment lacking for the supplemental segments which is issued from the exterior, the supplemental segment in the two-dimensional drawing data.

In one mode of the present invention, the apparatus for automatically creating a supplemental segment in two-dimensional drawings according to the present invention is constituted by a computer system, and a method of automatically creating a supplemental segment in two-dimensional drawings is carried out by a computer system.

A CAD/CAM system having a function of automatically creating a supplemental segment in two-dimensional drawings according to the present invention comprises: drawing data storing means for storing two-dimensional drawing data concerning three views depicted based on orthogonal projection; knowledge storing means for storing knowledge for recognizing three-dimensional solid model restored on the basis of the two-dimensional drawing data; recognizing means for applying the knowledge stored in the knowledge storing means to the two-dimensional drawing data stored in the drawing data storing means, to recognize the three-dimensional solid model restored on the basis of the two-dimensional drawing data; supplemental segment area determining means for determining an area where the supplemental segment is to be created in the two-dimensional drawings on the basis of the three-dimensional solid model recognized by the recognizing means; end point determining means for determining at least two end points of the supplemental segment to be created in the area determined by the supplemental segment area determining means; and supplemental segment creating means for creating the supplemental segment connecting the end point determined by the end point determining means.

Also in the CAD/CAM system, therefore, the supplemental segment is automatically created, thereby to make it possible to reduce the number of steps of data input by a user (a person who inputs data) and restore an accurate three-dimensional solid model.

The apparatus for and a method of automatically creating a supplemental segment according to the present invention can be generalized as follows.

An apparatus according to the present invention for automatically creating a supplemental segment, for increasing the degree of understanding of two-dimensional drawings, on two-dimensional drawings (drawing data) representing a three-dimensional solid model comprises: means for detecting an area where the supplemental segment appears on the two-dimensional drawings (drawing data) on the basis of the three-dimensional solid model; and means for determining the position where the supplemental segment is provided in the area on the two-dimensional drawings (drawing data) which is detected by the detecting means and creating (data representing) the determined supplemental segment.

A method according to the present invention of automatically creating a supplemental segment, for increasing the degree of understanding of two-dimensional drawings, on two-dimensional drawings (drawing data) representing a three-dimensional solid model comprises the steps of: detecting an area where the supplemental segment appears on the two-dimensional drawings (drawing data) on the basis of the three-dimensional solid model; and determining the position where the supplemental segment is provided in the detected area on the two-dimensional drawings (drawing data) and creating (data representing) the determined supplemental segment.

Examples of the above described supplemental segment include a boundary line segment and a silhouette line segment.

According to the present invention, the supplemental segment is automatically created on the two-dimensional drawing data, thereby to eliminate the necessity for an operator of the CAD/CAM system to add a supplemental segment as in the conventional example as well as to make it possible to draw a suitable supplemental segment. The supplemental segment is useful not only in restoring the three-dimensional solid model from the set of three orthographic views but also for the purpose of facilitating the understanding of the two-dimensional drawings produced on the basis of the three-dimensional solid model and representing a curved face which is difficult to represent in the conventional drawing practice.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11b illustrates a set of three orthographic views where supplemental segments are created in the set of three orthographic views shown in FIG. 11a;

FIG. 12b illustrates a set of three orthographic views where supplemental segments are created in the set of three orthographic views shown in FIG. 12a;

FIG. 13b illustrates a set of three orthographic views where supplemental segments are created in the set of three orthographic views shown in FIG. 13a;

FIG. 15b illustrates a set of three orthographic views where supplemental segments are created in the set of three orthographic views shown in FIG. 15a;

FIG. 18b illustrates a set of three orthographic views obtained by transforming the coordinates of the set of three orthographic views shown in FIG. 18a;

FIG. 19 illustrates a set of three orthographic views where supplemental segments are created in the set of three orthographic views shown in FIG. 18a;

FIG. 24a illustrates the data structure of view feature data, FIG. 24b illustrates an example of the view feature data, and FIG. 24c illustrates an example in which the degrees of membership related to respective elements of the view feature data are found on the basis of the feature data of auxiliary knowledge;

FIG. 30b illustrates a set of three orthographic views where supplemental segments are created in the set of three orthographic views shown in FIG. 30a.

DESCRIPTION OF THE PREFERRED EMBODIMENTS

1. First Embodiment

1.1 System Configuration

Figure 1:
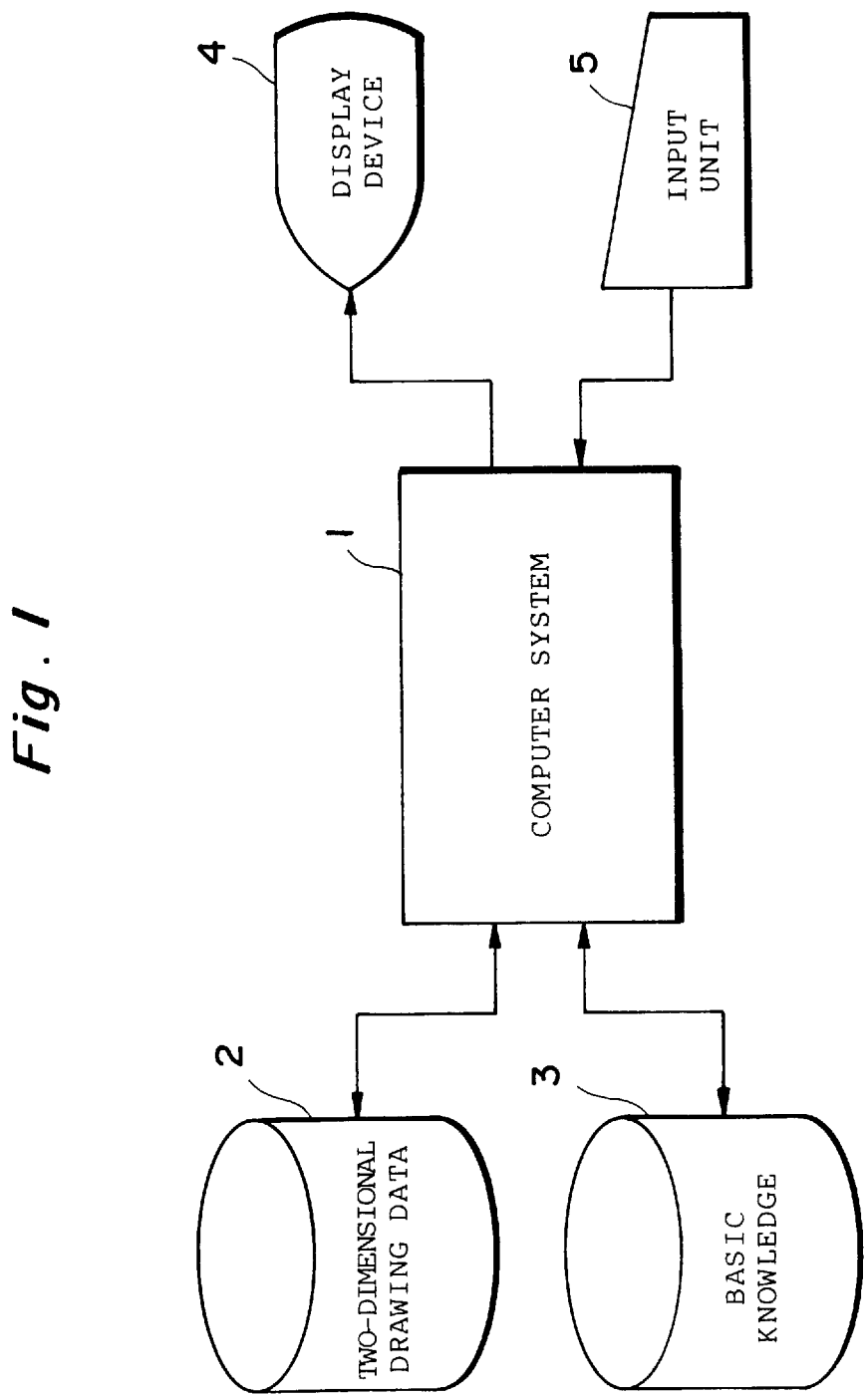
FIG. 1 is a block diagram showing the construction of a three-dimensional solid model restoring apparatus in a first embodiment.

FIG. 1 is a block diagram showing the construction of a three-dimensional solid model restoring apparatus according to a first embodiment.

A computer system 1 may be a CAD/CAM system. A display device 4 displays a set of three orthographic views and a three-dimensional solid model restored from the set of three orthographic views, and is constituted by a CRT display device, a liquid crystal display device, a plasma display device, or the like. An input unit 5 inputs two-dimensional drawing data, a command to automatically create a supplemental segment, and the like, and is constituted by a keyboard, a mouse, an input pen, or the like.

A two-dimensional drawing data storage device 2 and a basic knowledge storage device 3 can be realized by one storage device.

The two-dimensional drawing data storage device (a magnetic disk storage device, an optical disk storage device, or the like) 2 stores two-dimensional drawing data representing each of views constituting the set of three orthographic views. The two-dimensional drawing data created by the CAD/CAM system may, in some cases, be also applied to the two-dimensional drawing data storage device 2 from the CAD/CAM system. Examples of the sets of three orthographic views are illustrated in FIGS. 11a to 19.

Figure 2:
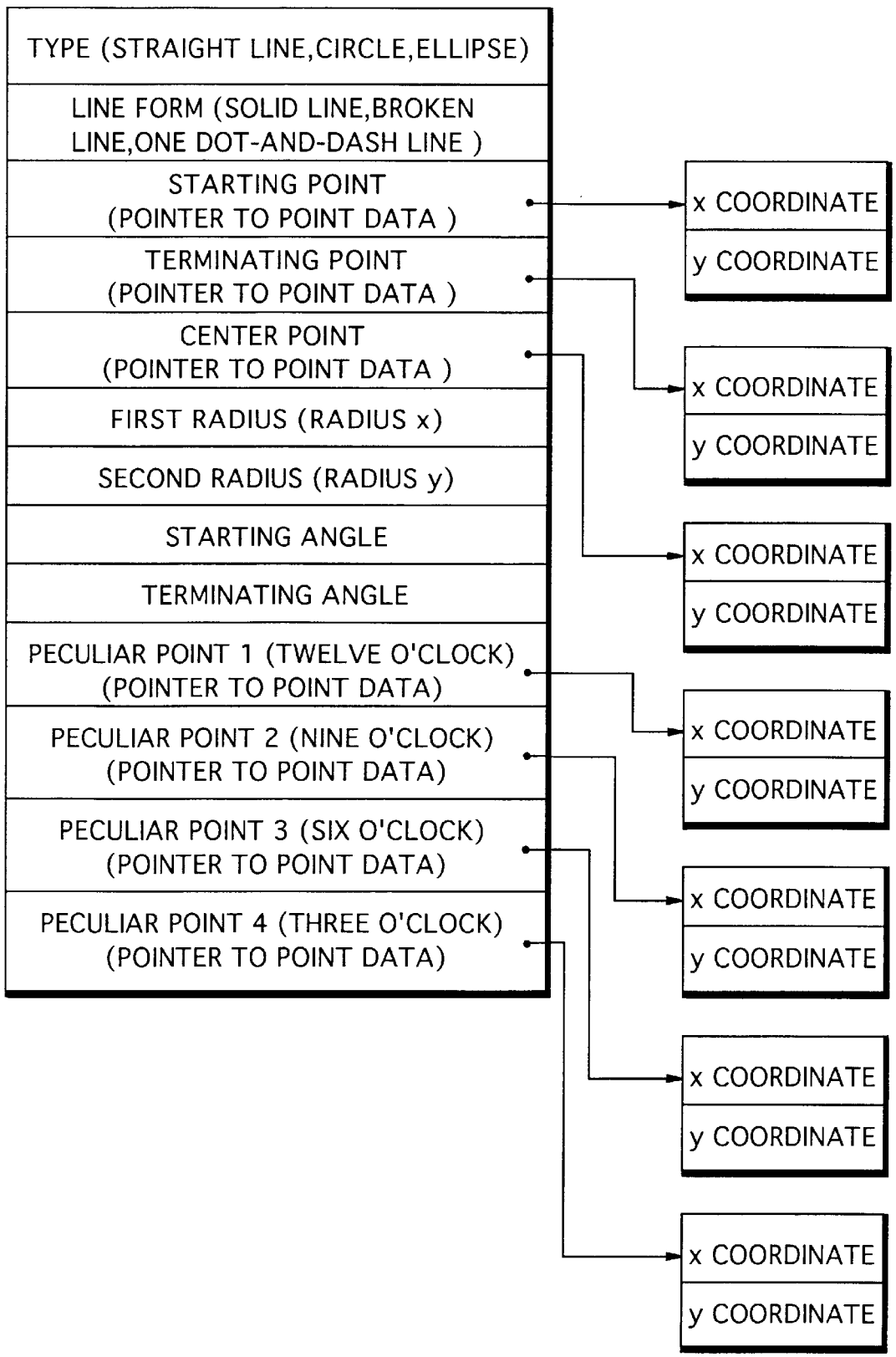
FIG. 2 illustrates the data structure of segment data.

The two-dimensional drawing data is composed of segment data. Examples of a segment include a straight line segment and a curved line segment. Examples of the curved line segment include a circle (the circumference) and an ellipse (the ellipse periphery). The circle (the circumference) includes an arc which is a part of the circumference. In addition, the ellipse (the ellipse periphery) includes an elliptic arc which is a part of the ellipse periphery. FIG. 2 illustrates the data structure of the segment data stored in the two-dimensional drawing data storage device 2.

Figure 14:
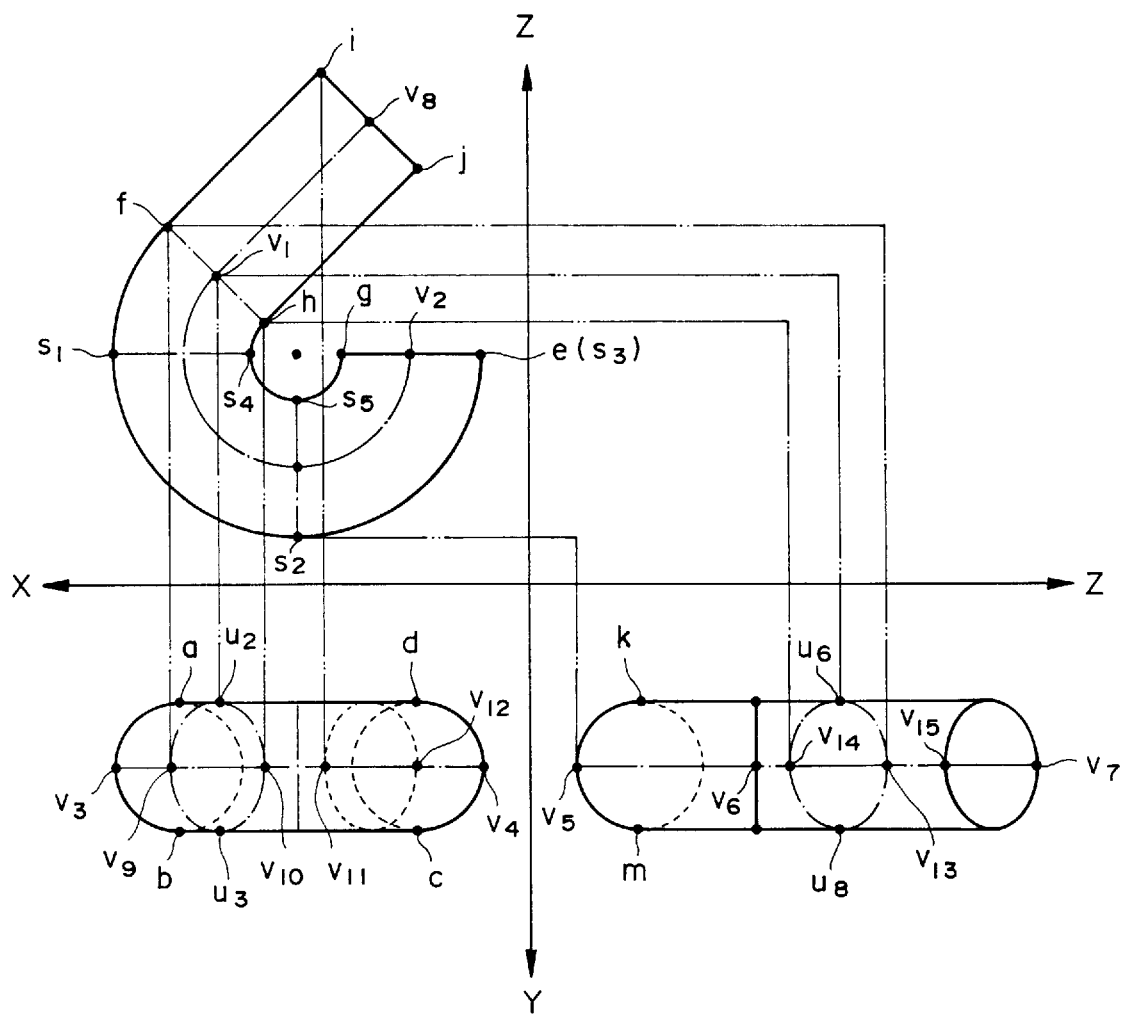
FIG. 14 illustrates a set of three orthographic views of a solid in which a tilted circular cylinder is smoothly connected to a torus.

A "type" indicates which of a straight line, a circle and an ellipse is the segment data. For example, in FIG. 11a, the type of segment data representing straight line segments ab, bc, cd, da, ge, ef, hi, ik, km, mh and the like is a straight line, and the type of segment data representing a curved line segment jk is a circle. In FIG. 14, the type of segment data representing a curved line segment v7 (a starting point and a terminating point are the same point (v7) in an ellipse) and the like is an ellipse.

A "line form" includes a solid line, a broken line and a one dot-and-dash line. The solid line represents a visible line, and the broken line represents a hidden and invisible line (a hidden line). The one dot-and-dash line represents a supplemental line (a boundary edge line and a silhouette edge line). For example, in FIG. 11a, the line form of the straight line segment ab, the curved line segment jk and the like is a solid line, and the line form of a straight line vq is a broken line.

Figure 11A:
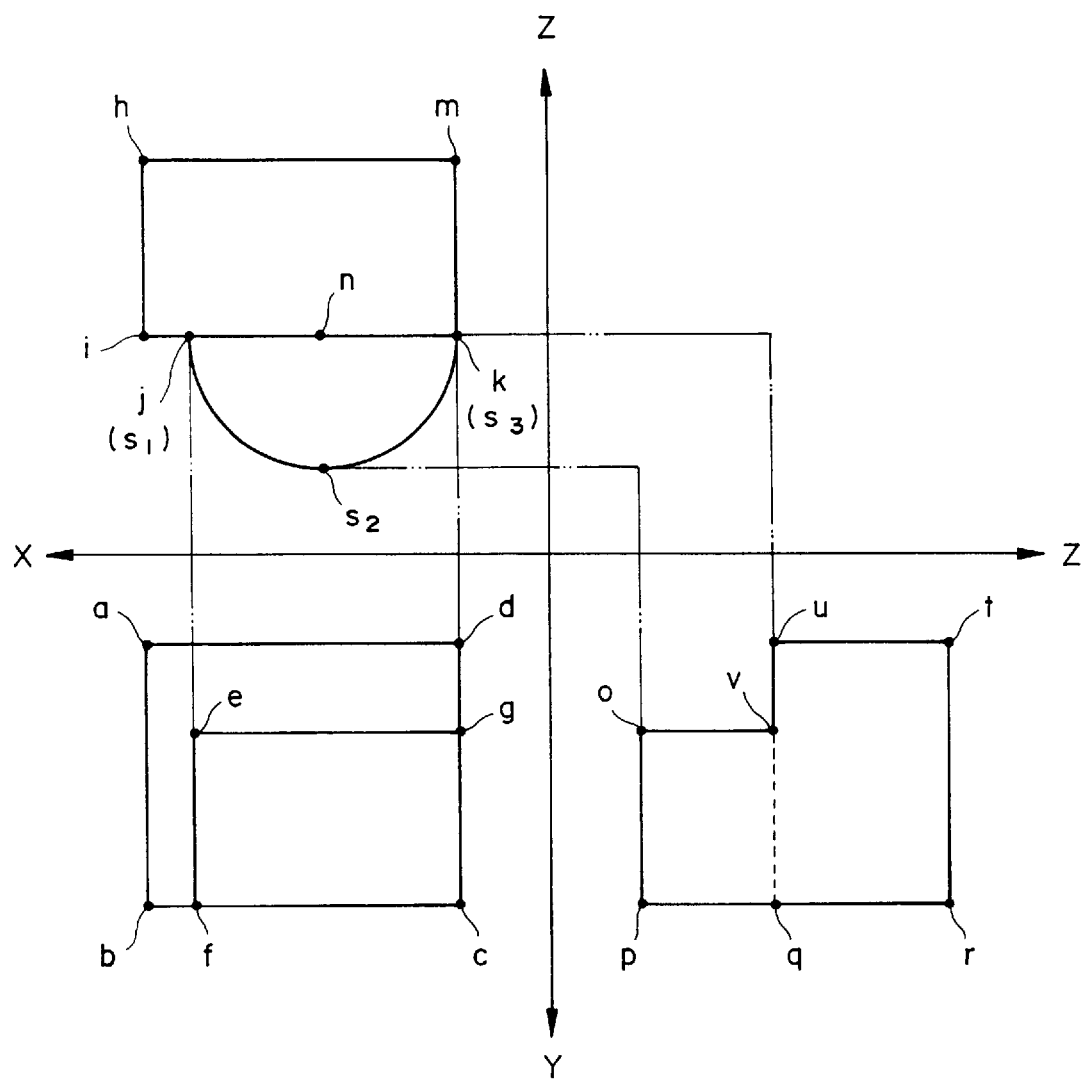
FIG. 11a illustrates a set of three orthographic views of a solid including a circular cylinder.
Figure 12A:
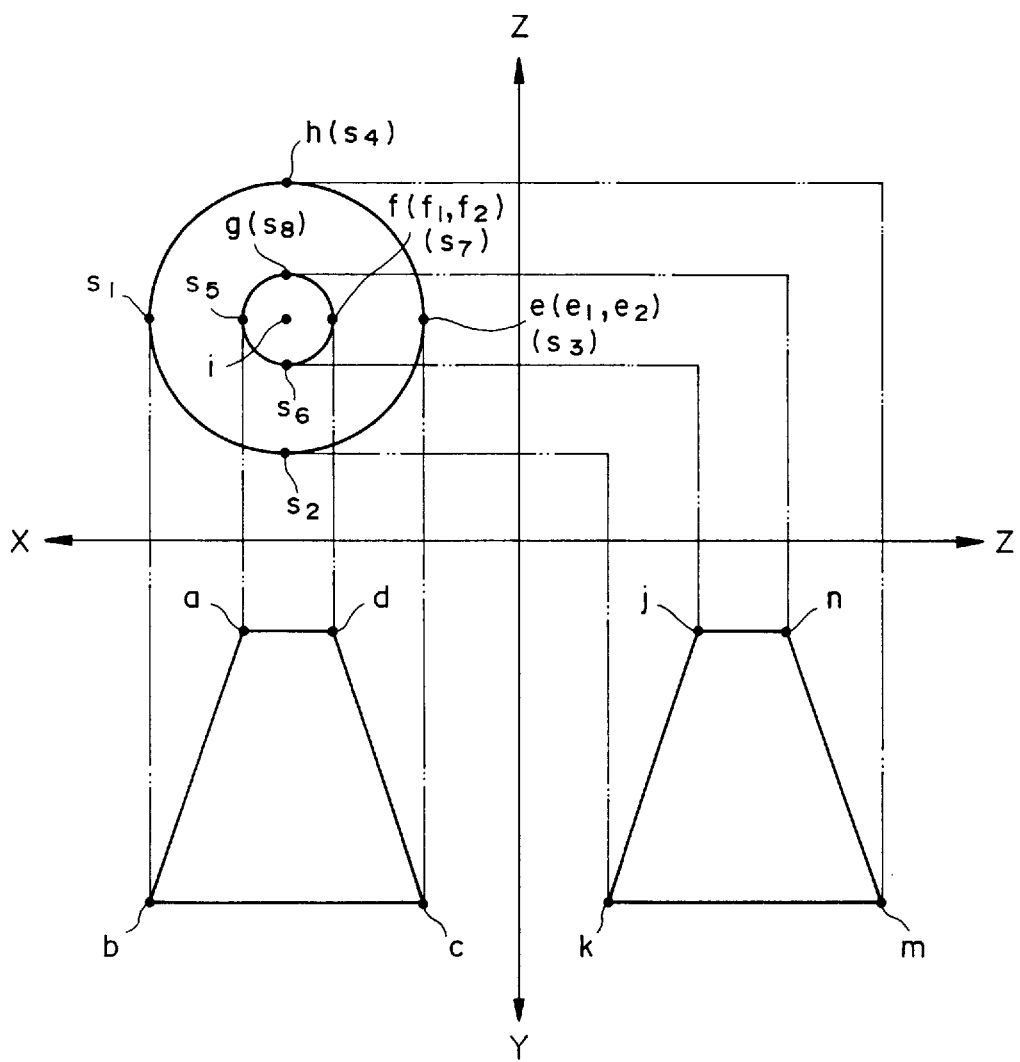
FIG. 12a illustrates a set of three orthographic views of a circular cone.

A "starting point" and a "terminating point" respectively represent a pointer to data representing the starting point coordinates and a pointer to data representing the terminating point coordinates. The starting point coordinates and the terminating point coordinates are respectively represented by the x coordinate and the y coordinate in two-dimensional drawing data representing a front view, the z coordinate and the x coordinate in two-dimensional drawing data representing a top view, and the y coordinate and the z coordinate in two-dimensional drawing data representing a side view. For example, in FIG. 11a, the starting point coordinates of the straight line segment ab are the coordinates (the x coordinate and the y coordinate) of a point a, and the terminating point coordinates thereof are the coordinates (the x coordinate and the y coordinate) of a point b. Further, the starting point coordinates of the curved line segment jk are the coordinates (the z coordinate and the x coordinate) of a point j, and the terminating point coordinates thereof are the coordinates (the z coordinate and the x coordinate) of a point k. In FIG. 12a, a curved line segment e (e1e2) is a circle, whereby the starting point coordinates and the terminating point coordinates thereof are coordinates of the same point e.

The "starting point" and the "terminating point" may, in some cases, be hereinafter respectively called end points. In addition, the "starting point" and the "terminating point" may, in some cases, be generically named as endpoints.

A "center point" represents, if the type of the segment data is a circle or an ellipse, a pointer to data representing the center coordinates of the circle or the ellipse. The coordinates of the center point are respectively represented by the x coordinate and the y coordinate in the two-dimensional drawing data representing the front view, the z coordinate and the x coordinate in the two-dimensional drawing data representing the top view, and the y coordinate and the z coordinate in the two-dimensional drawing data representing the side view, as in the cases of the starting point coordinates and the terminating point coordinates. For example, in FIG. 11a, the coordinates of the center point of a curved line segment (an arc) jk are the coordinates (the z coordinate and the x coordinate) of a point n. In addition, in FIG. 12a, the coordinates of the center points of curved line segments (circles) e (e1e2) and f (f1f2) are the coordinates (the x coordinate and the z coordinate) of a point i. If the type of the segment data is a straight line, there exists no center point, whereby the "center point" (the pointer) becomes NULL indicating that there is no data representing the coordinates.

A "first radius" represents, in the case of a circle, the radius of the circle. For example, in FIG. 11a, the first radius of a curved line segment (an arc) jk is the distance between a point n and a point k. In the case of an ellipse, a "first radius" respectively represents the length which is one-half the principal axis (the major axis or the minor axis) in the x direction on the front view and the top view and the length which is one-half the principal axis in the z direction on the side view.

A "second radius" is defined only in the case of an ellipse, and respectively represents the length which is one-half the principal axis (the major axis or the minor axis) in the y direction on the front view and the side view and the length which is one-half the principal axis in the z direction on the top view.

When the curved line segment is a circle, the value of the second radius is zero. On the other hand, in the case of the straight line segment, the values of both the first radius and the second radius are zero.

Figure 13A:
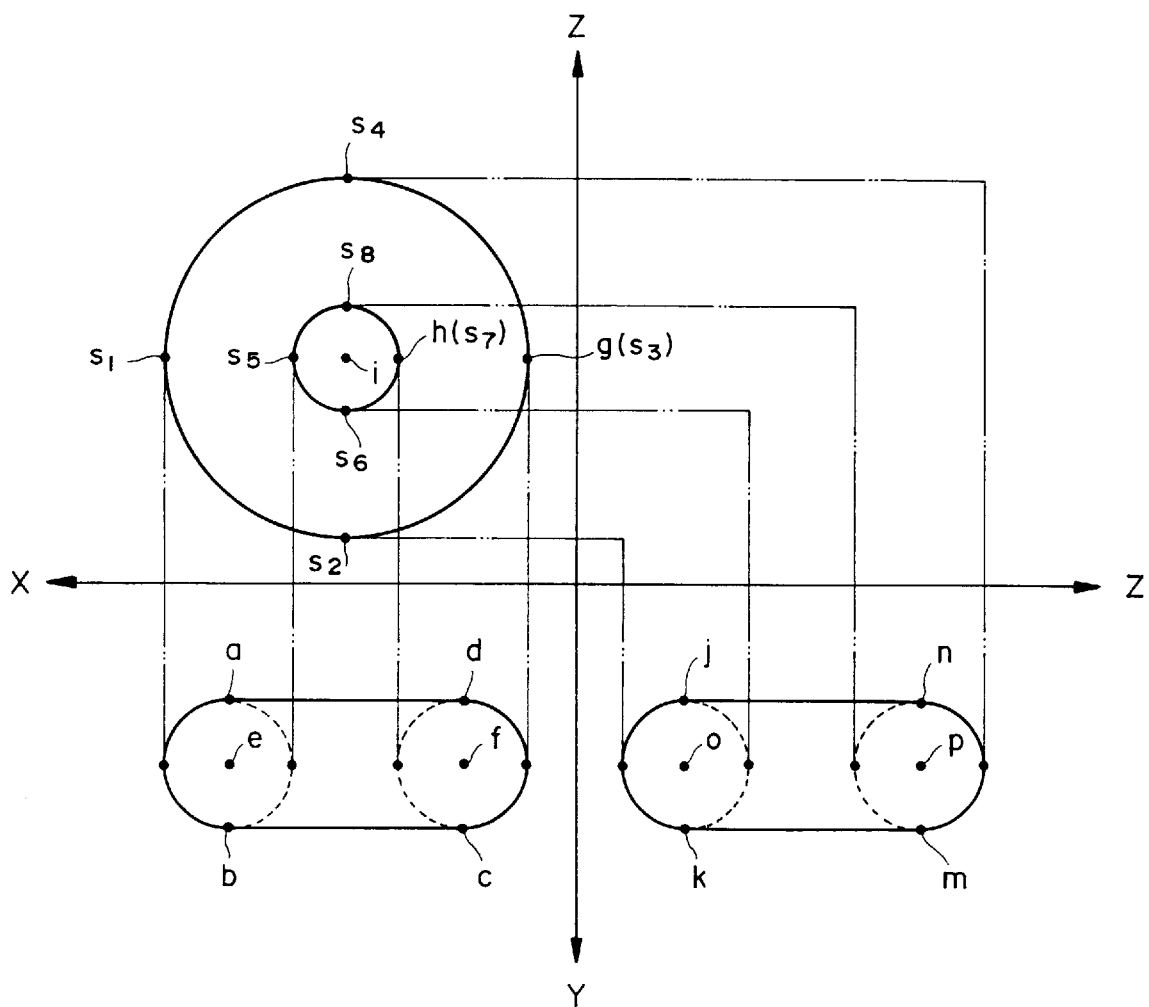
FIG. 13a illustrates a set of three orthographic views of a torus.

A "starting angle" and a "terminating angle" are defined only with respect to the curved line segment (a circle and an ellipse). In a case where a correspondence is established between a clock and each of the views constituting the set of three orthographic views, the angles in a counter-clockwise direction and the angles in a clockwise direction on the basis of the position of three o'clock are respectively represented by positive values and negative values. The "starting angle" is an angle at which the starting point forms with the direction of three o'clock, and the "terminating point" represents an angle at which the terminating point forms with the direction of three o'clock. For example, in FIG. 11a, the starting angle and the terminating angle of a curved line segment jk are respectively 180° and 360°. In FIG. 12a, the starting angle and the terminating angle of each of circles e and f are respectively 0° and 360°. In FIG. 13a, the starting angle and the terminating angle of a circle ab (a starting point a, and a terminating point b) indicated by a broken line are respectively 90° and −90°.

"Peculiar (singular, specified, or unique) points" are points on the circumference in the positions of twelve o'clock, nine o'clock, six o'clock and three o'clock in a circle or an ellipse. For example, points s1 to s3 in FIG. 11a and points s1 to s4 in FIG. 12a are peculiar points. Pointers to data representing the coordinates of the peculiar points in the position of nine o'clock, six o'clock and three o'clock in a counter-clockwise direction from twelve o'clock are stored in locations corresponding to a "peculiar point 1" to a "peculiar point 4". In a case where the type of the segment data is a straight line, there exist no peculiar points, whereby NULL is stored in the locations corresponding to the peculiar points 1 to 4. In the case of an arc which is a part of a circle or an elliptic arc which is a part of an ellipse, part of the peculiar points 1 to 4 may not, in some cases, exist. In this case, therefore, NULL is stored in the location corresponding to the peculiar point which does not exist.

The straight line segment or the curved line segment which is represented by such a data structure will be referred to as a "primitive".

Figure 3:
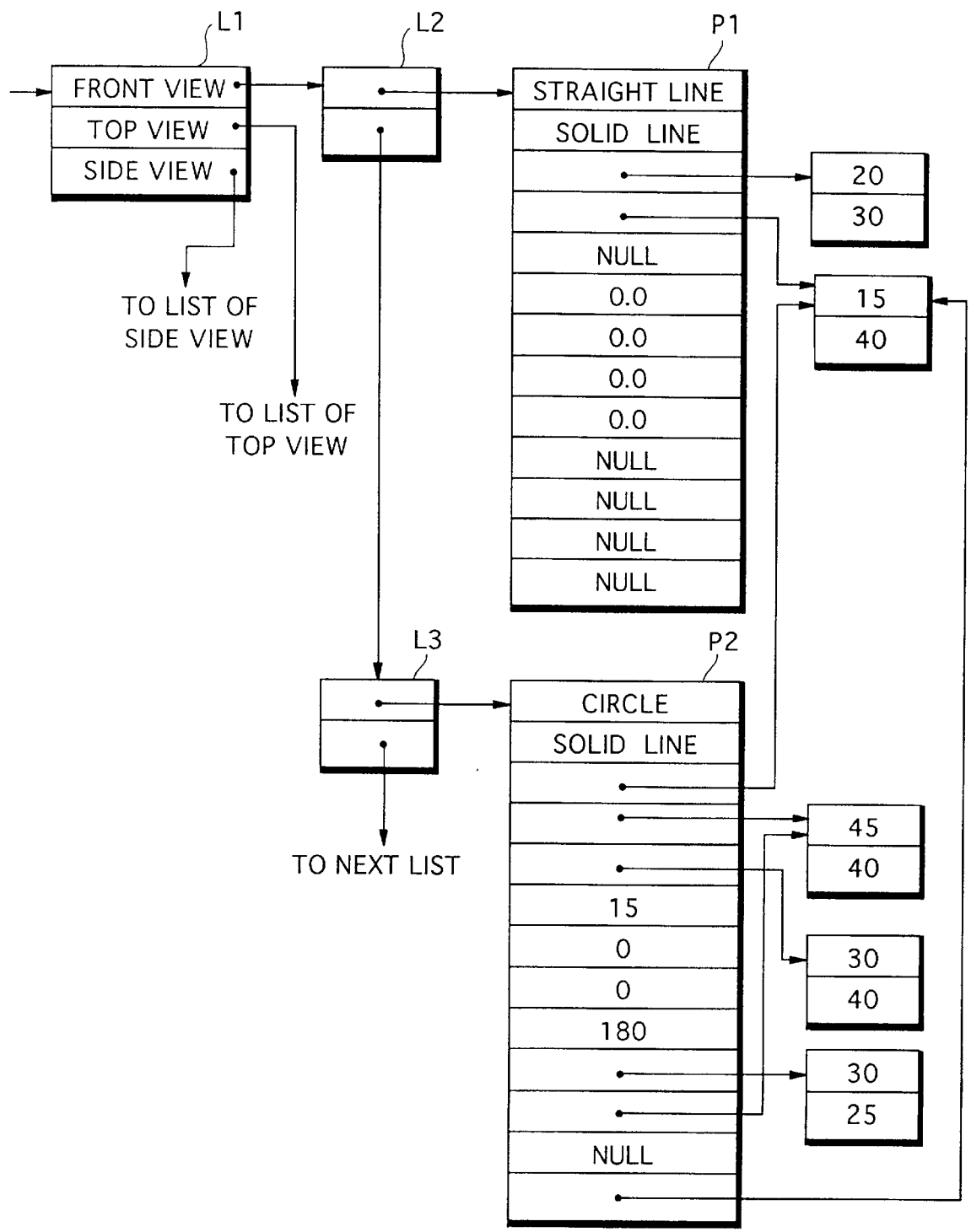
FIG. 3 illustrates the structure of data stored in a two-dimensional drawing data storage device.
Figure 4:
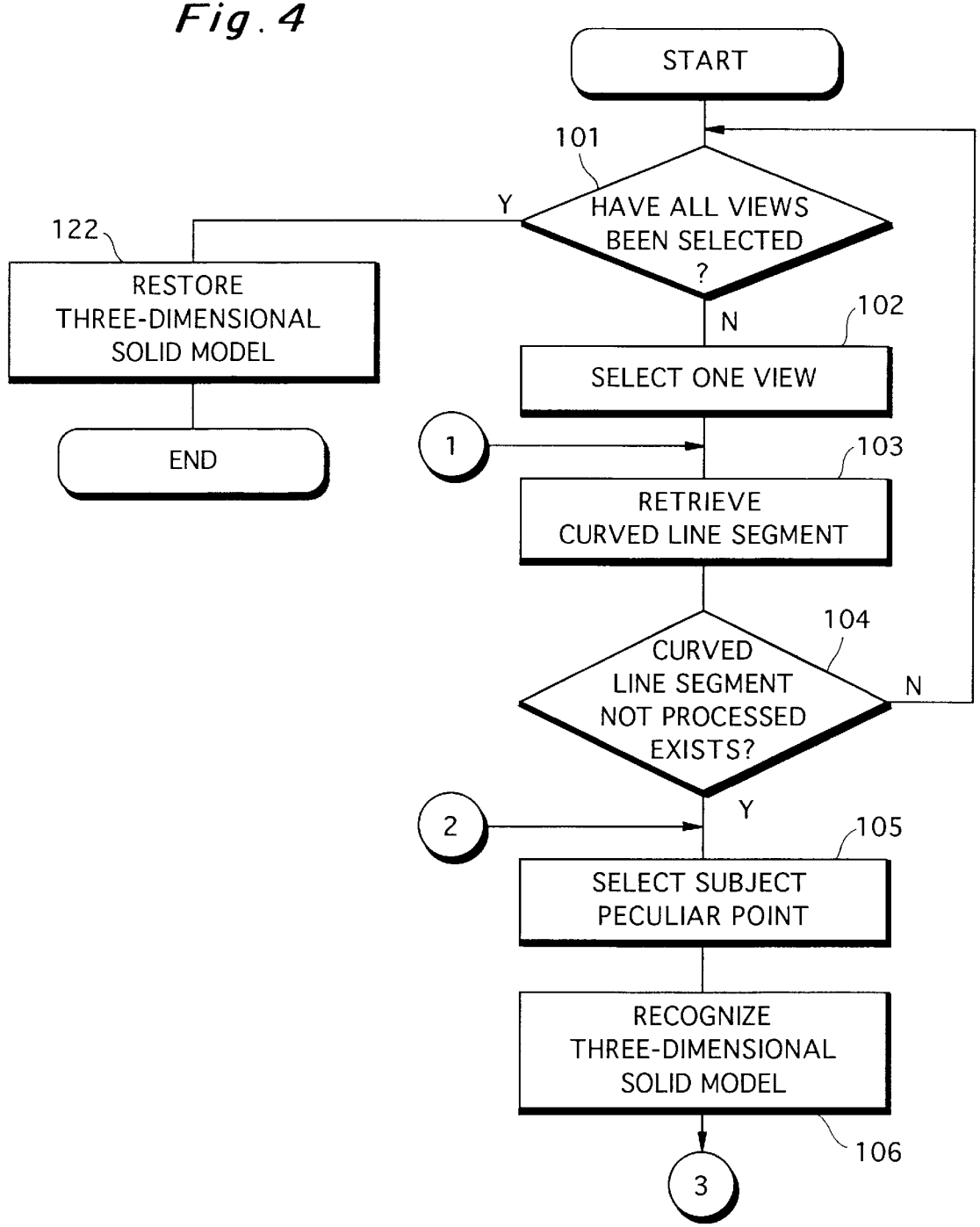
FIGS 4 to 10 are flow charts showing the flow of processing in the three-dimensional solid model restoring apparatus in the first embodiment.
Figure 5:
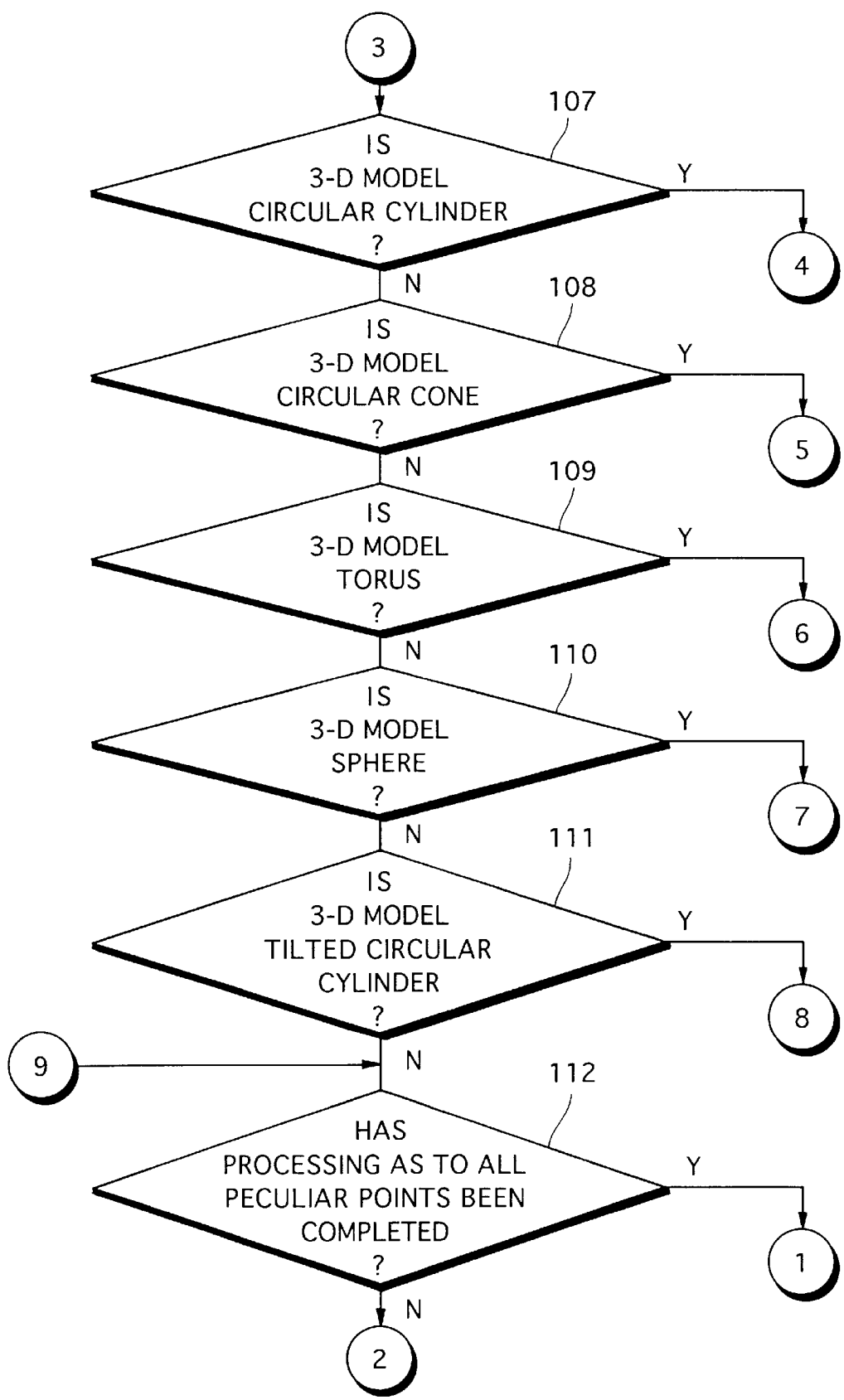
Figure 6:
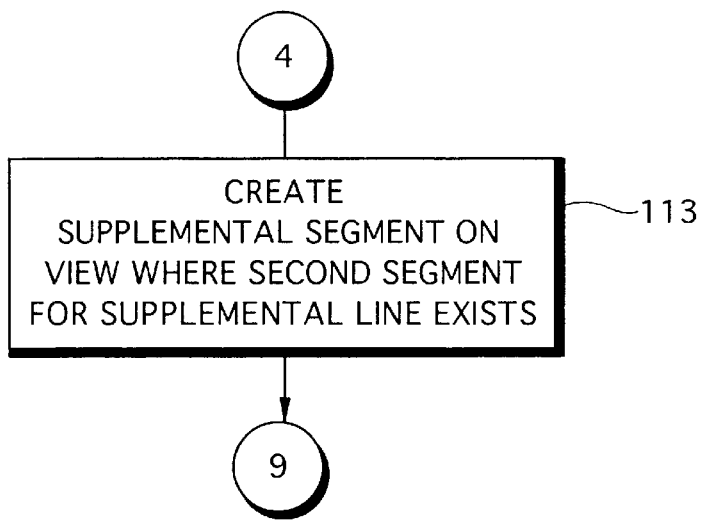
Figure 7:
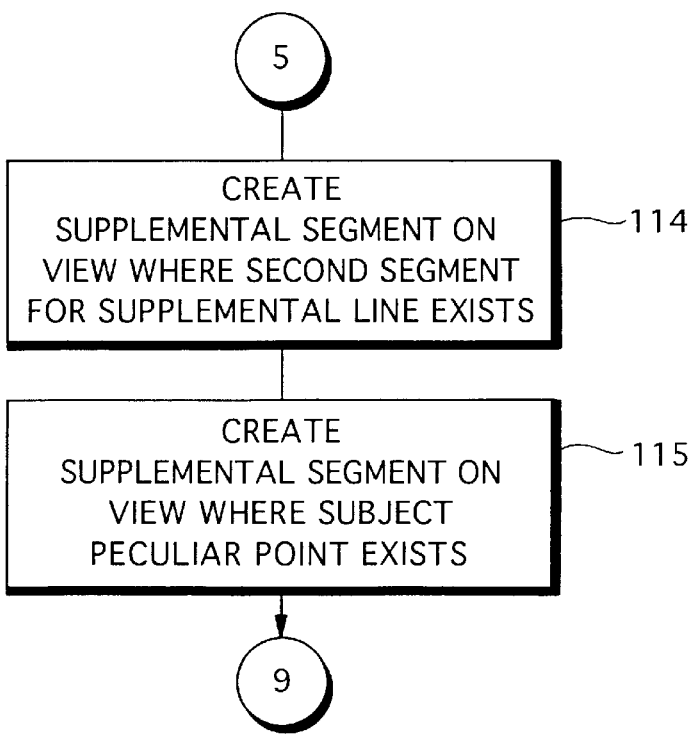
Figure 8:
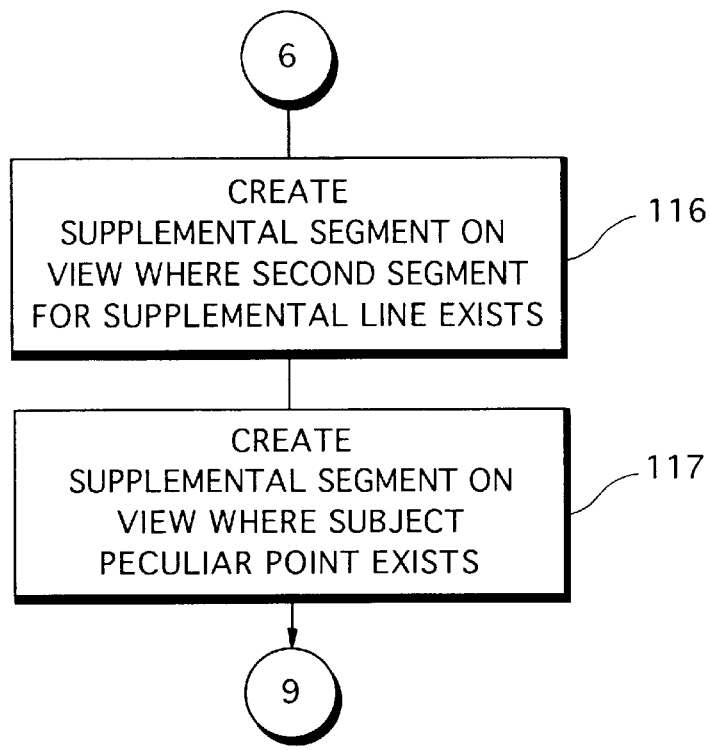
Figure 9:
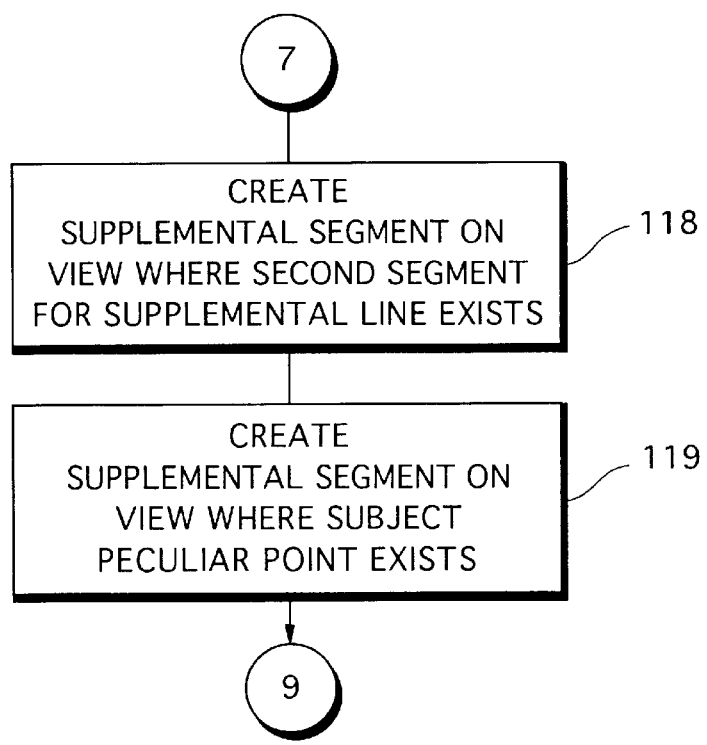
Figure 10:
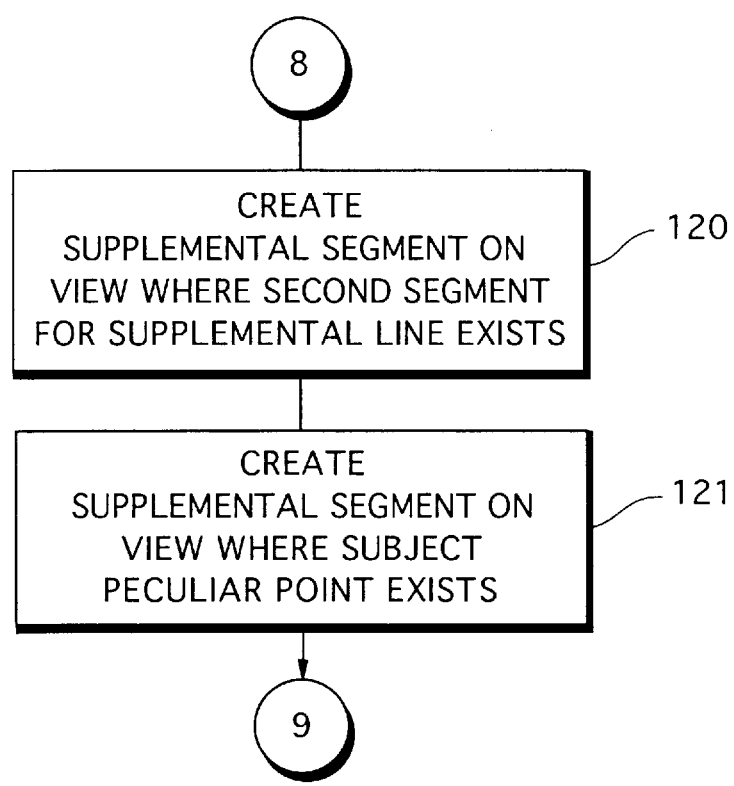

A plurality of primitives exist in each of the three views. The plurality of primitives are stored as data having a list structure as shown in FIG. 3. The computer system 1 can access data representing all the primitives included in each of the front view, the top view and the side view by accessing a list L1.

Knowledge required to perceive which of a circular cylinder, a circular cone, a torus, a sphere and a tilted circular cylinder is a figure represented on the set of three orthographic views is stored in the basic knowledge storage device (the magnetic disk storage device, the optical disk storage device, or the like) 3.

Figure 18A:
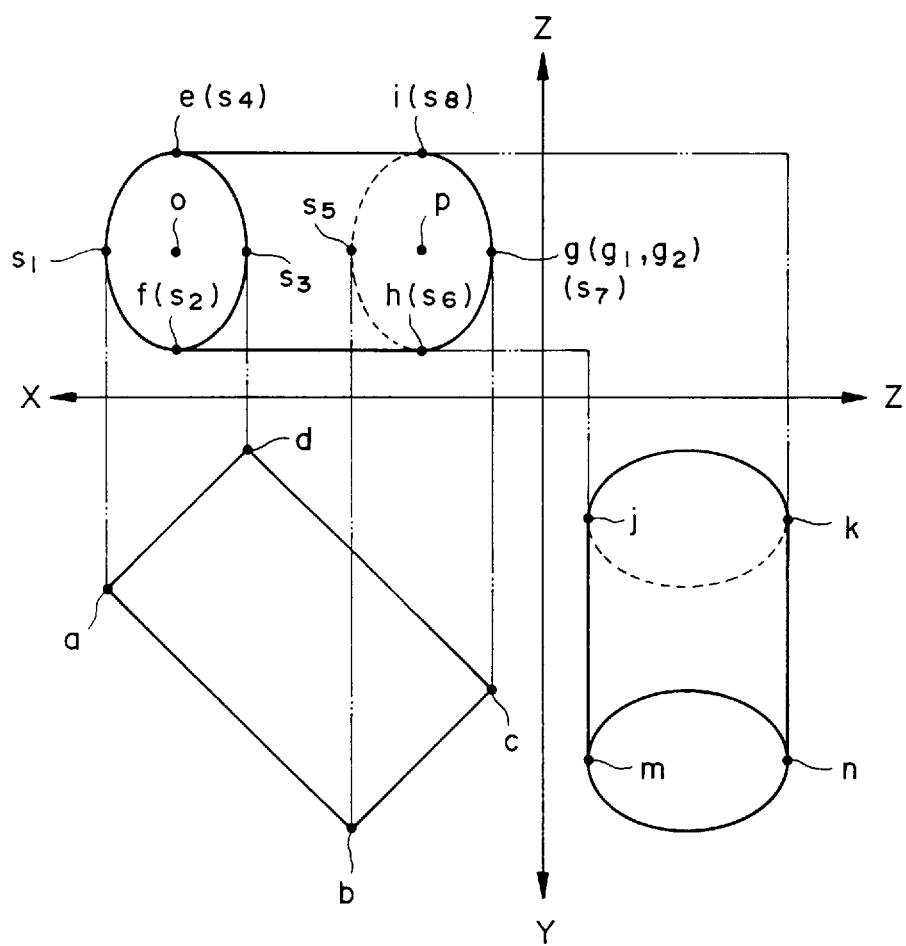
FIG. 18a illustrates a set of three orthographic views of a tilted circular cylinder.

Examples of the circular cylinder include one whose bottom face is a sector (including a semi-circle) in addition to one whose bottom face is a circle. Examples of the circular cone include a right circular cone, a circular truncated cone, and a right circular cone and a circular truncated cone whose bottom faces are a sector (including a semi-circle). Examples of the torus include one obtained by rotating a circle expressed by $x^2 + (y-b)^2 = a^2$ (an equation of a circle) through 360° around the x-axis, one obtained by rotating the circle through less than 360°, and the ones cut in half by a y - z plane and the like. Examples of the sphere include a part of the sphere such as a semi-sphere and a spherical segment of one base. The tilted circular cylinder is not an oblique circular cylinder, but a right circular cylinder whose generator is not parallel to the coordinate axis but is inclined thereto as shown in FIG. 18a. Examples of the tilted circular cylinder include one whose bottom face is a sector (including a semi-circle).

The following basic knowledge is stored in the basic knowledge storage device 3.

In the following description of the basic knowledge, a "subject circle" is a circle or an arc forming a part of the circumference which is subjected to be processed out of circles or arcs on the set of three orthographic views. A "subject ellipse" is an ellipse or an elliptic arc forming a part of the ellipse periphery which is to be processed out of ellipses or elliptic arcs on the set of three orthographic views.

A "subject peculiar point" is a peculiar point to be processed out of peculiar points of the subject circle or the subject ellipse.

A "common axis" is the coordinate axis which both two views have. The common axis of the top view and the front view is the x-axis, the common axis of the top view and the side view is the z-axis, and the common axis of the front view and the side view is the y-axis.

A "noncommon axis" is the coordinate axis which one of two views has but the other view does not have. The number of noncommon axes of the two views is two. The noncommon axes of the top view and the front view are the z-axis and the y-axis, the noncommon axes of the top view and the side view are the x-axis and the y-axis, and the noncommon axes of the front view and the side view are the x-axis and the z-axis.

A "left end point of a circle" is, if a point exists in the position of nine o'clock on the circumference, the point, while being, if there exists no point in the position of nine o'clock, an end point on the circumference which exists in the position closest to the position of nine o'clock. The same is true for a "left end point of an ellipse". For example, the left end point of a circle (an arc) jk in FIG. 11a is a point j (s1). The left end point of a circle ef in FIG. 14 is a point s1.

A "right end point of a circle" is, if a point exists in the position of three o'clock on the circumference, the point, while being, if there exists no point in the position of three o'clock, an end point on the circumference which exists in the position closest to the position of three o'clock. The same is true for a "right end point of an ellipse". For example, the right end point of a circle (an arc) jk in FIG. 11a is a point k (s3).

An "upper end point of a circle" is, if a point exists in the position of twelve o'clock on the circumference, the point, while being, if there exists no point in the position of twelve o'clock, an end point on the circumference which exists in the position closest to the position of twelve o'clock. The same is true for an "upper end point of an ellipse". For example, the upper end points of a circle (an arc) jk in FIG. 11a are points j and k. The upper end point of a circle e in FIG. 12a is a point h. The upper end point of a circle ef in FIG. 14 is a point f.

A "lower end point of a circle" is, if a point exists in the position of six o'clock on the circumference, the point, while being, if there exists no point in the position of six o'clock, an end point on the circumference which exists in the position closest to the position of six o'clock. The same is true for a "lower end point of an ellipse". For example, the lower end point of a curved line segment (an arc) jk in FIG. 11a is a point s2.

A "corresponding point" of an arbitrary point (which shall be a point A) is a point which exists on a view (called a second view) other than a view where the point A exists (called a first view) and whose coordinate in the common axis of the first view and the second view has the same value as the coordinate in the common axis of the point A. For example, in FIG. 11a, the coordinates of a subject peculiar point s2 are taken as (z0, x0) (a top view), and the coordinates of a point o are taken as (y0, z0) (a side view). In this case, both the coordinates (the z coordinates) in the common axis (the z-axis) of the top view and the side view of the subject peculiar points s2 and the point o are z0, whereby the point o is a corresponding point of the subject peculiar point s2.

If the point A is a peculiar point, the corresponding point of the point A may, in some cases, be particularly referred to as a "corresponding peculiar point".

A "corresponding circle" of the arbitrary point A is a circle having a circumference on which the corresponding point of the point A exists. The same is true for a "corresponding ellipse" of the arbitrary point A.

An "intersect point" of an arbitrary point A (z1, x1) (a top view) and its corresponding point (which shall be a point B, whose coordinates are taken as (y1, z1)) (a side view) is a point (x1, y1) which exists on a view (a front view) different from views where the points A and B exist and whose coordinates are the x coordinate x1 of the point A (the coordinate of the common axis of the view where the point A exists and a view where the intersect point exists) and the y coordinate y1 of the point B (the coordinate of the common axis of the view where the point B exists and the view where the intersect point exists). For example, an intersect point of a point k and a point u in FIG. 11a is a point d, and an intersect point of a point i and a point q is a point b.

Knowledge in a case where a subject peculiar point S (whose coordinates are taken as (z0, x0)) is on a top view and is in the position of twelve o'clock or six o'clock of a subject circle or a subject ellipse will be shown below. Knowledge in a case where the subject peculiar point is in the position of three o'clock or nine o'clock is obtained by respectively replacing a side view, a front view, a left end point and a right end point in the following knowledge with a front view, a side view, a lower end point (or an upper end point) and an upper end point (or a lower end point) and hence, the description thereof is omitted.

Furthermore, knowledge in a case where the subject peculiar point is on a front view is obtained by respectively replacing a top view and a front view in the following knowledge with a front view and a top view. Knowledge in a case where the subject peculiar point is on a side view is obtained by respectively replacing a top view, a front view and a side view with a side view, a top view and a front view. Consequently, the description of the knowledge in these cases will be omitted.

[Knowledge related to a Circular Cylinder]

"If the following conditions 1 and 2 of a circular cylinder are satisfied, a three-dimensional solid model restored from a set of three orthographic views including its subject circle is a circular cylinder."

<Conditions 1 of a Circular Cylinder (conditions on the side view)>

The conditions 1 of a circular cylinder are conditions to be satisfied by a segment which exists on the side view, and are the logical AND of the following conditions (1 - 1) and (1 - 2).

(1 - 1) A straight line segment which is parallel to the y-axis (the noncommon axis which the side view has out of the noncommon axes of the top view and the side view) exists on the side view.

(1 - 2) A starting point (whose coordinates are taken as (y1, z1)) and a terminating point (whose coordinates are taken as (y2, z1); y1<y2) of the straight line segment parallel to the y-axis are corresponding points of the subject peculiar point S (z0, x0). That is, z0=z1.

A straight line segment satisfying the conditions 1 of a circular cylinder is referred to as a "first segment for a supplemental line" of the circular cylinder.

<Conditions 2 of a Circular Cylinder (conditions on the front view)>

The conditions 2 of a circular cylinder are conditions to be satisfied by a segment which exists on the front view, and are the logical AND of the following conditions (2 - 1) to (2 - 5).

(2 - 1) A straight line segment (the starting point coordinates and the terminating point coordinates are respectively taken as (x1, y3) and (x2, y3); x1<x2) which is parallel to the x-axis (the common axis of the top view and the front view) exists on the front view.

(2 - 2) The x coordinates (the coordinates of the common axis (the x-axis) of the top view and the front view ) x1 and x2 of both end points of the straight line segment parallel to the x-axis are in the relationship of $x1 \leq x0 \leq x2$ with the x coordinate x0 of the subject peculiar point S.

(2 - 3) The coordinates of a left end point of the subject circle, or the coordinates of an end point (an end point different from an end point smoothly connected to the subject circle) or a left end point of a primitive (a straight line segment or a curved line segment) smoothly connected to the left end point of the subject circle are taken as (z3, x3). The coordinates of a right end point of the subject circle, or the coordinates of an end point (an end point different from an end point smoothly connected to the subject circle) or a right end point of a primitive smoothly connected to the right end point of the subject circle are taken as (z4, x4). The x coordinates x1 and x2 of both the end points of the straight line segment satisfying the foregoing conditions (2 - 2) are in the relationship of $x3 \leq x1 \leq x4$ and $x3 \leq x2 \leq x4$.

(2 - 4) The y coordinate (the coordinate of the common axis (the y-axis) of the side view and the front view) y3 of both the end points of the straight line segment satisfying the foregoing conditions (2 - 3) is in the relationship of $y1 \leq y3 \leq y2$ with the y coordinates y1 and y2 of both the end points of the straight line segment satisfying the conditions 1 of a circular cylinder.

(2 - 5) There exist at least two straight line segments satisfying the foregoing conditions (2 - 4).

Each of at least two straight line segments satisfying the conditions 2 of a circular cylinder is referred to as a "second segment for a supplemental line" of the circular cylinder.

For example, when the subject circle is a curved line segment jk in FIG. 11a, a set of three orthographic views including the subject circle satisfies the conditions 1 and 2 of a circular cylinder, whereby a three-dimensional solid model restored from the set of three orthographic views including the subject circle is judged to be a circular cylinder.

The first segment for a supplemental line and the second segment for a supplemental line of the circular cylinder in a case where the subject peculiar point is a point s2 are respectively a straight line segment op and straight line segments eg and fc. The first segment for a supplemental line and the second segment for a supplemental line of the circular cylinder in a case where the subject peculiar point is a point sl (j) are respectively a straight line segment ef and straight line segments ov, pr and ut. The first segment for a supplemental line and the second segment for a supplemental line of the circular cylinder in a case where the subject peculiar point is a point s3 (k) are respectively a straight line segment cd and straight line segments ov, pq (or pr) and ut.

[Basic Knowledge related to a Circular Cone]

"If the following conditions 1 and 2 of a circular cone are satisfied, a three-dimensional solid model restored from a set of three orthographic views including its subject circle is a circular cone."

<Conditions 1 of a Circular Cone (conditions on the side view)>

The conditions 1 of a circular cone are conditions to be satisfied by a segment which exists on the side view, and are the logical AND of the following conditions (3 - 1) to (3 - 3).

(3 - 1) A straight line segment which is parallel to neither of the two coordinate axes (the y-axis and the z-axis) of the side view (hereinafter referred to as "an oblique segment") exists on the side view.

(3 - 2) Either one of a starting point and a terminating point of this oblique segment is a corresponding point of the subject peculiar point S.

(3 - 3) One, which is not the corresponding point of the subject peculiar point S, of the starting point and the terminating point of the oblique segment satisfying the foregoing conditions (3 - 2) is a corresponding point of the center point of the subject circle or a corresponding point of, if there exists a curved line segment which is in the relationship of a concentric circle with the subject circle, a peculiar point on the periphery of the curved line segment and in the same position (twelve o'clock or six o'clock) as the subject peculiar point S.

A straight line segment satisfying the conditions 1 of a circular cone is referred to as a "first segment for a supplemental line" of the circular cone.

<Conditions 2 of a Circular Cone (conditions on the front view)>

The conditions 2 of a circular cone are conditions to be satisfied by a segment which exists on the front view, and are the logical AND of the following conditions (4 - 1) to (4 - 4).

(4 - 1) A straight line segment (the starting point coordinates and the terminating point coordinates are respectively taken as (x1, y1) and (x2, y1); x1<x2) which is parallel to the x-axis (the common axis of the top view and the front view) exists on the front view.

(4 - 2) The x coordinates (the coordinates of the common axis (the x-axis) of the top view and the front view) x1 and x2 of the straight line segment which is parallel to the x-axis and the x coordinate x0 of the subject peculiar point S are in the relationship of x1<x0≦x2.

(4 - 3) The coordinates of a left end point of the subject circle, or the coordinates of an end point (an end point different from an end point smoothly connected to the subject circle) or a left end point of a primitive (a straight line segment or a curved line segment) smoothly connected to the left end point of the subject circle are taken as (z3, x3). The coordinates of a right end point of the subject circle, or the coordinates of an end point (an end point different from an end point smoothly connected to the subject circle) or a right end point of a primitive smoothly connected to the right end point of the subject circle are taken as (z4, x4). The x coordinates x1 and x2 of both end points of a straight line segment satisfying the foregoing conditions (4 - 2) are in the relationship of x3≦x1≦x4 and x3≦x2≦x4.

(4 - 4) If there exists a curved line segment which is in the relationship of a concentric circle with the subject circle, there exist at least two straight lines satisfying the foregoing conditions (4 - 3). If there exists no curved line segment which is in the relationship of a concentric circle with the subject circle, there exists one straight line segment satisfying the foregoing conditions (4 - 3).

A straight line segment satisfying the conditions 2 of a circular cone is referred to as a "second segment for a supplemental line" of the circular cone.

For example, when the subject circle is a curved line segment e (e1e2) in FIG. 12a, a set of three orthographic views including the subject circle satisfies the conditions 1 and 2 of a circular cone, whereby a three-dimensional solid model restored from the set of three orthographic views including the subject circle is judged to be a circular cone. The same is true for a case where the subject circle is a curved line segment f (f1f2).

The first segment for a supplemental line and the second segment for a supplemental line of the circular cone in a case where the subject peculiar point is a point s2 or s6 are respectively a straight line segment jk and straight line segments ad and bc. The first segment for a supplemental line and the second segment for a supplemental line of the circular cone in a case where the subject peculiar point is a point s4 or s8 are respectively a straight line segment mn and straight line segments ad and bc. The first segment for a supplemental line and the second segment for a supplemental line of the circular cone in a case where the subject peculiar point is a point s1 or s5 are respectively a straight line segment ab and straight line segments jn and km. The first segment for a supplemental line and the second segment for a supplemental line of the circular cone in a case where the subject peculiar point is a point s3 or s7 are respectively a straight line cd and straight lines jn and km.

[Basic knowledge related to a Torus]

"If the following conditions 1 and 2 of a torus are satisfied, a three-dimensional solid model restored from a set of three orthographic views including its subject circle is a torus."

<Conditions 1 of a Torus (conditions on the side view)>

The conditions 1 of a torus are conditions to be satisfied by a segment which exists on the side view, and are the logical AND of the following conditions (5 - 1) to (5 - 3).

(5 - 1) A circle (an arc) or an ellipse (an elliptic arc) exists on the side view.

(5 - 2) A corresponding point of the subject peculiar point S exists on the periphery of the circle (the arc) or the ellipse (the elliptic arc) which exists on the side view. That is, the circle (the arc) or the ellipse (the elliptic arc) is a corresponding circle or a corresponding ellipse of the subject peculiar point S.

(5 - 3) The z coordinate (the coordinate of the common axis (the z-axis) of the top view and the side view) of the center point of the circle (the arc) or the ellipse (the elliptic arc) satisfying the foregoing conditions (5 - 2) and the z coordinate z0 of the center point of the subject circle do not coincide with each other.

A curved line segment (a circle or an ellipse) satisfying the conditions 1 of a torus is referred to as a "first segment for a supplemental line" of the torus.

<Conditions 2 of a Torus (conditions on the front view)>

The conditions 2 of a torus are conditions to be satisfied by a segment which exists on the front view, and are the logical AND of the following conditions (6 - 1) to (6 - 3).

(6 - 1) At least two circles (arcs) or ellipses (elliptic arcs) exist on the front view.

(6 - 2) A corresponding point of a left end point of the subject circle exists on the periphery of one of at least two circles (arcs) or ellipses (elliptic arcs) which exist on the front view, and a corresponding point of a right end point of the subject circle exists on the periphery of one of the other circles (arcs) or ellipses (elliptic arcs).

(6 - 3) There exists a straight line segment having as its end points upper end points of the two circles or ellipses satisfying the foregoing conditions (6 - 2) and parallel to the x-axis (the common axis of the top view and the front view), and there exists a straight line segment having as its end points lower end points and parallel to the x-axis.

Each of at least two curved line segments (circles or ellipses) satisfying the conditions 2 of a torus is referred to as a "second segment for a supplemental line" of the torus.

For example, when the subject circle is a curved line segment g in FIG. 13a, a set of three orthographic views including the subject circle satisfies the conditions 1 and 2 of a torus, whereby a three-dimensional solid model restored from the set of three orthographic views including the subject circle is judged to be a torus.

The first segment for a supplemental line and the second segment for a supplemental line of the torus in a case where the subject peculiar point is a point s2 are respectively a curved line segment (an arc) jk indicated by a solid line and curved line segments (arcs) ab and dc indicated by a solid line. The first segment for a supplemental line and the second segment for a supplemental line of the torus in a case where the subject peculiar point is a point s4 are respectively a curved line segment (an arc) nm indicated by a solid line and curved line segments (arcs) ab and dc indicated by a solid line. The first segment for a supplemental line and the second segment for a supplemental line of the torus in a case where the subject peculiar point is a point sl are respectively a curved line segment (an arc) ab indicated by a solid line and curved line segments (arcs) jk and nm indicated by a solid line. The first segment for a supplemental line and the second segment for a supplemental line of the torus in a case where the subject peculiar point is a point s3 are respectively a curved line segment (an arc) dc indicated by a solid line and curved line segments (arcs) jk and nm indicated by a solid line.

[Knowledge related to a Sphere]

"If the following conditions 1 and 2 of a sphere are satisfied, a three-dimensional solid model restored from a set of three orthographic views including its subject circle is a sphere".

<Conditions 1 of a Sphere (conditions on the side view)>

The conditions 1 of a sphere are conditions to be satisfied by a segment which exists on the top view, and are logical AND of the following conditions (7 - 1) to (7 - 3).

(7 - 1) A circle (an arc) or an ellipse (an elliptic arc) exists on a side view.

(7 - 2) A corresponding point of the subject peculiar point S exists on the periphery of the circle (the arc) or the ellipse (the elliptic arc) which exists on the side view. That is, the circle or the ellipse is a corresponding circle or a corresponding ellipse of the subject peculiar point S.

(7 - 3) The center coordinates of the circle (the arc) or the ellipse (the elliptic arc) satisfying the foregoing conditions (7 - 2) are corresponding points of the center coordinates of the subject circle.

A curved line segment (a circle or an ellipse) satisfying the conditions 1 of a sphere is referred to as a "first segment for a supplemental line" of the sphere.

<Conditions 2 of a Sphere (conditions on the front view)>

The conditions 2 of a sphere are conditions to be satisfied by a segment which exists on the front view, and are the logical AND of the following conditions (8 - 1) to (8 - 3).

(8 - 1) A circle. (an arc) or an ellipse (an elliptic arc) exists on the front view.

(8 - 2) A corresponding point or points of either one or both of a left end point and a right end point of the subject peculiar point S exist(s) on the periphery of the circle (the arc) or the ellipse (the elliptic arc) which exists on the front view.

(8 - 3) The center point of the circle (the arc) or the ellipse (the elliptic arc) satisfying the foregoing conditions (8 - 2) is a corresponding point of the center point of the subject circle (the ellipse).

A curved line segment (a circle or an ellipse) satisfying the conditions 2 of a sphere is referred to as a "second segment for a supplemental line" of the sphere.

Figure 15A:
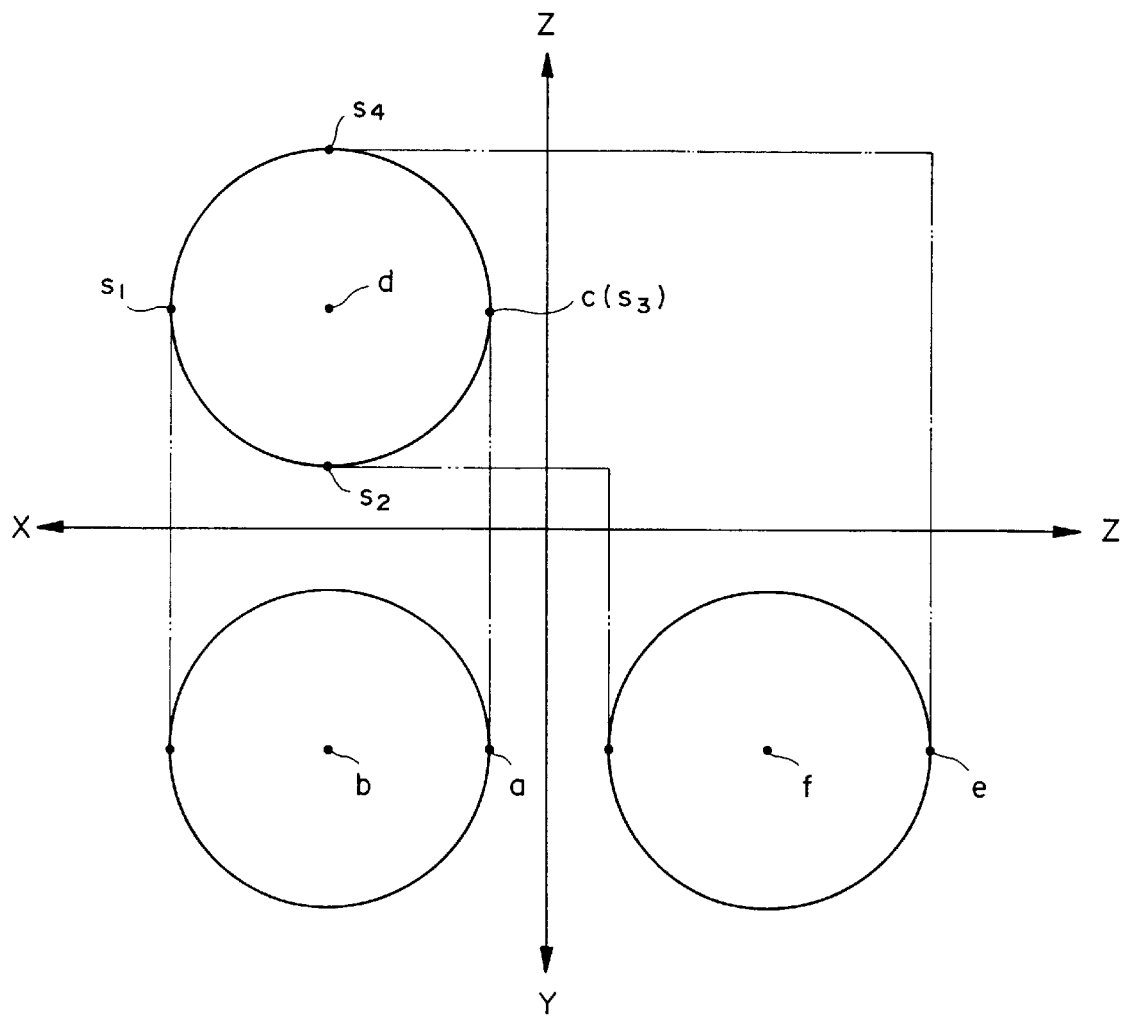
FIG. 15a illustrates a set of three orthographic views of a sphere.

For example, when the subject circle is a curved line segment c in FIG. 15a, a set of three orthographic views including the subject circle satisfies the conditions 1 and 2 of a sphere, whereby a three-dimensional solid model restored from the set of three orthographic views including the subject circle is judged to be a sphere.

The first segment for a supplemental line and the second segment for a supplemental line of the sphere in a case where the subject peculiar point is a point s2 or s4 are respectively a curved line segment (a circle) e and a curved line segment (a circle) a. The first segment for a supplemental line and the second segment for a supplemental line of the sphere in a case where the subject peculiar point is a point s1 or s3 (e) are respectively a curved line segment (a circle) a and a curved line segment (a circle) e.

[Knowledge related to a Tilted Circular Cylinder]

"If the following conditions 1 and 2 of a tilted circular cylinder are satisfied, a three-dimensional solid model restored from a set of three orthographic views including its subject ellipse or subject elliptic arc is a tilted circular cylinder".

<Conditions 1 of a Tilted Circular cylinder (conditions on the top view)>

The conditions 1 of a tilted circular cylinder are conditions to be satisfied by a segment which exists on the top view, and are the logical AND of the following conditions (9 - 1) to (9 - 2).

(9 - 1) There exists an ellipse (an elliptic arc) which is equal in the first radius and the second radius to a subject ellipse and differs in the center coordinates from the subject ellipse.

(9 - 2) A peculiar point or an end point of the subject ellipse and a peculiar point or an end point in the same position as a peculiar point or an end point of a subject ellipse in the ellipse satisfying the conditions (9 - 1) are connected by a straight line segment.

<Conditions 2 of a tilted Circular Cylinder (conditions on the front view or the side view)>

The conditions 2 of a tilted circular cylinder are conditions to be satisfied by a segment which exists on the front view or the side view, and are the logical AND of the following conditions (10 - 1) and (10 - 2).

(10 - 1) There exist at least two ellipses (elliptic arcs) which are equal in the first radius and the second radius and differs in the center coordinates.

(10 - 2) A peculiar point or an end point of one of the ellipses (the elliptic arcs) satisfying the foregoing conditions (10 - 1) and a peculiar point or an end point in the same position of the other ellipse are connected by a straight line segment.

For example, even when the subject ellipse is any one of a curved line segment ef (passing through a point s1) indicated by a solid line, a curved line segment ef (passing through a point s3) indicated by a broken line and a curved line segment g (g1g2) indicated by a solid line in FIG. 18a, a set of three orthographic views satisfies the conditions 1 and 2 of a tilted circular cylinder, whereby a three-dimensional solid model restored from the set of three orthographic views is judged to be a tilted circular cylinder.

1. 2 Processing in a three-dimensional solid model restoring apparatus

FIGS. 4 to 10 are flow charts showing the flow of processing in a three-dimensional solid model restoring apparatus according to a first embodiment.

It is first judged whether or not all the three views have been selected as views for determining a subject circle (a subject ellipse) (step 101). If all the views constituting the set of three orthographic views have not been selected (NO in step 101), one of the views is selected (step 102). The top view, the front view, and the side view are selected in this order.

Description is now made of processing in a case where a subject peculiar point is on the top view. If the subject peculiar point is on the front view, the top view and the front view in the following description may be respectively replaced with the front view and the top View. If the subject peculiar point is on the side view, the top view, the front view and the side view may be respectively replaced with the side view, the top view and the front view. Consequently, the description of processing in these cases will be omitted.

In the selected view ( the top view), a curved line segment (a circle, a circular arc, an ellipse, or an elliptic arc) is then searched (step 103). If the curved line segment is retrieved (YES in step 103), the retrieved curved line segment is determined as a subject circle or a subject ellipse, and one of peculiar points on the subject circle or the subject ellipse is selected as a subject peculiar point (step 105). Subject peculiar points in the positions of twelve o'clock, three o'clock, six o'clock and nine o'clock are selected in this order.

The shape of a three-dimensional solid model restored from the subject circle (ellipse) is then recognized on the basis of basic knowledge (step 106).

When as a result of the recognition, it is judged that the three-dimensional solid model restored from the set of three orthographic views including the subject circle is one of a circular cylinder, a circular cone, a torus, a sphere and a tilted circular cylinder (YES in any one of steps 107 to 111), a supplemental segment is created.

[Creation of a Supplemental Segment in the case of the Circular Cylinder (YES in step 107, step 113)]

In the circular cylinder, a supplemental segment is created on the view where a second segment for a supplemental line exists (the front view or the side view).

First, an area where a supplemental segment is to be created (a supplemental line area) R is determined on the view where the second segment for a supplemental line exists on the basis of a first segment for a supplemental line and the second segment for a supplemental line.

For example, when the subject peculiar point is a point s2 (whose coordinates are taken as (z0, x0)), the view where a second segment for a supplemental line exists is the front view, whereby a supplemental line area (which shall be R1 [x, y]) is determined on the front view.

The range in the y direction of the supplemental line area R1 [x, y] is determined as $y1 \leq y \leq y2$ on the basis of the y coordinates (the coordinates of the common axis (the y-axis) of the side view and the front view) of a first segment for a supplemental line op (the coordinates are taken as o (y1, z1) and p (y2, z1) ; y1<y2). Furthermore, the range in the x direction of the supplemental line area R1 [x, y] is determined as $x1 \leq x \leq x2$ on the basis of the x coordinates (the coordinates of the common axis (the x-axis) of the top view and the front view) of second segments for a supplemental line eg and fc (the coordinates are taken as g (x1, y1), e (x2, y1), c (x1, y2) and f (x2, y2) ; x1<x2).

Specifically, the supplemental line area R1 is an area enclosed by segments ef, fc, cg and ge. On the front view shown in FIG. 11b, an area indicated by hatching is the supplemental line area R1.

Figure 11B:
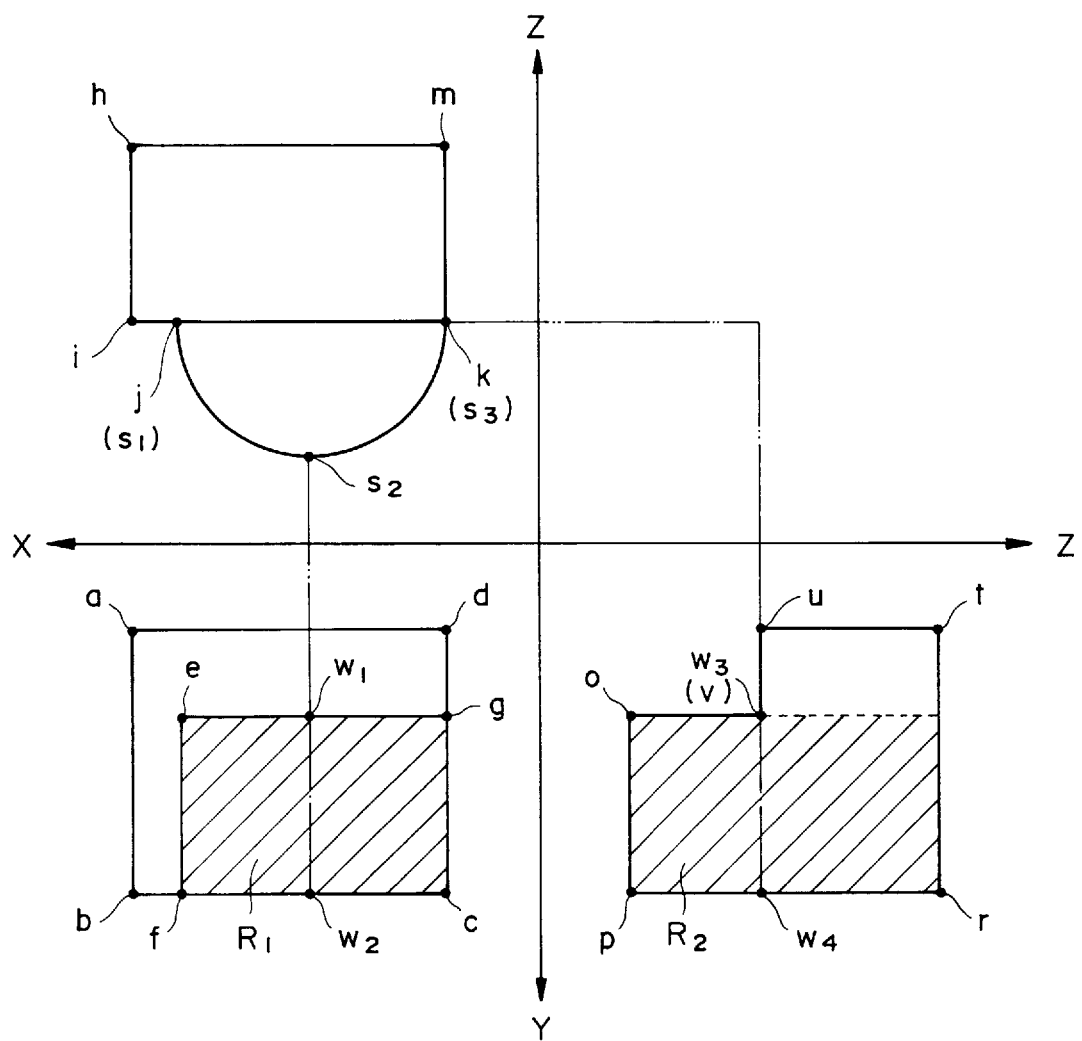

Next, a starting point and a terminating point of a supplemental segment are determined. The starting point and the terminating point are points, on a circumscribed segment of the area R1 (the segments ef, fc, cg and ge), having the same x coordinates as the x coordinate x (the coordinate of the common axis (the x-axis) of the top view and the front view) of the subject peculiar point s2. In FIG. 11b, a starting point w1 (x0, y1) and a terminating point w2 (x0, y2) are respectively determined on the straight line segments eg and fc. That is, an intersect point of the subject peculiar point s2 and its corresponding point o is determined as the point w1, and an intersect point of the subject peculiar point s2 and its corresponding point p is determined as the point w2.

Subsequently, a supplemental segment having the starting point w1 and the terminating point w2 as both its end points is created. A created supplemental segment w1w2 is indicated by a one dot-and-dash line in FIG. 11b.

Thereafter, processing as to the next supplemental peculiar point is performed (step 112).

When the subject peculiar point is a point s1 or s3, the view where a second segment for a supplemental line exists is the side view, whereby a supplemental line area is determined on the side view. In this area, a supplemental segment is created, similarly to the above described supplemental segment w1w2. On the side view shown in FIG. 11b, a supplemental line area R2 determined on the side view is indicated by hatching and a created supplemental segment w3w4 is indicated by a one dot-and-dash line.

[Creation of a Supplemental Segment in the case of the Circular Cone (YES in step 108, steps 114 and 115)]

In the case of the circular cone, supplemental segments are respectively created on the view where a second segment for a supplemental line exists (the front view or the side view) and the view where a subject peculiar point exists (the top view).

First, a supplemental line area is determined on the view where the second segment for a supplemental line exists in the same manner as in the case of the circular cylinder. For example, when the subject peculiar point is a point s2 or x6 (or s4 or s8) (whose coordinates are taken as (z0, x0)), a supplemental line area (which shall be R3 [x, y]) is determined on the front view.

The range in the y direction of the supplemental line area R3 [x, y] is determined as $y1 \leq y < y2$ on the basis of the y coordinates (the coordinates of the common axis (the y-axis) of the side view and the front view) of a first segment for a supplemental line jk (or nm) (the coordinates are taken as j (y1, z1) and k (y2, z1) ; y1<y2).

Furthermore, the range in the x direction of the supplemental line area R3 [x, y] is determined on the basis of the x coordinates (the coordinates of the common axis (the x-axis) of the top view and the front view) of either one of second segments for a supplemental line ad and bc (the coordinates are taken as a (x4, y1), d (x3, y1), b (x2, y2) and c (x1, y2) ; x1<x3<x4<x2). If the number of second segments for a supplemental line is one, the range in the x direction of the supplemental line area is determined on the basis of this one segment.

When the range in the x direction of the supplemental line area is determined on the basis of the segment bc, x1≦x≦x2 holds. On the front view shown in FIG. 12b, an area indicated by hatching is the supplemental line area R3.

Figure 12B:
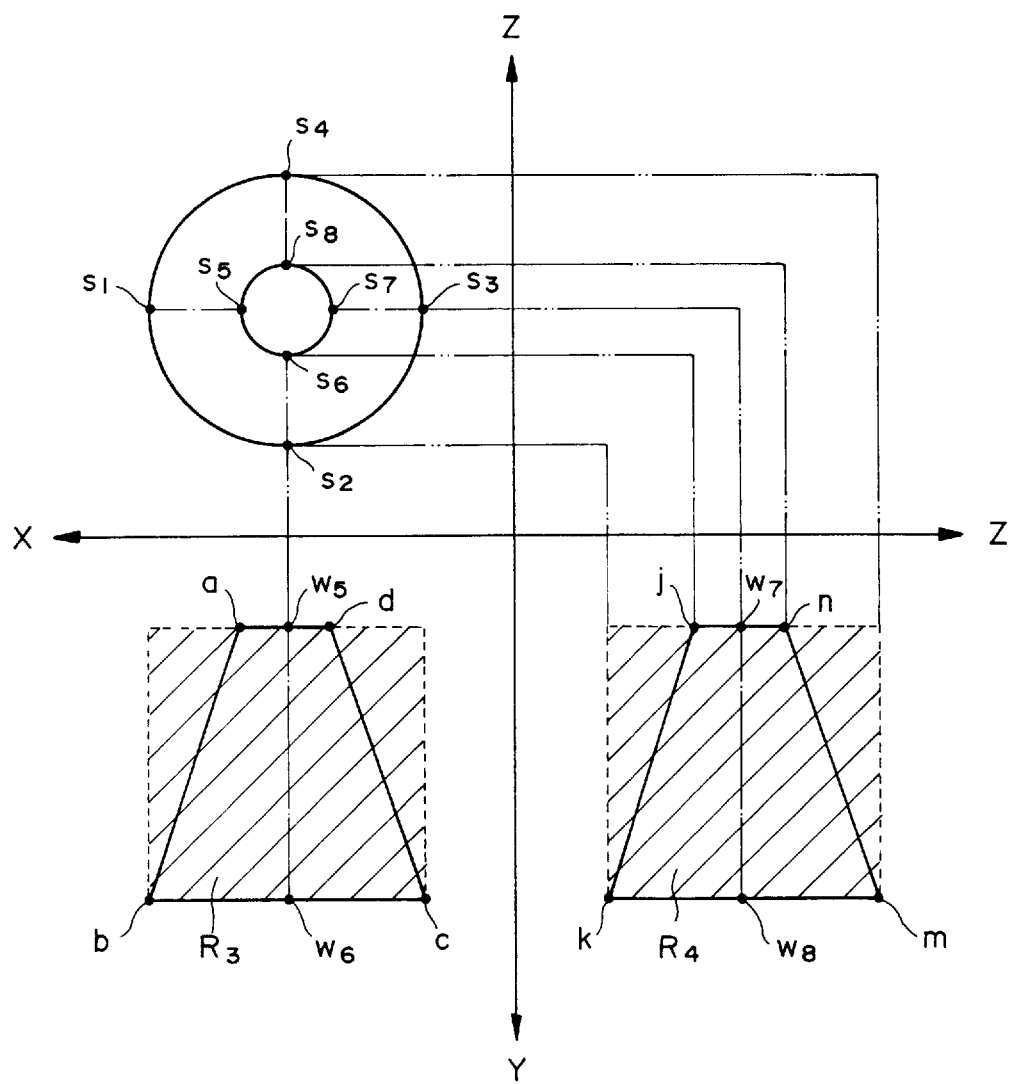

Next, a starting point and a terminating point of a supplemental segment are determined. The starting point and the terminating point are points, on a circumscribed segment of the determined supplemental line area R3, having the same x coordinates as the x coordinate x0 (the coordinate of the common axis (the x-axis) of the top view and the front view) of the subject peculiar point s2 or s6 (s4 or s8). In FIG. 12b, a starting point w5 (x0, y1) and a terminating point w6 (x0, y2) are respectively determined on the straight line segments ad and bc. That is, an intersect point of the subject peculiar point s2 and its corresponding point k is determined as the point w6, and an intersect point of the subject peculiar point s6 and its corresponding point j is determined as the point w5.

Subsequently, a supplemental segment having the determined starting point w5 and terminating point w6 as both its end points is created. On the front view shown in FIG. 12b, the supplemental segment w5w6 created in the supplemental line area R3 is indicated by a one dot-and-dash line.

Corresponding points (s2 and s6, or s4 and s8) on the top view of both end points of the first segment for a supplemental line (jk or nm) are then determined as both end points of a supplemental segment on the top view. The supplemental segment is created between both the end points. For example, when the first supplemental segment is the segment jk (the subject peculiar point is the point s2 or s6), the supplemental segment is created between the respective corresponding points s6 and s2 of both the end points j and k. On the other hand, when the first segment for a supplemental line is the segment nm (the subject peculiar point is the point s4 or s8), the supplemental segment is created between the respective corresponding points s8 and s4 of both the end points n and m. On the top view shown in FIG. 12b, created supplemental segments s2s6 and s4s8 are indicated by a one dot-and-dash line.

Similarly, when the subject peculiar point is a point s1 or s5 or s3 or s7, a supplemental segment w7w8 and supplemental segments s1s5 and s3s7 are respectively created on the side view and the top view.

[Creation of a Supplemental Segment in the case of the Torus (YES in step 109, steps 116 and 117)]

In the case of the torus, supplemental segments are respectively created on the view where a second segment for a supplemental line exists (the front view or the side view) and the view where a subject peculiar point exists (the top view).

A supplemental line area is first determined on the view where the second segment for a supplemental line exists on the basis of a first segment for a supplemental line and the second segment for a supplemental line in the same manner as in the case of the circular cylinder and the circular cone, and a supplemental segment having corresponding points of the subject peculiar point on a circumscribed segment of the supplemental line area as a starting point and a terminating point is created.

For example, when the subject peculiar point is a point s2 in FIG. 13a, a supplemental line area (which shall be R5 [x, y]) is determined on the front view.

The range in the y direction of the supplemental line area R5 [x, y] is determined as y1≦y≦y2 on the basis of the y coordinates (the coordinates of the common axis (the y-axis) of the side view and the front view) of a first segment for a supplemental line jk (a circle indicated by a solid line) (the coordinates are taken as j (y1, z1) and k (y2, z1) ; y1<y2).

Furthermore, the range in the x direction of the supplemental line area R5 [x, y] is determined as x2≦x≦x1 on the basis of the x coordinates (the coordinates of the common axis (the x-axis) of the top view and the front view) of a left end point (which shall be a point w13 (x1, y1)) of a second segment for a supplemental line ab (a circle indicated by a solid line) on which a corresponding point of a left end point (s1) of a subject circle exists and a right end point (which shall be a point w14 (x2, y1) ; x2<x1) of a second segment for a supplemental line dc (a circle indicated by a solid line) on which a corresponding point of a right end point g of the subject circle exists.

Figure 13B:
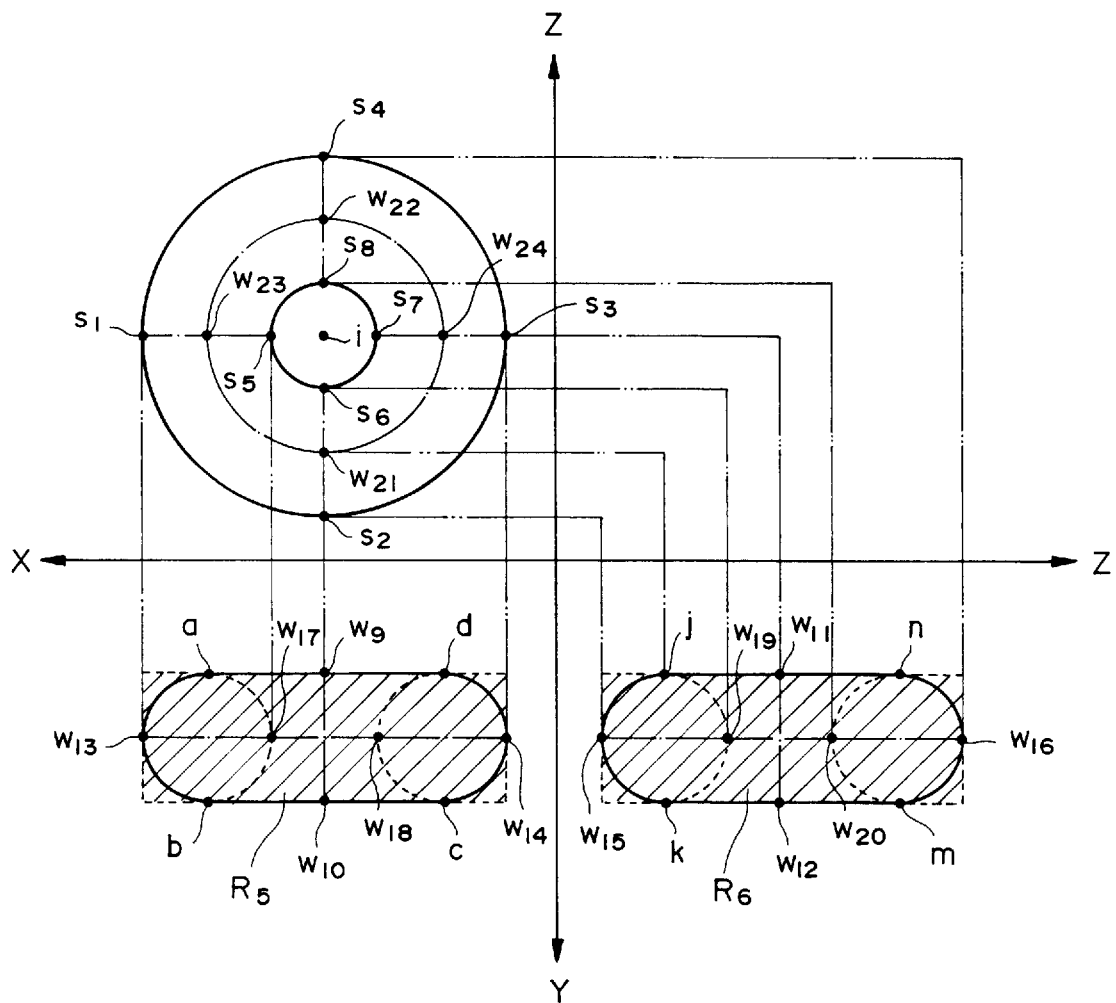

On the front view shown in FIG. 13b, the supplemental line area R5 thus determined is indicated by hatching.

When the subject peculiar point is a point s4, a supplemental line area is determined in the same range as the area R5 on the basis of a first segment for a supplemental line nm (a circle indicated by a solid line) and the second segments for a supplemental line ab (a circle indicated by a solid line) and dc (a circle indicated by a solid line).

Similarly, when the subject peculiar point is a point s6, a supplemental line area is determined on the basis of a first segment for a supplemental line jk (a circle indicated by a broken line) and the second segments for a supplemental line ab (a circle indicated by a broken line) and dc (a circle indicated by a broken line). When the subject peculiar point is a point s8, a supplemental line area is determined on the basis of a first segment for a supplemental line nm (a circle indicated by a broken line) and the second segments for a supplemental line ab (the circle indicated by a broken line) and dc (the circle indicated by a broken line).

A starting point and a terminating point of a supplemental segment are then determined. The starting point and the terminating point are points, on a circumscribed segment of the determined supplemental line area R5, having the same x coordinates as the x coordinate x0 (the coordinate of the common axis (the x-axis) of the top view and the front view) of the subject peculiar point s2 or s6 (or s4 or s8). On the front view shown in FIG. 13b, a starting point w9 (x0, y1) and a terminating point w10 (x0, y2) are respectively determined on straight line segments ad and bc.

Subsequently, a supplemental segment having the determined starting point w9 and terminating point w10 as both its end points is created. In FIG. 13b, the supplemental segment w9w10 created in the supplemental line area R5 is indicated by a one dot-and-dash line.

Similarly, when the subject peculiar point is a point s1 or s3 (or s5 or s7), a supplemental line area R6 is determined on the side view, whereby a supplemental segment w11w12 is created.

Furthermore, when the subject peculiar point is the point s2 or s4, a supplemental segment having the corresponding point w13 on the front view of the left end point (s1) of the subject circle and a corresponding point w14 on the front view of the right end point (s3) of the subject circle as both its end points is created on the front view. When the subject peculiar point is the point s1 or s3, a supplemental segment having a corresponding point w16 on the side view of the upper end point (s4) of the subject circle and a corresponding point w15 on the side view of the lower end point (s7) of the subject circle as both its ends is created on the side view. Similarly, when the subject peculiar point is the point s6 or s8 and the point s5 or s7, a supplemental segment w17w18 and a supplemental segment w19w20 are respectively created.

A supplemental segment is then created on the view where the subject peculiar point exists (the top view).

When the subject peculiar point is the point s2, a supplemental segment s2w21 having a point (w21) and the subject peculiar point s2 as both its end points is created, the point (w21) being on a segment connecting the subject peculiar point s2 and the center point i of the subject circle and corresponding to an upper end point (j) and a lower end point (k) of a corresponding circle (the curved line segment jk indicated by a solid line) of the subject peculiar point on the side view.

Similarly, when the subject peculiar point is the point s6, a supplemental segment s6w21 is created. Similarly, when the subject peculiar point is the points s4 and s8, supplemental segments s4w22 and s8w22 are also respectively created. Similarly, when the subject peculiar point is the points s1, s5, s3 and s7, supplemental segments s1w23, w23s5, s7w24 and w24s3 are respectively created.

Furthermore, in a case where both or either of the upper end point j and the lower end point k on the corresponding circle jk (the circle indicated by a solid line) of the subject peculiar point s2 exist in the position of a peculiar point of the circle (the position of twelve o'clock or six o'clock) (both of the points j and k are peculiar points in FIG. 13b), a circle (a curved line segment w24 indicated by a one dot-and-dash line) passing through the corresponding point w21 of a point in the position of the peculiar point (both the points j and k in FIG. 13b) and concentric with the subject circle is created as a supplemental segment on the view where the subject peculiar point exists (the top view). The same is true for cases where the subject peculiar point is the points s1, s3, s4, s5, s6, s7 and s8 (in FIG. 13b, a curved line segment (a circle) w24 indicated by a one dot-and-dash line is created as to any of the peculiar points).

[Creation of a Supplemental Segment in a case where the Circular Cylinder is smoothly connected to the Torus]

FIG. 14 illustrates a set of three orthographic views of a three-dimensional solid model in which a torus is cut and a tilted circular cylinder is smoothly connected to its cut face.

A three-dimensional solid model restored from curved line segments ef and gh is a torus. A three-dimensional solid model restored from straight line segments fi, ij and jh is a tilted circular cylinder.

Supplemental segments v1v8, v9v11, v10v12, v14v15, and v13v7 of a straight line are created as supplemental segments in the tilted circular cylinder as described later. A supplemental segment v1v2 of a circle (an arc) and supplemental segments s1s4, s2s5, v3v4, v3v9, v5v6 and v5v13 of a straight line are created as supplemental segments in the above described torus.

In this solid, neither or one of two end points of a subject circle (ef or gh) on the top view exists in the position of a peculiar point (twelve o'clock, three o'clock, six o'clock or nine o'clock). For example, one end point f of the subject circle ef is not in the position of the peculiar point. One end point h of the subject circle gh is not also in the position of the peculiar point.

If neither or one of the end points of the subject circle exists in the position of the peculiar point, therefore, the following supplemental segment is created in addition to the supplemental segment created in the above described torus.

On the front view, a supplemental segment v10 of an ellipse (a starting point and a terminating point are the same point v10) passing through three points v9, v10 and u2 is created. The point v9 is found as an intersect point of a corresponding point (v5) on the side view of a subject peculiar point s2 and an end point (f) which does not exist in the position of the peculiar point in the subject circle. The point v10 is found as an intersect point of the corresponding point (v5) on the side view of the subject peculiar point s2 and an end point (h) which does not exist in the position of the peculiar point in the circle (gh) concentric with the subject circle. The point u2 is found as an intersect point of an end point (v1) which does not exist in the position of the peculiar point in the created supplemental segment v1v2 and a corresponding point u6 on the side view of the end point (v1).

Also on the side view, a supplemental segment v13 of an ellipse (a starting point and a terminating point are the same point v13) passing through three points v13, v14 and u6 is created, in the same manner as on the front view. The point v13 is found as an intersect point of a corresponding point (v3 (or v4)) on the front view of a subject peculiar point s1 (or s3) and an end point (f) which does not exist in the position of the peculiar point in the subject circle. The point v14 is found as an intersect point of the corresponding point (v3 (or v4)) on the front view of the subject peculiar point s1 (or s3) and an end point (h) which does not exist in the position of the peculiar point in the circle (gh) concentric with the subject circle. The point u6 is found as an intersect point of the end point (v1) which does not exist in the position of the peculiar point in the created supplemental segment v1v2 and a corresponding point u2 on the front view of the end point (v1).

Even when a circular cylinder (a three-dimensional solid model represented by points i, j, f and h on the top view) is not connected to the cut face of the torus (a face represented by the created supplemental segment of the ellipse) (a three-dimensional solid model in which the torus is only cut halfway), the above described supplemental segment of the ellipse is created on the front view and the side view. In this case, the cut face of the torus is indicated by a solid line or a broken line (a hidden line) in the set of three orthographic views, whereby a one dot-and-dash line is created with it being overlapped with the solid line or the broken line. When the three-dimensional solid model is restored, however, the three-dimensional solid model is restored on the basis of the solid line or the broken line in a portion where the one dot-and-dash line and the solid line or the broken line are overlapped with each other, whereby no problem arises even if the one dot-and-dash line is created with it being overlapped with the solid line or the broken line.

[Creation of a Supplemental Segment in the case of the Sphere (YES in step 110, steps 118 and 119)]

In the case of the sphere, supplemental segments are respectively created on the view where a second segment for a supplemental line exists (the front view or the side view) and the view where a subject peculiar point exists (the top view).

A supplemental line area is first determined on the view where a second segment for a supplemental line exists. For example, in FIG. 15b, when the subject peculiar point is a point s2 or s4, a supplemental line area (which shall be R7 [x, y]) is determined on the front view.

The range in the y direction of the supplemental line area R7 [x, y] is determined as (y1−r)≦y≦(y1+r) on the basis of the y coordinate (y1−r) (the coordinate of the common axis (the y-axis) of the side view and the front view) of an upper end point of a first segment for a supplemental line (a circle) e (the coordinates are taken as e (y1, z1), and the radius is taken as r) and the y coordinate (y1+r) of a lower end point thereof.

Furthermore, the range in the x direction of the supplemental line area R7 [x, y] is determined as x1≦x≦(x1+2·r) on the basis of the x coordinate x1 (the coordinate of the common axis (the x-axis) of the top view and the front view) of a left end point of a second segment for a supplemental line (a circle) a (the coordinates are taken as a (x1, y1), and the radius is taken as r) and the x coordinate (x1+2·r) of a right end point thereof.

Figure 15B:
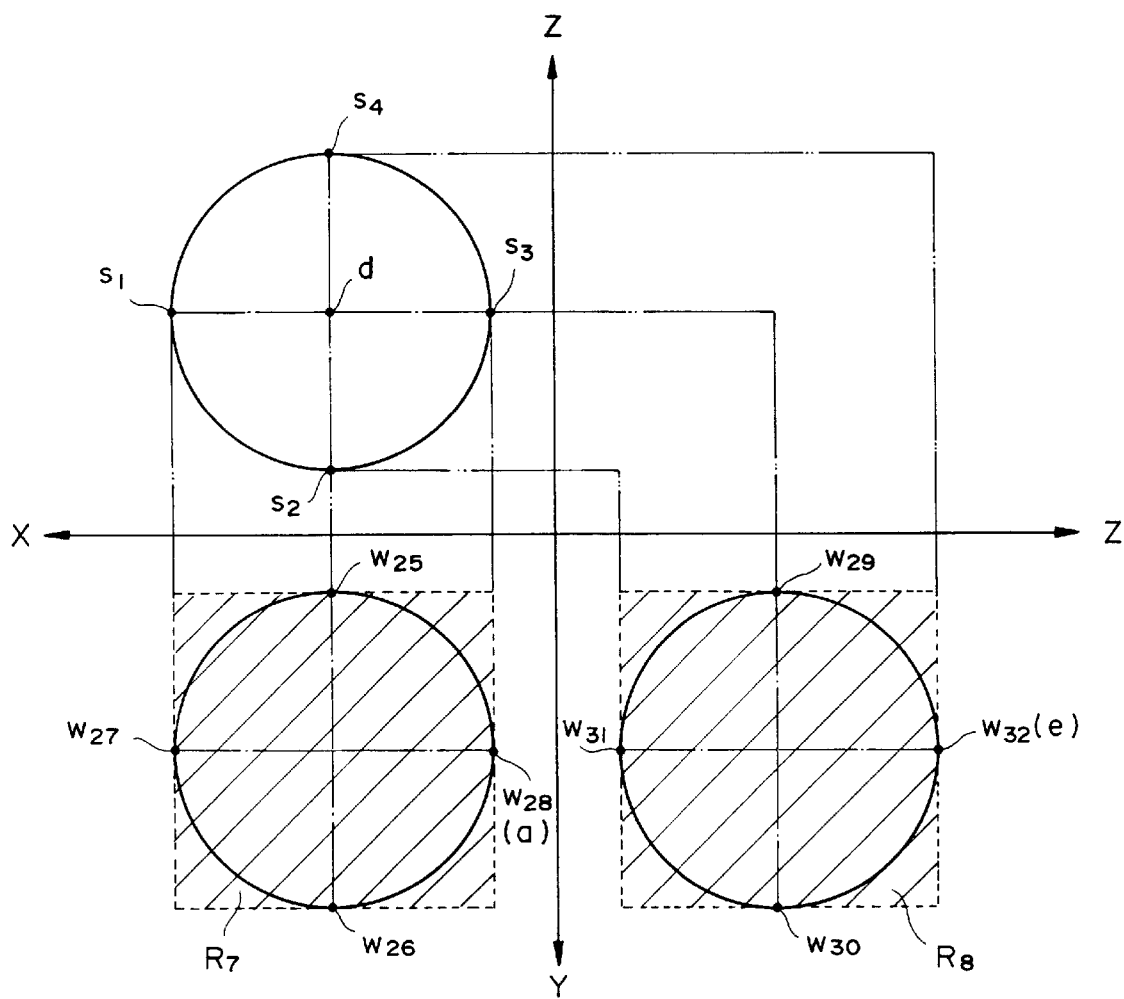

On the front view shown in FIG. 15b, an area indicated by hatching is the supplemental line area R7.

A starting point and a terminating point of a supplemental segment are then determined. The starting point and the terminating point are points, on a circumscribed determined supplemental line area R7, having the same x coordinate as the x coordinate x0 (the coordinate of the common axis (the x-axis) of the top view and the front view) of the subject peculiar point s2 (or s4). In FIG. 15b, a point w25 (x0, y1−r) and a point w26 (x0, y1+r) are respectively determined as the starting point and the terminating point of the supplemental segment. Further, corresponding points w28 and w27 on the front view with respect to a point (w31) on the side view, which is a corresponding point of the subject peculiar point s2, on the circumscribed segment of the supplemental line area R7 are determined as both end points of the supplemental segment.

Subsequently, a supplemental segment is created between both the determined end points. In FIG. 15b, supplemental segments w25w26 and w27w28 created in the supplemental line area R7 are indicated by a one dot-and-dash line.

Similarly, when the subject peculiar point is a point s1 (or s3), a supplemental line area R8 on the side view is determined on the basis of a first segment for a supplemental line (a circle) a and a second segment for a supplemental line (a circle) e. In this supplemental line area R8, supplemental segments w29w30 and w31w32 are respectively created.

A supplemental segment is then created on the view where the subject peculiar point exists (the top view).

When the subject peculiar point is the point s2 (six o'clock) (or s4 (twelve o'clock)), a supplemental segment s2d (or s4d) having as both its end points the subject peculiar point s2 (or s4) and a point (the center point d of the sphere in FIG. 15b) is created, the latter point being on a straight line connecting the subject peculiar point and the center point of its subject circle and corresponding in the top view to an upper end point (w29) (or a lower end point (w30)) of the corresponding circle (the carved line segment e) of the subject peculiar point on the side view.

When the subject peculiar point is the point s1 (nine o'clock) (or s3 (three o'clock)), a supplemental segment s1d (or s3d) having as both its end points the subject peculiar point s1 (or s3) and a point (the center point d of the sphere in FIG. 15b) is created, the latter point being on a straight line connecting the subject peculiar point and the center point of its subject circle and corresponding in the top view to a left end point (w31) (or a right end point (w32)) of the corresponding circle (the curved line segment e) of the subject peculiar point on the side view.

If neither or one of the two end points of the subject circle exists in the position of the peculiar point, and the upper end point or the lower end point of the corresponding circle of the subject peculiar point (a corresponding circle on the side view in a case where the subject peculiar point is in the position of twelve o'clock or six o'clock, or a corresponding circle on the front view in a case where the subject peculiar point is in the position of three o'clock or nine o'clock) is the peculiar point in the position of twelve o'clock or six o'clock, a supplemental segment having both its end points an end point which is not in the position of the peculiar point of the subject circle and the center point of the subject circle is created.

If neither or one of the two end points of the subject circle exists in the position of the peculiar point, and neither of the upper end point and the lower end point of the corresponding circle of the subject peculiar point (a corresponding circle on the side view in a case where the subject peculiar point is in the position of twelve o'clock or six o'clock, or a corresponding circle on the front view in a case where the subject peculiar point is in the position of three o'clock or nine o'clock) is a peculiar point in the position of twelve o'clock or six o'clock, a supplemental segment having as both its end points the two end points of the subject circle is created.

[Creation of a Supplemental Segment in a case where another solid is smoothly connected to the Sphere]

Figure 16:
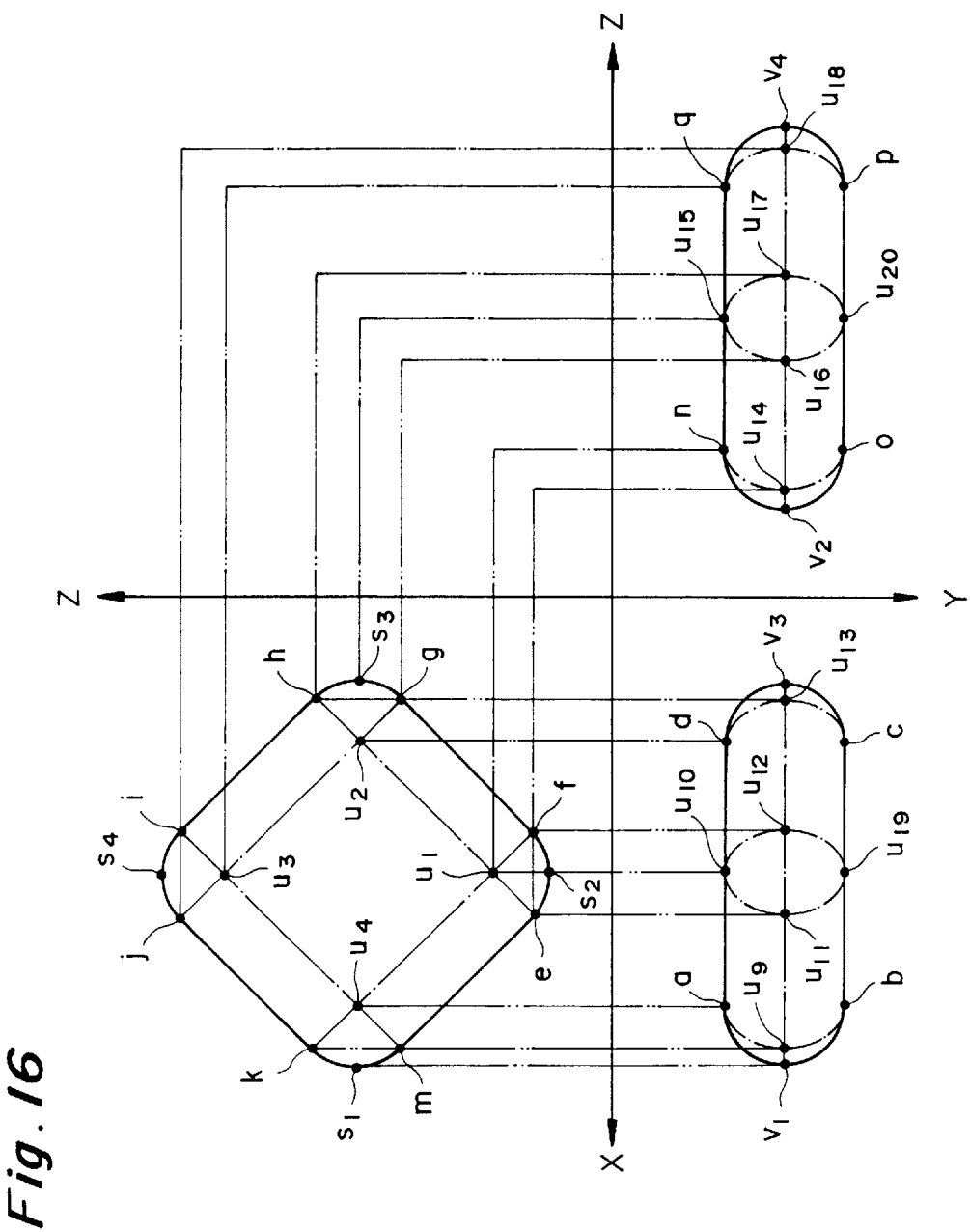
FIG. 16 illustrates a set of three orthographic views of a solid which is a combination of a rectangular solid, a sphere and circular cylinder.

FIG. 16 illustrates a set of three orthographic views of a three-dimensional solid model constructed by respectively smoothly connecting circular cylinders whose bottom faces are a semi-circle to four side faces of a rectangular solid obliquely arranged and smoothly connecting quarters of sphere to four square portions. The quarter of sphere is obtained by dividing the sphere into four equal divisions by planes passing through the center of the sphere and orthogonal to each other.

The three-dimensional solid model restored from each of circles (arcs) of curved line segments ef, gh, ij and km is a quarter of sphere. The three-dimensional solid model restored from each of the generators of straight line segments fg, hi, jk and me is a circular cylinder whose bottom face is a semi-circle. A figure of a portion enclosed by supplemental segments u1u2, u2u3, u3u4 and u4u1 is a rectangular solid.

The supplemental segments u1u2, u2u3, u3u4 and u4u1 are created as supplemental segments of the tilted circular cylinder as described later. Supplemental segments eu1, fu1, gu2, hu2, iu3, ju3, ku4 and mu4 are created as supplemental segments of the above described sphere.

In such a solid, neither or one of two end points of a subject circle (neither of end points e and f of the subject circle ef in FIG. 16) exists in the position of a peculiar point (conditions (a)), and a straight line segment (including a supplemental segment) exists between the end point which is not in the position of the peculiar point and the center point of the sphere (the subject circle) (conditions (b)). For example, when the subject circle is the circle (an arc) ef, neither of the end points e and f is in the position of the peculiar point, and the supplemental segments eu1 and fu1 exist respectively between both the end points e and f and the center point u1 of the subject circle. The same is true for a case where the subject circle is the circles gh, ij and km.

If the subject circle satisfies the foregoing conditions (a) and (b), the following supplemental segments are respectively created on the front view and the side view.

When the subject peculiar point is a point s2 (six o'clock), a point u11 on a supplemental segment v1v3 on the front view and corresponding to the end point e which is not in the position of the peculiar point on the subject circle is determined. In addition, an intersect point u10 of the center point u1 of the subject circle and its corresponding point n on the side view, and an intersect point u19 of the center point u11 and its corresponding point o on the side view are respectively determined. A supplemental segment u10u19 (passing through u11) of an ellipse passing through these three points is created. Similarly, a supplemental segment u10u19 (passing through u12) of an ellipse is created with respect to the end point f.

Even when the subject peculiar point is a point s4, supplemental segments u10u19 (passing through u11) and u10u19 (passing through u12) of an ellipse are similarly created on the front view, respectively, with respect to end points j and i.

On the side view, when the subject peculiar point is s2, a supplemental segment no (passing through u14) of an ellipse passing through three points, that is, an intersect point u14 of the end point e which is not in the position of the peculiar point in the subject circle and its corresponding point u11 on the front view, a corresponding point n on the side view of the center point u1 of the subject circle, and a corresponding point o on the side view of the center point ul of the subject circle is created.

When the subject peculiar point is s4, a supplemental segment pq (passing through u18) of an ellipse is similarly created.

When the subject peculiar point is s1 and s3, supplemental segments u15u20 (passing through u16) and u15u20 (passing through u17) of an ellipse and supplemental segments ab (passing through u9) and cd (passing through u13) of an ellipse are similarly created, respectively, on the side view and the front view.

Figure 17:
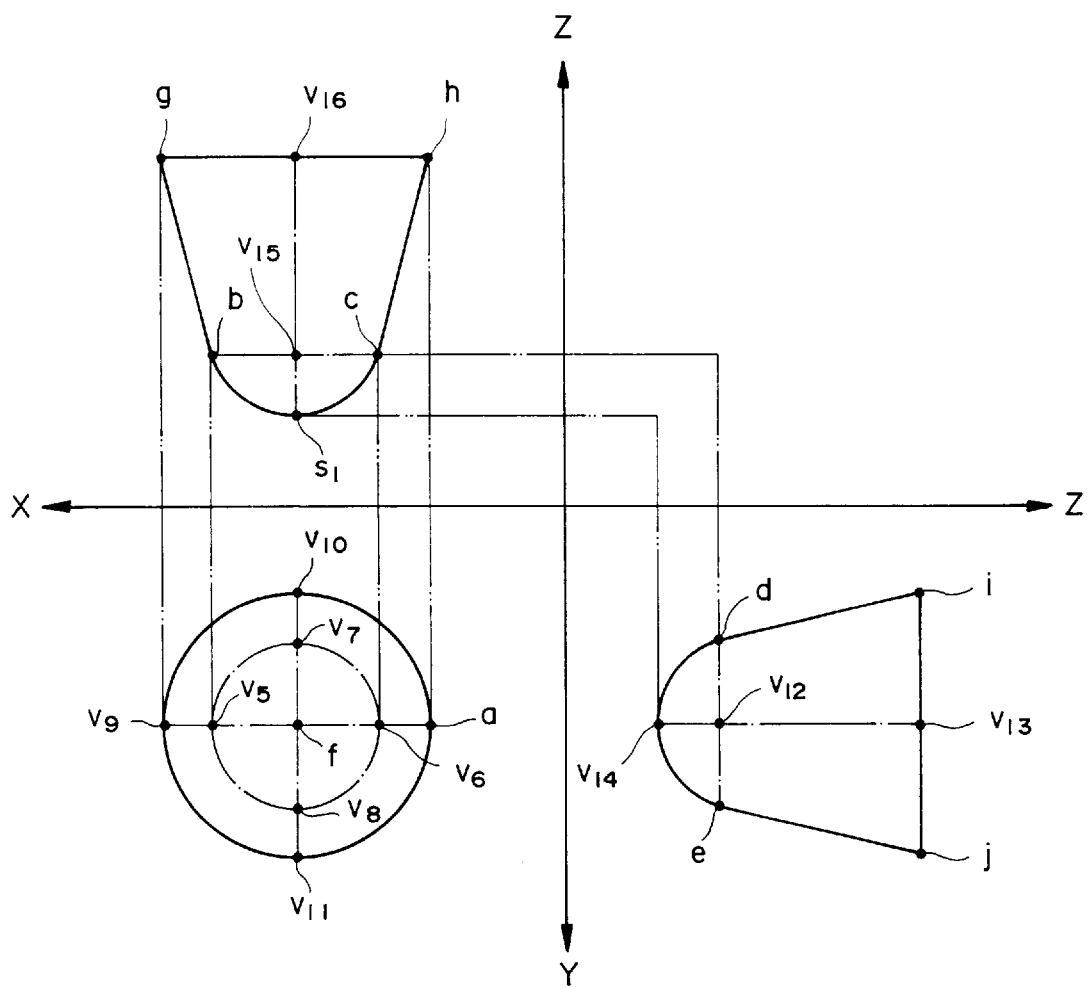
FIG. 17 illustrates a set of three orthographic views of a solid which is a combination of a sphere and a circular cone.

FIG. 17 illustrates a set of three orthographic views of a three-dimensional solid model in which a circular truncated cone is smoothly connected to a spherical segment of one base.

Supplemental segments v15v16, v6a, v7v10, v5v9, v8v11 and v12v13 are created as supplemental segments of the above described circular cone. The supplemental segments bc, s1v15, v9v6, v7v8, ed and v12v14 are created as supplemental segments of the above described sphere.

In such a solid, end points b and c of a subject circle bc on the top view are not in the position of a peculiar point, and no straight line segment (including a supplemental segment) exists between each of the end points b and c and the center point of the subject circle bc.

In such a case, a supplemental segment v6 (a starting point v6 and a terminating point v6) having the length of the supplemental segment bc (or de) as its diameter and concentric with a curved line segment (a circle) a (a first segment for a supplemental segment or a second segment for a supplemental segment) is created on the front view.

[Creation of a Supplemental Segment in the case of the Tilted Circular Cylinder (YES in step 111, steps 120 and 121)]

In the case of the tilted circular cylinder, the coordinates are so transformed that the tilted circular cylinder becomes a circular cylinder in the set of three orthographic views. That is, the y coordinate, the x coordinate and the z coordinate are respectively transformed into the y1 coordinate, the x1 coordinate and the z1 coordinate so that a tilted circular cylinder shown in FIG. 18a becomes a circular cylinder shown in FIG. 18b.

Let r1 and r2 be the length of the shorter principal axis and the longer principal axis out of the principal axes of an ellipse on the top view. The angle of rotation e for the coordinate transformation is found in the following manner:

$$\theta = \cos^{-1}(r1/r2)$$

The transformation from the x coordinate to the x1 coordinate, the transformation from the y coordinate to the y1 coordinate, and the transformation from the z coordinate to the z1 coordinate in each of the views are respectively performed on the basis of the following equations:

$$x1 = x \cdot \cos\theta$$

$$y1 = y \cdot \sin\theta$$

$$z1 = z$$

Consequently, the tilted circular cylinder is converted into a circular cylinder in a z1 - x1 plane (the top view), an x1 - y1 plane (the front view) and a y1 - z1 plane (the side view) (see FIG. 18b). In the set of three orthographic views, creation processing of supplemental segments in the above described circular cylinder is performed. Thereafter, the coordinates are returned again to the original coordinates by inverse transformation of the above described transformation. When the coordinates are returned to the original coordinates by the inverse transformation, a supplemental segment is also created between peculiar points opposed to each other with the center point o (or p) interposed therebetween on the top view. That is, supplemental segments are respectively created between peculiar points s1 and s5, between peculiar points s3 and s7, between peculiar points s4 and s8, and between peculiar points s2 and s6.

Figure 19:
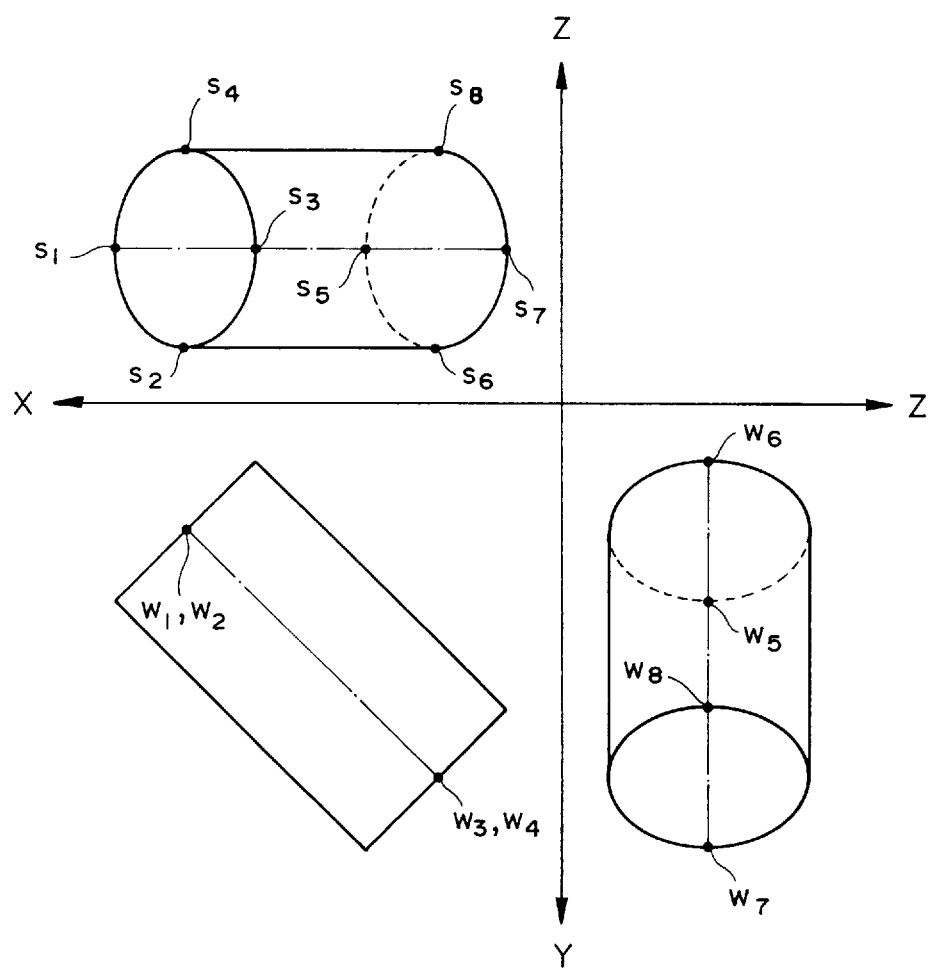

The supplemental segments are thus created in the tilted circular cylinder. The tilted circular cylinder in which the supplemental segments are created is illustrated in FIG. 19 (supplemental segments s4sB and s2s6 are not indicated because they are overlapped with solid lines).

Processing in the foregoing steps 105 to 121 is performed as to all peculiar points in each of the views, to create supplemental segments. When creation processing of the supplemental segments in each of the views has been completed (YES in step 101), a three-dimensional solid model is restored (step 122). The processing has been completed. Restoring processing of the three-dimensional solid model is described in detail in Japanese Patent Application Laid-open (Kokai) No. 6-52264 mentioned before and hence, the description thereof is not repeated.

2. Second Embodiment

In a second embodiment, a three-dimensional solid model is recognized on the basis of basic knowledge, after which it is judged whether or not a supplemental segment should be created in the portion determined in the first embodiment on the basis of auxiliary knowledge, to create the supplemental segment.

2.1 System Configuration

Figure 20:
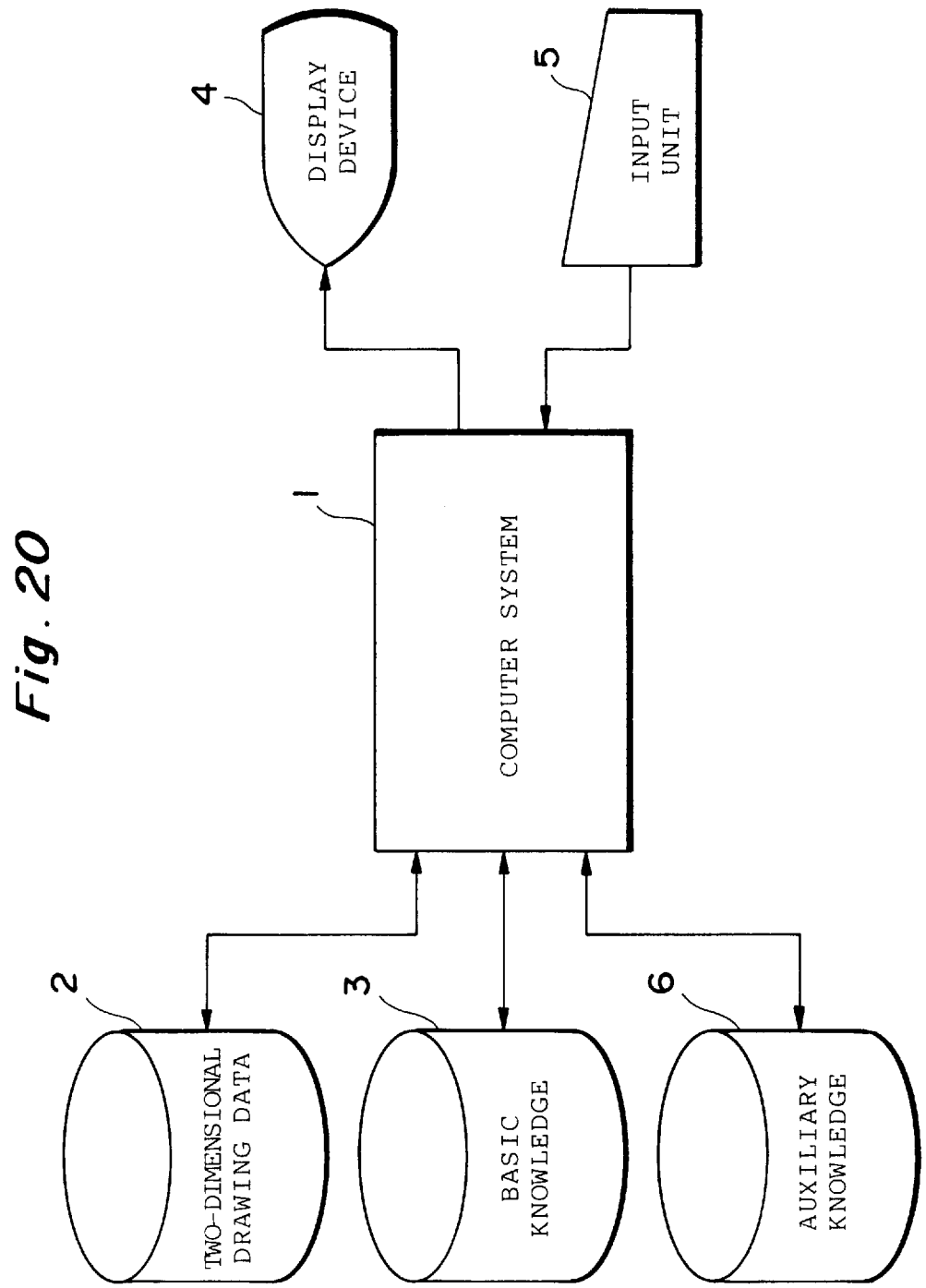
FIG. 20 is a block diagram showing the construction of a three-dimensional solid model restoring apparatus in a second embodiment.

FIG. 20 is a block diagram showing the construction of a three-dimensional solid model restoring apparat us in the second embodiment. The same portions as those in the three-dimensional solid model restoring apparatus shown in FIG. 1 (in the first embodiment) are assigned the same reference numerals.

The three-dimensional solid model restoring apparatus shown in FIG. 20 differs from the three-dimensional solid model restoring apparatus shown in FIG. 1 in that an auxiliary knowledge storage device (a magnetic disk storage device, an optical disk storage device, or the like) 6 is connected to a computer system 1.

The auxiliary knowledge storage device 6, a two-dimensional drawing data storage device 2 and a basic knowledge storage device 3 can be realized by one storage device.

Auxiliary knowledge is stored in the auxiliary knowledge storage device 6. The auxiliary knowledge is knowledge for judging whether or not a supplemental segment should be created in a supplemental line area which is determined on the basis of a first segment for a supplemental line and a second segment for a supplemental line in the above described basic knowledge.

Figure 30A:
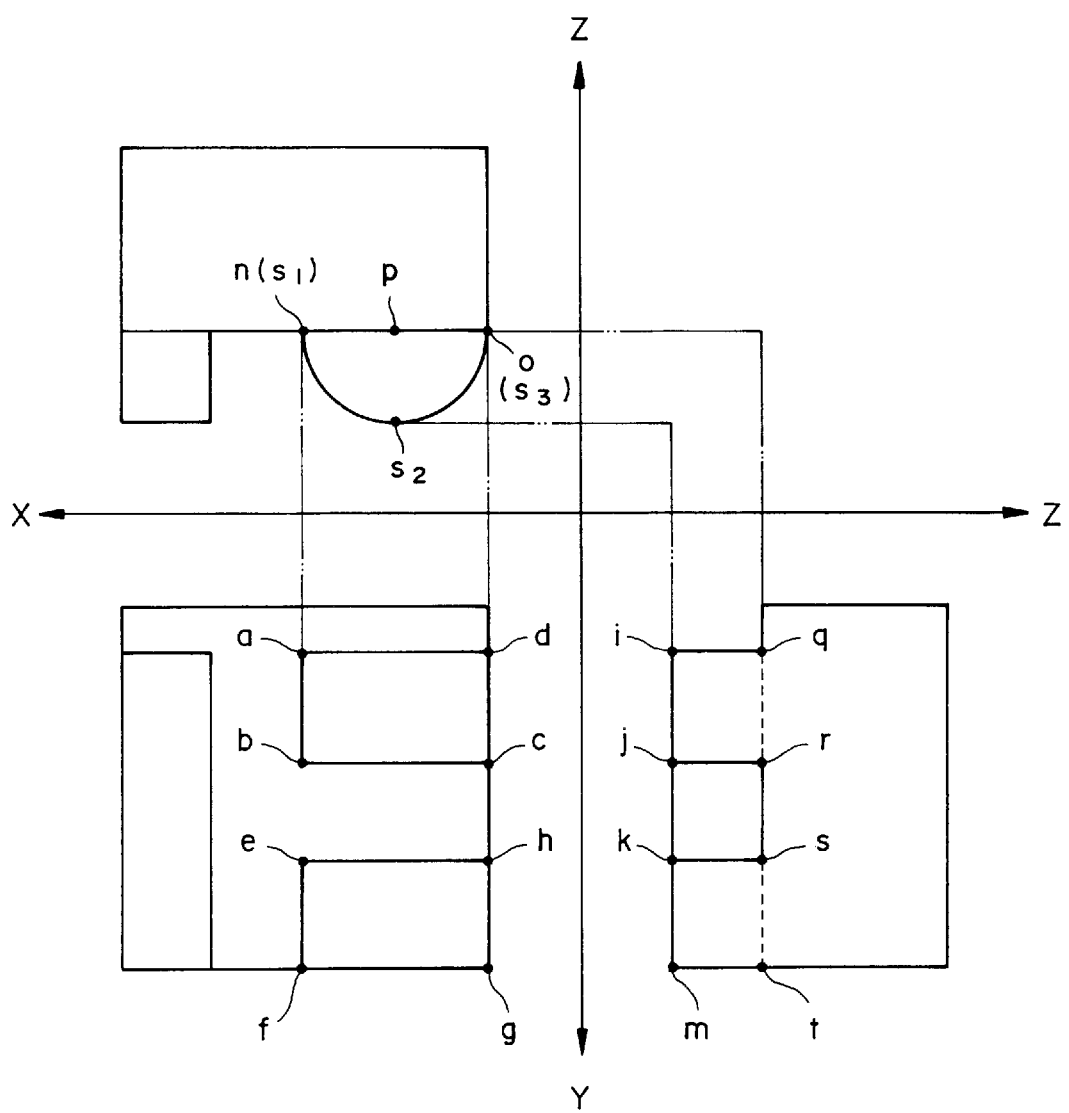
FIG. 30a is a set of three orthographic views of a solid including a circular cylinder.

If the supplemental segment is created on the basis of the first segment for a supplemental line and the second segment for a supplemental line in the above described basic knowledge, there are cases where an unnecessary supplemental segment is created or a necessary supplemental segment is not be created. Examples of the cases include a case as shown in FIG. 30a.

Figure 30B:
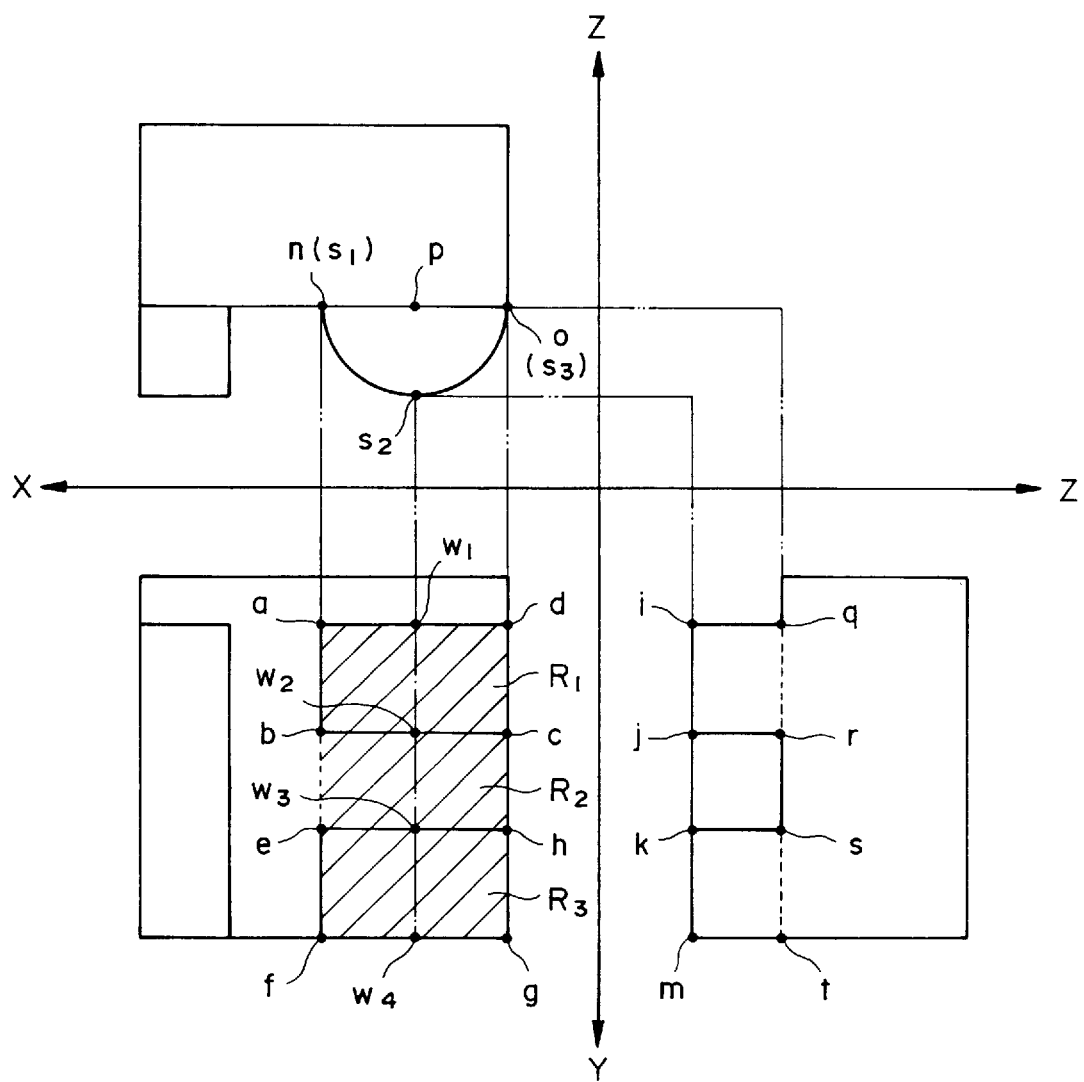

The first segment for a supplemental line and the second segment for a supplemental line are respectively a straight line segment im and straight line segments ad, bc, eh and fg with respect to a subject peculiar point s2. In this case, as shown in FIG. 30b, supplemental line areas R1, R2 and R3 are determined, to create supplemental segments w1w2, w2w3 and w3w4. However, there exists no side face (cylindrical face) of a circular cylinder, whereby a supplemental segment w2w3 is an unnecessary supplemental segment.

The auxiliary knowledge is knowledge for preventing an unnecessary supplemental segment thus created on the basis of the first segment for a supplemental line and the second segment for a supplemental segment in the basic knowledge from being created.

Figure 21:
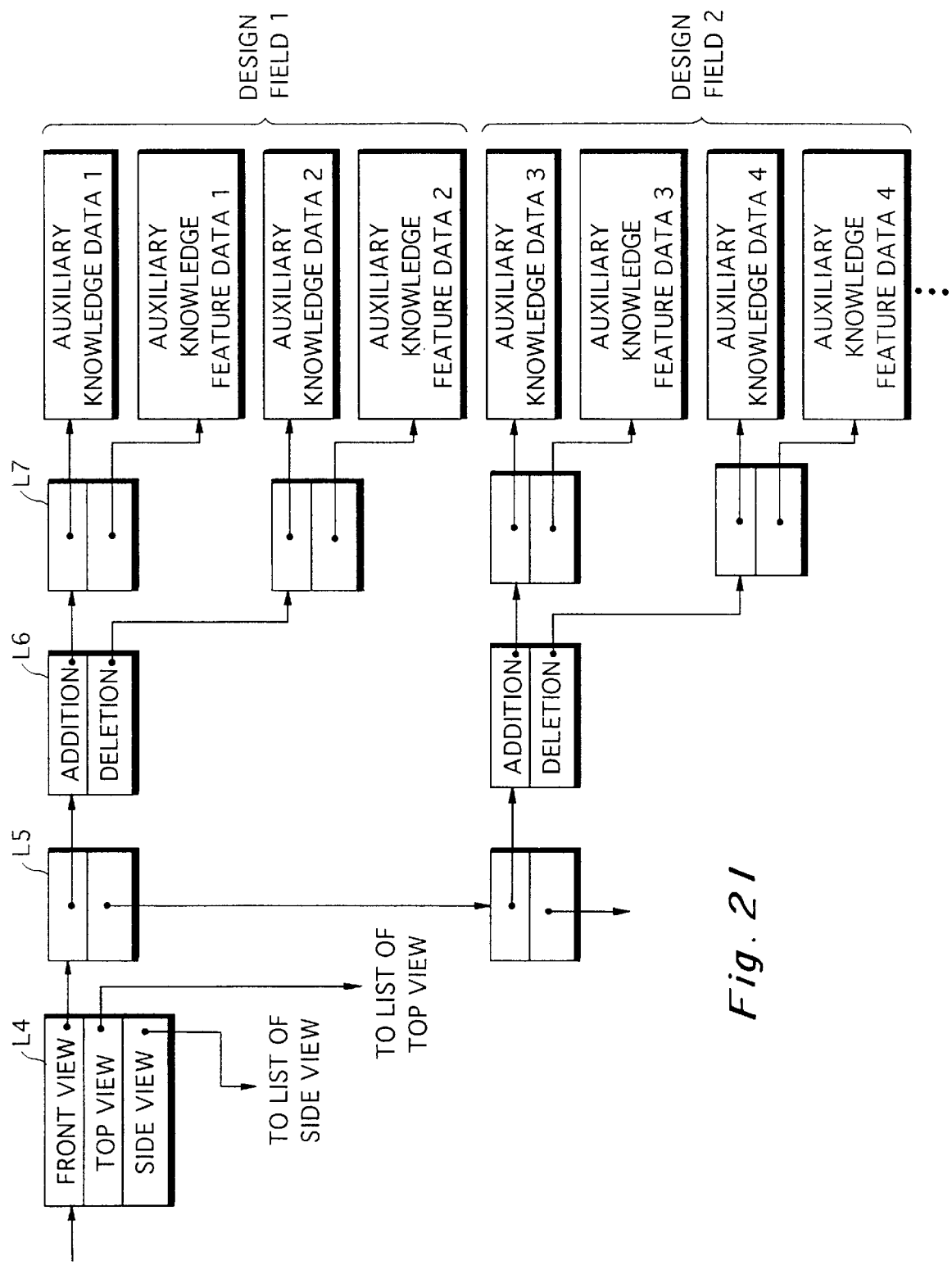
FIG. 21 illustrates the data structure of auxiliary knowledge stored in an auxiliary knowledge storage device.

FIG. 21 illustrates the data structure of the auxiliary knowledge stored in the auxiliary knowledge storage device 6.

The auxiliary knowledge is composed of a plurality of types of auxiliary knowledge data and data representing the features of the auxiliary knowledge (hereinafter referred to as feature data of the auxiliary knowledge). The auxiliary knowledge data is data for judging whether or not a supplemental segment should be created in a supplemental line area determined on the basis of the first segment for a supplemental line and the second segment for a supplemental line in the basic knowledge. The feature data of auxiliary knowledge is data used for judging which of the plurality of types of auxiliary knowledge data should be used.

All the types of auxiliary knowledge data and feature data of auxiliary knowledge are linked by pointers through intermediate lists L5 to L7 and the like from a list L4. Consequently, the computer system 1 can access all the types of auxiliary knowledge data and feature data of the auxiliary knowledge from the list L4.

The auxiliary knowledge data and the feature data of auxiliary knowledge are classified for each of a front view, a top view and a side view. A plurality of types of auxiliary knowledge data and feature data of auxiliary knowledge are provided for each view. The auxiliary knowledge data and the feature data of auxiliary knowledge are classified into data concerning addition (creation) of a supplemental segment and data concerning elimination (deletion) of a supplemental segment.

The reason why a plurality of types of auxiliary knowledge data and feature data of auxiliary knowledge are provided for each view is that the features of the front view (the size of a figure, percentages of straight line segments and circles to all primitives constituting the view, and the like) differ depending on each design field (for example, design field of ships, design field of housings of computer systems, design field of relay switches, or the like), so that it is necessary to provide for each design field auxiliary knowledge adapted to the design field. This can cope with the difference in the features of the view in each design field.

For example, auxiliary knowledge data in a design field 1 is auxiliary knowledge data concerning the design field of ships, and auxiliary knowledge data in a design field 2 is auxiliary knowledge data concerning the design field of computer systems.

Figure 22A:
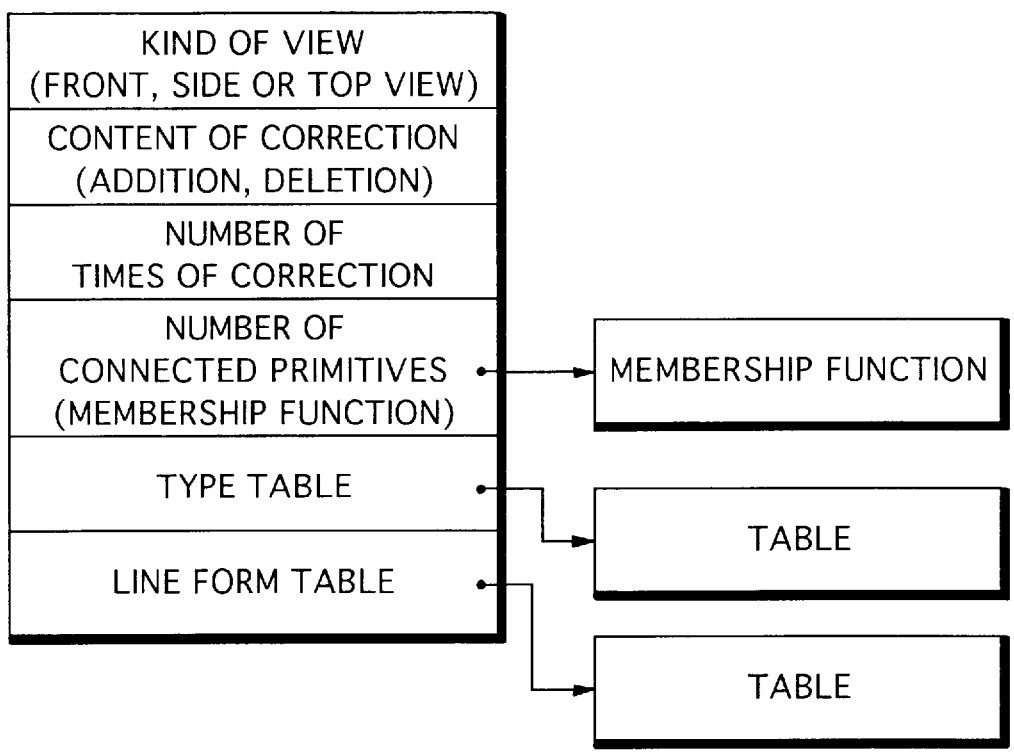
FIG. 22a illustrates the data structure of auxiliary knowledge data.
Figure 22B:
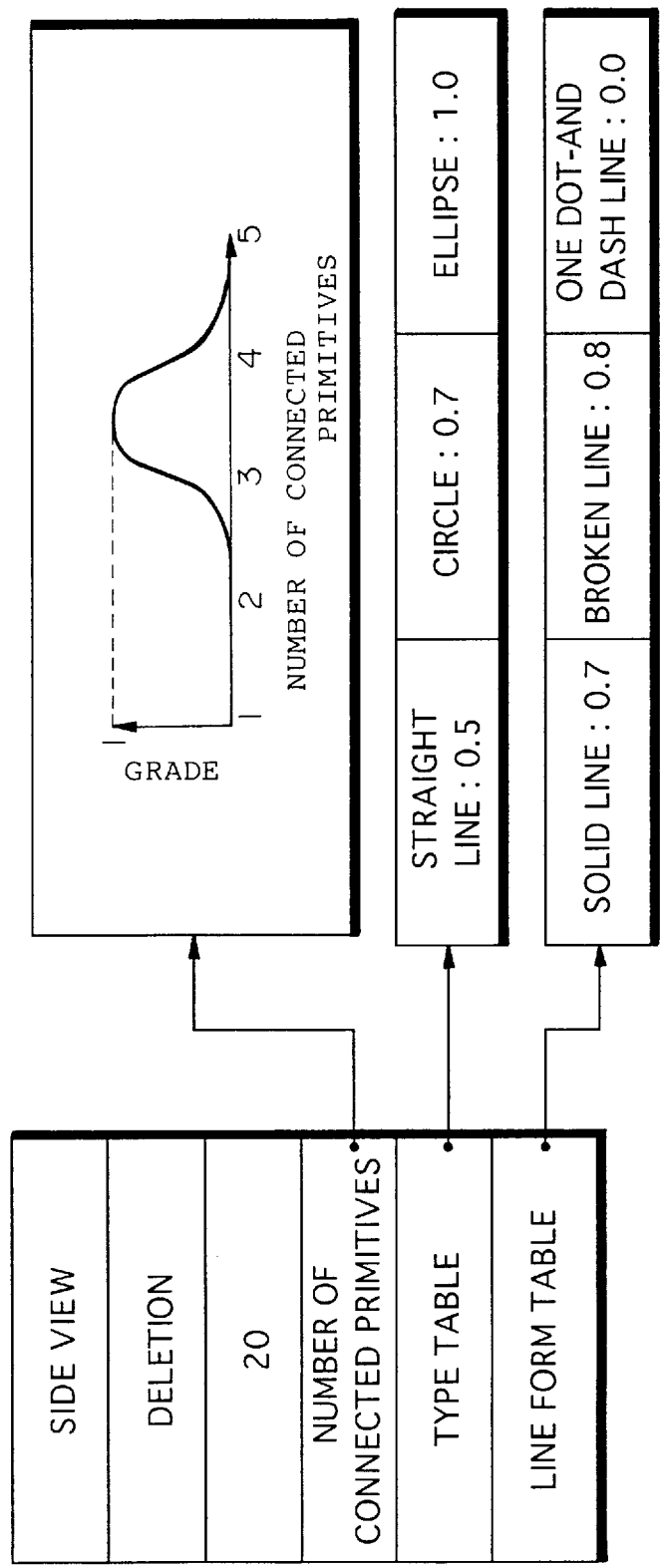
FIG. 22b illustrates an example of the auxiliary ledge data.

FIGS. 22a and 22b respectively illustrate the data structure of auxiliary knowledge data and one example of the auxiliary knowledge data.

The "kind of view" indicates which of data concerning the front view, data concerning the top view and data concerning the side view is the auxiliary knowledge data. The auxiliary knowledge data shown in FIG. 22b is auxiliary knowledge data concerning the side view.

The "content of correction" indicates which of data concerning addition (creation) of a supplemental segment and data concerning deletion (elimination) of a supplemental segment is the auxiliary knowledge data. Since the content of correction of the auxiliary knowledge data shown in FIG. 22b is elimination, the auxiliary knowledge data is data concerning elimination.

After supplemental segments are automatically created, a supplemental segment lacking for the created supplemental segments and an unnecessary supplemental segment out of the created supplemental segments may, in some cases, be respectively added (created) and deleted (eliminated) by a user, as described in detail later. The "number of times of correction" represents the number of times of addition or deletion of the supplemental segment which are thus performed by the user. When the supplemental segment is deleted, the value of the number of times of correction of the auxiliary knowledge data concerning deletion is increased by one. On the other hand, when the supplemental segment is added, the value of the number of times of correction of the auxiliary knowledge data concerning addition is increased by one. The number of times of correction (the number of times of deletion) of the auxiliary knowledge data shown in FIG. 22b is 20.

A pointer to a membership function representing the relationship between the number of primitives which are connected to the supplemental segment corrected (added or deleted) and the degree of membership related thereto (a membership function as shown in FIG. 22b, for example) is stored in a location of the "number of connected primitives".

A pointer to a table representing the relationships between the types (a straight line, a circle and an ellipse) of primitives which are connected (or have been connected) to, when the created supplemental segment is corrected (added or deleted), the corrected supplemental segment, and the degrees of membership related thereto (letting $\alpha$, $\beta$ and $\gamma$ respectively be the degrees of membership related to the straight line, the circle and the ellipse) is stored in a location of a "type table".

In an example shown in FIG. 22b, the degrees of membership related to the straight line, the circle and the ellipse are respectively 0.5, 0.7 and 1.0. This means that in a case where the supplemental segments automatically created are connected to the straight line segment, supplemental segments satisfying $\alpha$=0.5 (50%) out of the supplemental segments are deleted by the user (because the auxiliary knowledge data is related to deletion). This further means that supplemental segments satisfying $\beta$=0.7 (70%) out of the supplemental segments connected to the circle are deleted, and supplemental segments satisfying $\gamma$=1 (100%) (all) out of the supplemental segments connected to the ellipse are deleted.

$\alpha$, $\beta$ and $\gamma$ are respectively found on the basis of the following equations.

[Equations for calculating $\alpha$, $\beta$ and $\gamma$ in deletion of supplemental segments]

$\alpha$=(the number of deleted supplemental segments out of the supplemental segments connected to the straight line) / (the number of supplemental segments connected to the straight line) (1)

$\beta$=(the number of deleted supplemental segments out of the supplemental segments connected to the circle) / (the number of supplemental segments connected to the circle) (2)

$\gamma$=(the number of deleted supplemental segments out of the supplemental segments connected to the ellipse) / (the number of supplemental segments connected to the ellipse) (3)

[Equations for calculating $\alpha$, $\beta$ and $\gamma$ in addition of Supplemental Segments]

$\alpha$=(the number of added supplemental segments which are connected the straight line) / (the number of added supplemental segments) (4)

$\beta$=(the number of added supplemental segments which are connected to the circle) / (the number of added supplemental segments) (5)

$\gamma$=(the number of added supplemental segments which are connected to the ellipse) / (the number of added supplemental segments) (6)

In the foregoing equations, the value of the equation is zero when the value of the denominator is zero.

A pointer to a table representing the relationships between the line forms (a solid line, a broken line, and a one dot-and-dash line) of primitives which are connected (or have been connected) to, when the created supplemental segment is corrected (added or eliminated), the corrected supplemental segment and the degrees of membership related thereto (letting $\delta$, $\epsilon$ and $\zeta$ respectively be the degrees of conformity related to the solid line, the broken line and the one dot-and-dash line) is stored in a location of a "line form table".

In an example shown in FIG. 22b, the degrees of conformity related to the solid line, the broken line and the one dot-and-dash line are respectively 0.7, 0.8 and 0.0. This means that in a case where the supplemental segments automatically created have been connected to the solid line, supplemental segments satisfying $\delta$=0.7 (70%) out of the connected supplemental segments are deleted by the user. This further means that supplemental segments satisfying $\epsilon$=0.8 (80%) out of the supplemental segments connected to the broken line are deleted by the user, and supplemental segments satisfying $\zeta$=0 (0%) out of the supplemental segments connected to the one dot-and-dash line are deleted, that is, no supplemental segments are deleted or no supplemental segments to be connected to the one dot-and-dash line are created.

$\delta$, $\epsilon$, and $\zeta$ are respectively found on the basis of the following equations.

[Equations for calculating $\delta$, $\epsilon$ and $\zeta$ in deletion of Supplemental Segments]

$\delta$=(the number of deleted supplemental segments out of the supplemental segments connected to the solid line) / (the number of supplemental segments connected to the solid line) (7)

$\epsilon$=(the number of deleted supplemental segments out of the supplemental segments connected to the broken line) / (the number of supplemental segments connected to the broken line) (8)

$\zeta$=(the number of deleted supplemental segments out of the supplemental segments connected to the one dot-and-dash line) / (the number of supplemental segments connected to the one dot-and-dash line) (9)

[Equations for calculating $\delta$, $\epsilon$ and $\zeta$ in addition of Supplemental Segments]

$\delta$=(the number of added supplemental segments which are connected to the solid line) / (the number of added supplemental segments) (10)

$\epsilon$=(the number of added supplemental segments which are connected to the broken line) / (the number of added supplemental segments) (11)

$\zeta$=(the number of added supplemental segments which are connected to the one dot-and-dash line) / (the number of added supplemental segments) (12)

In the foregoing equations, the value of the equation is zero when the value of the denominator is zero.

A membership function related to the number of connected primitives may be placed by a table having a correspondence between the number of connected primitives and the degree of membership related thereto. Alternatively, the type table and the line form table may be represented by membership functions.

The membership function related to the number of connected primitives, the type table and the line form table in the auxiliary knowledge data quantitatively represent the features of an end point of the corrected supplemental segment. Consequently, the degrees of membership related to the number of primitives connected to a portion (an end point) where a supplemental segment is to be created in a supplemental line area, the type of the primitives connected to the end point, and the line form of the primitives are respectively found by using the membership function and the tables, thereby to make it possible to quantitatively judge whether or not the supplemental segment should be created in the portion.

In the auxiliary knowledge data, the other features (the number of primitives included in a view (a membership function representing the relationship between the number of primitives and the degree of membership related thereto, for example)) can be also used in addition to or in place of the number of connected primitives, the type and the line form.

Figure 23A:
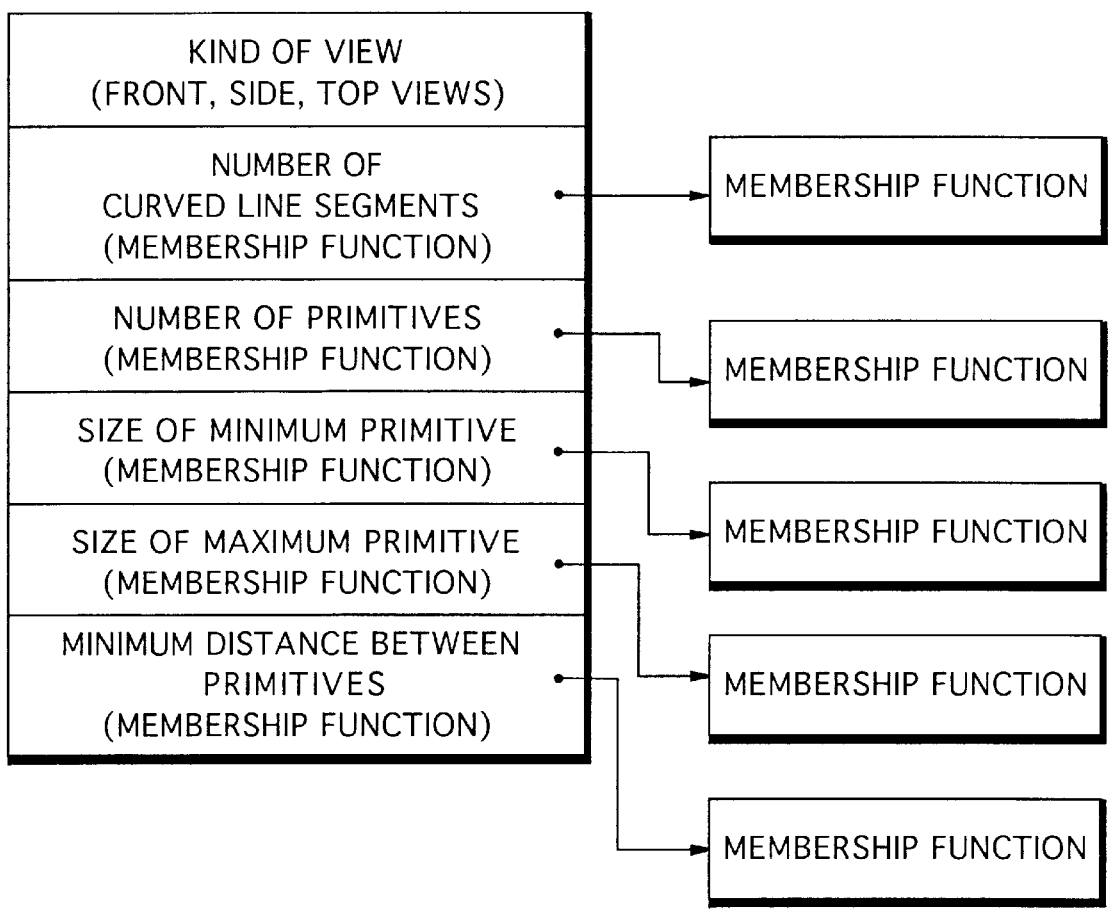
FIG. 23a illustrates the data structure of feature data of auxiliary knowledge.
Figure 23B:
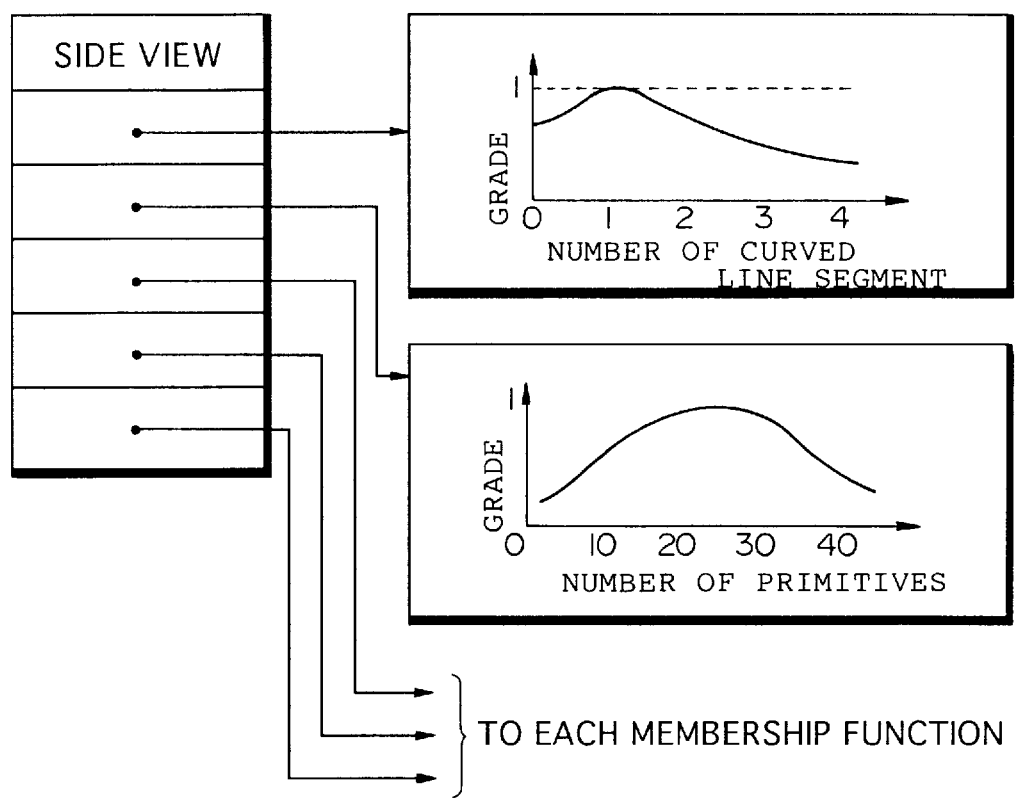
FIG. 23b illustrates an example of the feature data of auxiliary knowledge.
Figure 25:
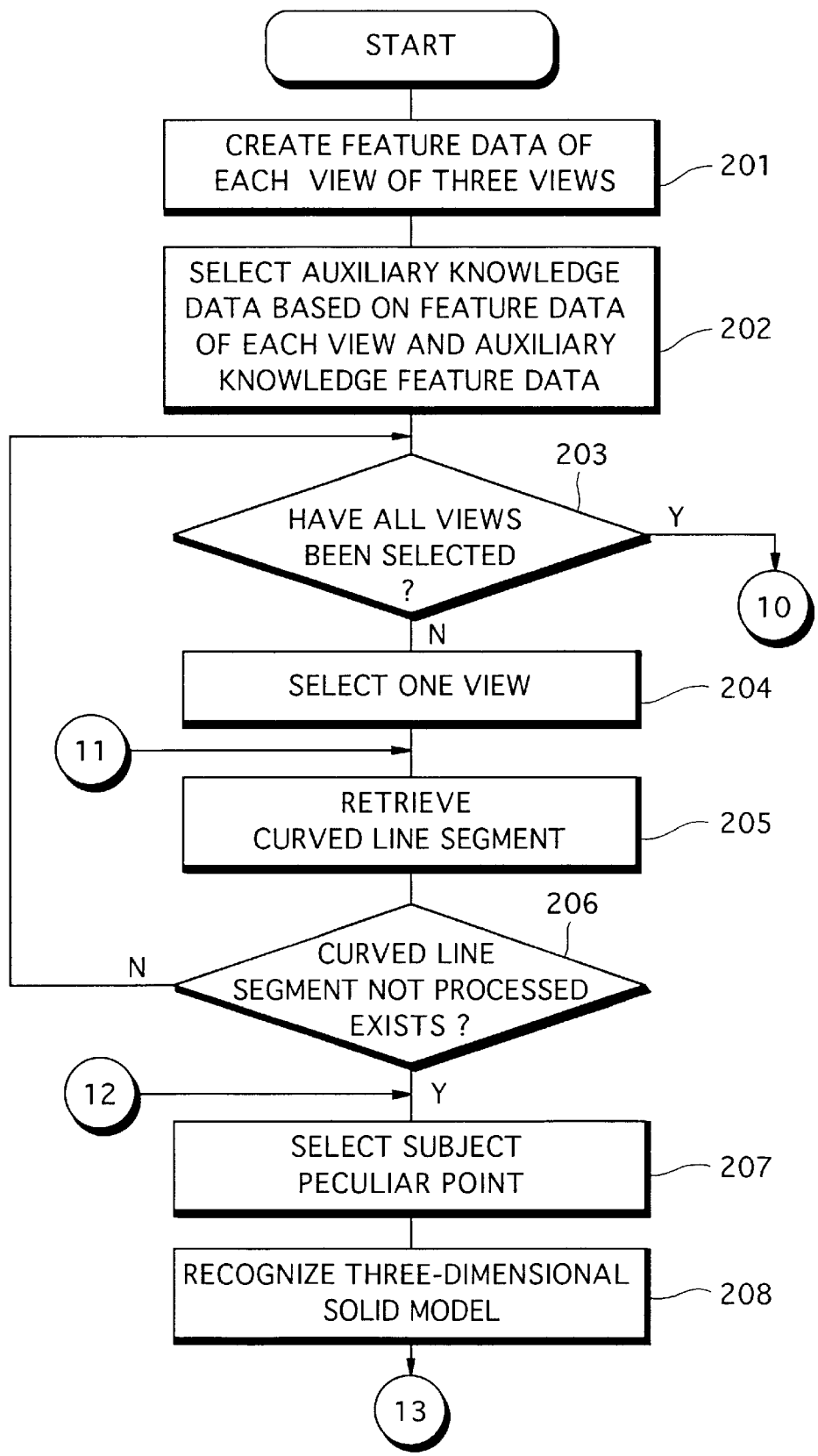
FIGS. 25 to 29 are flow charts showing the flow of processing in a three-dimensional solid model restoring apparatus in the second embodiment.
Figure 26:
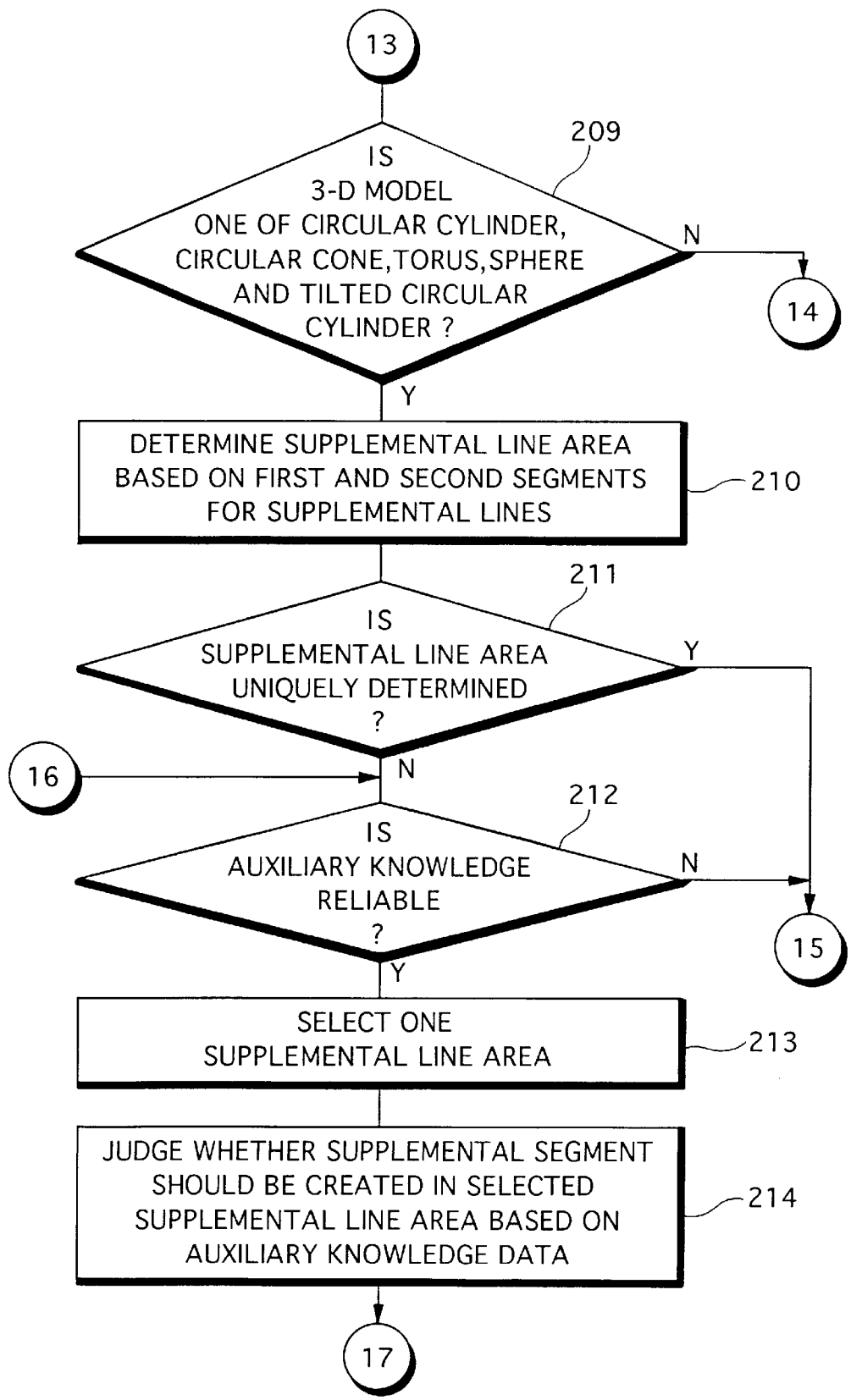
Figure 27:
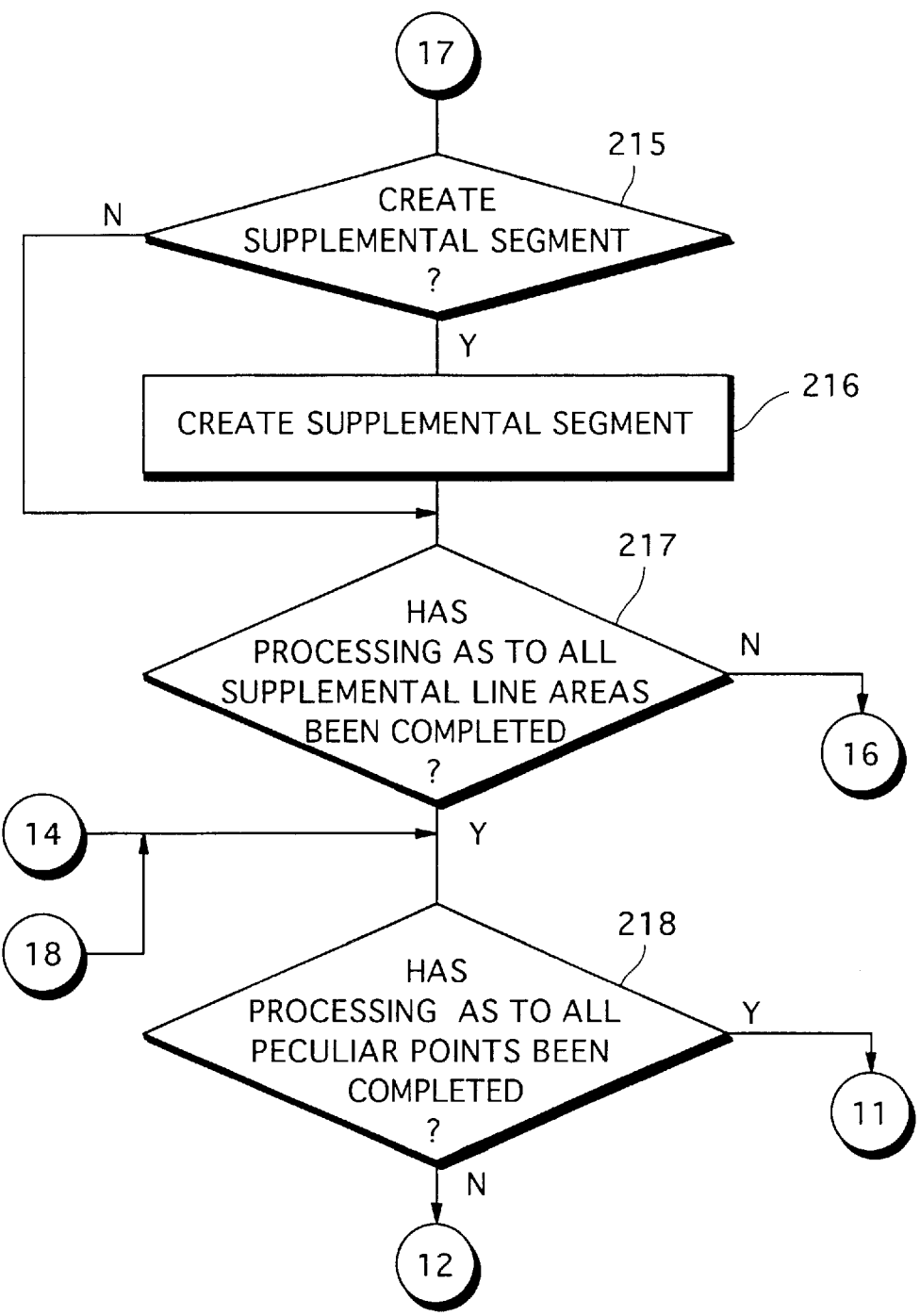
Figure 28:
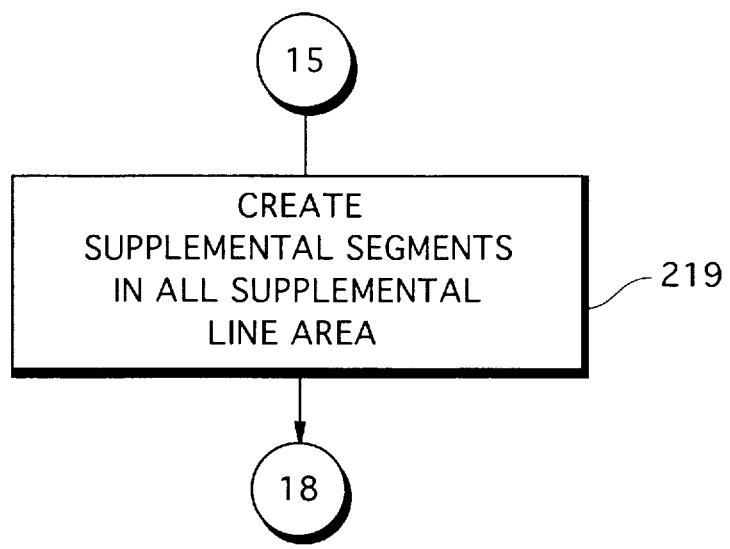
Figure 29:
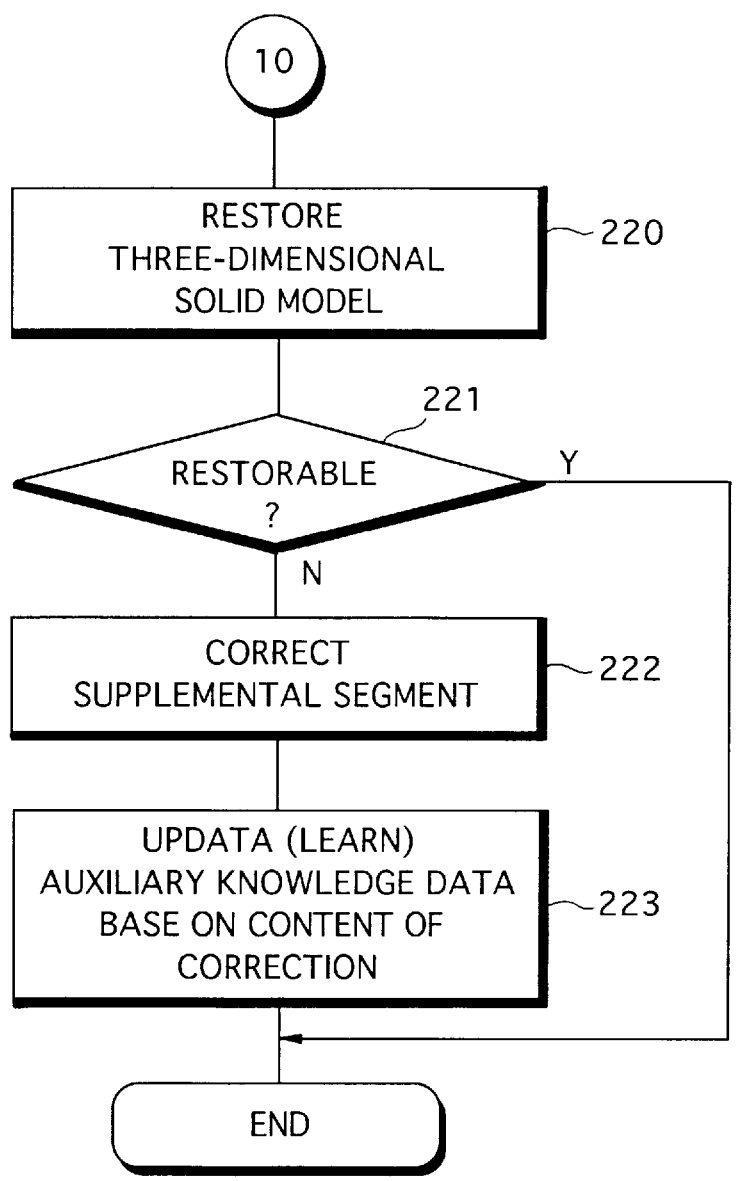

FIG. 23a illustrates the data structure of feature data of auxiliary knowledge. FIG. 23b illustrates one example of the feature data of auxiliary knowledge.

The "kind of view" is the same as the "kind of view" in the above described auxiliary knowledge data. The feature data of auxiliary knowledge shown in FIG. 23b is feature data of auxiliary knowledge concerning the side view because the "kind of view" is the side view.

A pointer to a membership function (a membership function shown in FIG. 23b, for example) representing the relationship between the number of curved line segments and the degree of membership related thereto is stored in a location of the "number of curved line segments". The "number of curved line segments" is the number of curved line segments (circles (arcs) and ellipses (elliptic arcs)) included in the view.

A pointer to a membership function (a membership function shown in FIG. 23b, for example) representing the relationship between the number of primitives included in the view and the degree of membership related thereto is stored in a location of the "number of primitives". The "number of primitives" is the number of primitives included in the view.

A pointer to a membership function representing the relationship between the size of the minimum primitive included in the view and the degree of membership related thereto and a pointer to a membership function representing the relationship between the size of the maximum primitive included in the view and the degree of membership related thereto are respectively stored in locations of the "size of minimum primitive" and the "size of maximum primitive".

The "size of primitive" in the "size of minimum primitive" and the "size of maximum primitive" is, if the primitive is a straight line segment, a circle (a curved line segment) and an ellipse (a curved line segment), the length of the straight line segment, the radius of the circle, and the smaller one of the first radius and the second radius of the ellipse, respectively. The "size of minimum primitive" is the minimum size out of the sizes of the primitives included in the view, and the "size of maximum primitive" is the maximum size out of the sizes of the primitives included in the view.

A pointer to a membership function representing the relationship between the minimum distance between the primitives on the view and the degree of membership related thereto is stored in a location of the "minimum distance between primitives". The "minimum distance between primitives" is the minimum distance out of the distances between the primitives. The "distance between primitives" means the distance between two parallel straight lines or the absolute value of the difference between the radii of two concentric circles.

The number of curved line segments, the number of primitives, and the like represent the features of the view. Consequently, it is possible to find the degree of membership related to the number of curved line segments included in each of views constituting a set of three orthographic views, the degree of membership related to the number of primitives, and the like on the basis of the feature data of auxiliary knowledge. It can be considered that the feature data of auxiliary knowledge in which the average value of the degrees of membership is large is feature data of auxiliary knowledge better adapted to the view, as described in detail later.

2. 2 Processing in a three-dimensional solid model restoring apparatus

FIGS. 25 to 29 are flow charts showing the flow of processing in a three-dimensional solid model restoring apparatus in a second embodiment.

Data representing the features of each of the three views (hereinafter referred to as "view feature data") is first created (step 201). The view feature data is illustrated in FIG. 24a.

The "kind of view" is the same as that in the above described feature data of auxiliary knowledge. The "number of curved line segments", the "number of primitives", the "size of minimum primitive", the "size of maximum primitive" and the "minimum distance between primitives" are also respectively the same as those in the above described feature data of auxiliary knowledge.

FIG. 24b illustrates view feature data concerning the side view out of the three views shown in FIG. 30b. The number of curved line segments is zero, the number of primitives is 11, the size of the minimum primitive is 20, the size of the maximum primitive is 160, and the minimum distance between the primitives is 20.

When view feature data concerning each of the views is created, auxiliary knowledge data is selected on the basis of the view feature data (step 202). One of a plurality of auxiliary knowledge data concerning the front view is selected on the basis of view feature data concerning the front view. Further, one of a plurality of auxiliary knowledge data concerning the top view and one of a plurality of auxiliary knowledge data concerning the side view are respectively selected on the basis of view feature data concerning the top view and view feature data concerning the side view.

In selecting the auxiliary knowledge data concerning the front view, the view feature data concerning the front view and the feature data of auxiliary knowledge concerning the front view are used. The view feature data concerning the side view and the feature data of auxiliary knowledge concerning the side view are used in selecting the auxiliary knowledge data concerning the side view, and the view feature data concerning the top view and the feature data of auxiliary knowledge concerning the top view are used in selecting the auxiliary knowledge data concerning the top view.

For example, in selecting the auxiliary knowledge data concerning the side view, all of a plurality of feature data of auxiliary knowledge concerning the side view (see FIG. 21) are read out of the auxiliary knowledge storage device 6. Subsequently, the degree of membership related to the "number of curved line segments" in the view feature data is found on the basis of each of membership functions related to the "number of curved line segments" in the plurality of feature data of auxiliary knowledge read out. For example, when the number of curved line segments is zero as shown in FIG. 24b, "zero" is inputted to the membership function in each of the feature data of auxiliary knowledge, and the degree of membership related thereto is found. One example of the found degree of membership is illustrated in FIG. 24c. The degree of membership related to the number of curved line segments in feature data of auxiliary knowledge 1 is 0.8, and the degree of membership related to the number of curved line segments in feature data of auxiliary knowledge 2 is 0.2.

Similarly, the degree of membership related to the "number of primitives", the degree of membership related to the "size of minimum primitive", the degree of membership related to the "size of maximum primitive", and the degree of membership related to the "minimum distance between primitives" in the view feature data are found on the basis of membership functions respectively corresponding thereto (see FIG. 24c).

Subsequently, the average value of the found degrees of membership is found for each feature data of auxiliary knowledge. In FIG. 24c, the average value of the degrees of membership in the feature data of auxiliary knowledge 1 is 0.64, and the average value of the degrees of membership in the feature data of auxiliary knowledge 2 is 0.4.

Subsequently, feature data of auxiliary knowledge having the maximum average value of the degrees of membership is selected. The reason why feature data of auxiliary knowledge having the maximum average value of the degrees of membership is selected is that it is considered that feature data of auxiliary knowledge having the large average value of the degrees of membership has features close to the features of the view to be processed.

Auxiliary knowledge data paired with the selected feature data of auxiliary knowledge is selected. For example, when the average value of the degrees of membership in the feature data of auxiliary knowledge 1 is the maximum, the feature data of auxiliary knowledge 1 is selected, and auxiliary knowledge data 1 (see FIG. 21) paired with the feature data of auxiliary knowledge 1 is selected.

If the number of feature data of auxiliary knowledge having the same maximum average value is two or more, any one of them is selected.

It is possible to use methods such as a method of selecting feature data of auxiliary knowledge having the maximum degree of membership related to the "number of curved line segments", in place of selecting feature data of auxiliary knowledge on the basis of the average value of the degrees of membership.

Processing in the steps 203 to 208 is then performed. The processing is the same as the processing in the steps 101 to 106 in the first embodiment (see FIG. 4) and hence, the description thereof is not repeated.

When it is recognized that a three-dimensional solid model is any one of a circular cylinder, a circular cone, a torus, a sphere and a tilted circular cylinder (step 209), a supplemental line area is determined based on a first segment for a supplemental line and a second segment for a supplemental line in the same manner as in the first embodiment (step 210).

It is then judged whether or not there are a plurality of supplemental line areas determined (a supplemental line area is not uniquely determined) (step 211). For example, in the cases shown in FIGS. 11b and 12b in the above described first embodiment, one supplemental line area is determined, whereby it is judged in the step 211 that the answer is in the affirmative. On the front view shown in FIG. 30b, the three areas R1 to R3 are determined, whereby it is judged in the step 211 that the answer is in the negative.

If it is judged in the step 211 that the answer is in the negative, it is judged whether or not auxiliary knowledge data selected in the step 202 is reliable (step 212). It is judged whether or not the auxiliary knowledge data is reliable depending on whether or not the number of times of correction of the auxiliary knowledge data is more than a predetermined value. If the number of times of correction is not less than a predetermined value, it is judged that the auxiliary knowledge data is reliable. On the other hand, if the number of times of correction is less than a predetermined value, it is judged that the auxiliary knowledge data is not reliable. The reason for this is that the number of times of correction represents the number of times of updating (the number of times of leaning) of the auxiliary knowledge data, as described above, whereby it is considered that the larger the value of the number of times of correction is, the more reliable the data is.

If the auxiliary knowledge data is reliable (YES in step 212), it is judged whether or not a supplemental segment should be created in each of a plurality of supplemental line areas on the basis of the auxiliary knowledge data (steps 213 to 216).

One of the plurality of supplemental line areas is first selected (step 213).

It is then judged based on the selected auxiliary knowledge data whether or not a supplemental segment should be created in the selected supplemental line area (step 214). This judgment is made by applying the auxiliary knowledge data to the first segment for a supplemental line. If the first segment for a supplemental line is a segment existing on the side view, the auxiliary knowledge data concerning the side view is used. When the first segment for a supplemental line is a segment existing on the front view and a segment existing on the top view, the auxiliary knowledge data concerning the front view and the auxiliary knowledge data concerning the top view are respectively used.

For example, as to the supplemental line area R1 shown in FIG. 30b, the degrees of membership related to the number of connected primitives, the type and the line form with respect to both end points i and j of a portion (a segment ij) corresponding to the area R1 in a first segment for a supplemental line im are respectively found.

Primitives connected to the end point i are segments ij and iq, whereby the number of connected primitives is two with respect to the end point i. The degree of membership in this numerical value "2" is found on the basis of the membership function in the auxiliary knowledge data. Further, the type of the primitives connected to the end point i is a straight line, whereby the degree of membership related to the type is found on the basis of the type and a type table. In addition, the line form of the primitives connected to the end point i is a solid line, whereby the degree of membership related to the line form is found on the basis of the line form and a line for m table.

As to the end point j, the same processing as the processing as to the end point i is also performed. Further, as to the supplemental line area R2, the same processing is performed, respectively, with respect to the end points j and k.

Examples of the results of the processing based on the auxiliary knowledge data shown in FIG. 22b is shown with respect to the area R1 (the segment ij) and R2 (a segment jk).

[The results of the Processing as to the area R1 (the Segment ij) (the respective values represent the degrees of membership)]

end point i: the number of connected primitives=0, the type=0.5, the line form=0.7 end point j: the number of connected primitives=0.5, the type=0.5, the line form=0.7

[The results of the Processing as to the area R2 (the Segment jk) (the respective values represent the degrees of membership)]

end point j: the number of connected primitives=0.5, the type=0.5, the line form=0.7 end point k : the number of connected primitives=0.7, the type=0.5, the line form=0.7

If a plurality of primitives are connected to the end point, and the connected primitives differ in the type, the average value of the degrees of membership of every types is found. For example, if a straight line and a curved line are connected to the end point j, the value of the degree of membership for this type becomes the average value 0.6 between 0.5 and 0.7. The average value of the degrees of membership is similarly found also in a case where primitives which differ in the line form are connected to the end point.

The average value of all the degrees of membership is then found for each supplemental line area. For example, the average value of all the degrees of membership as to the supplemental line area R1 becomes 0.48, and the average value of all the degrees of membership as to the supplemental line area R2 becomes 0.57 (both are obtained by rounding to two decimals).

Subsequently, consider a case where the average value is not less than a predetermined value (a threshold value). In this case, no supplemental segment is created in the supplemental line area when the "content of correction" of the auxiliary knowledge data is deletion, while a supplemental segment is created when the "content of correction" is addition (steps 215 and 216). On the other hand, consider a case where the average value is less than the threshold value. In this case, a supplemental segment is created in the supplemental line area when the "content of correction" of the auxiliary knowledge data is deletion, while no supplemental segment is created when the "content of correction" is addition (steps 215 and 216).

If the threshold value is set to 0.5, the average value of all the degrees of membership as to the supplemental line area R1 is not more than the threshold value. Since the used auxiliary knowledge data (see FIG. 22b) is related to elimination, a supplemental segment is created in the area R1. On the other hand, the average value of all the degrees of membership as to the supplemental line area R2 is not less than the threshold value, whereby no supplemental segment is created.

A supplemental segment is created in the supplemental line area R3 by the same processing.

When the number of supplemental line areas determined on the basis of the first segment for a supplemental line and the second segment for a supplemental line is one (a supplemental line area is uniquely determined) (YES in step 211), a supplemental segment is created in the one supplemental line area (step 219). In this case, no auxiliary knowledge data is used.

Furthermore, if the selected auxiliary knowledge data is not reliable (No in step 212), supplemental segments are created in all the plurality of supplemental line areas (step 219). Creation processing of supplemental segments is the same as that described in the first embodiment.

When creation processing of supplemental segments as to the respective supplemental line areas in each of the views has been thus completed (YES in step 203), a three-dimensional solid model is restored (step 220). When the three-dimensional solid model cannot be restored because the supplemental segment is not correctly created, or the three-dimensional solid model is not accurate, although it is restored (No in step 221), a supplemental segment is corrected (added or deleted) by the user (step 222).

Auxiliary knowledge data is then updated (learned) on the basis of the correction of the supplemental segment by the user (step 223).

The auxiliary knowledge data to be updated is the auxiliary knowledge data selected in the step 202 and auxiliary knowledge data concerning addition or deletion which is paired with the selected auxiliary knowledge data (deletion or addition). For example, when the auxiliary knowledge data 2 concerning deletion is selected in the step 202 in FIG. 21, the auxiliary knowledge data 2 concerning deletion and auxiliary knowledge data 1 concerning addition which is paired with the auxiliary knowledge data 2 are objects to be updated.

When the user deletes the supplemental segment, the auxiliary knowledge data concerning deletion is updated. When the user adds the supplemental segment, the auxiliary knowledge data concerning addition is updated.

In the updating, the value of the number of times of correction in the auxiliary knowledge data is increased by one. In addition, the type table and the line form table in the auxiliary knowledge are respectively changed on the basis of the forgoing equations (1) to (6) and the foregoing equations (7) to (12). Further, the membership function related to the number of connected primitives in the auxiliary knowledge data is changed into such a membership function that the degree of membership related to the number of the other primitives is normalized so that the degree of membership related to the "number of primitives" connected to the supplemental segment corrected (added or eliminated) whose value is maximum is one.

When the auxiliary knowledge data has been updated, the processing is terminated. When the three-dimensional solid model is correctly restored (YES in step 221), the processing is also terminated.

If only one auxiliary knowledge data is stored in the auxiliary knowledge storage device 6, the creation of the view feature data in the step 201 and the selection of the auxiliary knowledge data in the step 202 are not performed. It is judged whether or not a supplemental segment should be created in a supplemental line area on the basis of the one auxiliary knowledge data (step 214).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for automatically creating a supplemental segment in two-dimensional drawings, comprising:

drawing data storing means for storing two-dimensional drawing data concerning at least three views depicted based on orthogonal projection;

knowledge storing means for storing knowledge for recognizing a three-dimensional model restored on the basis of said two-dimensional drawing data;

recognizing means for applying the knowledge stored in said knowledge storing means to the two-dimensional drawing data stored in said drawing data storing means, to recognize the three-dimensional model restored on the basis of the two-dimensional drawing data;

supplemental segment area determining means for determining an area where the supplemental segment is to be created in the two-dimensional drawings on the basis of the three-dimensional model recognized by said recognizing means;

end point determining means for determining at least two end points of the supplemental segment to be created in the area determined by said supplemental segment area determining means; and supplemental segment creating means for creating the supplemental segment connecting the end points determined by said end point determining means.

2. The apparatus according to claim 1, wherein the three-dimensional model recognized by said recognizing means includes a circular cylinder, a circular cone, a sphere, a torus, and a tilted circular cylinder.

3. The apparatus according to claim 1, wherein said supplemental segment includes a straight line segment, a circle, an arc, an ellipse, and an elliptic arc.

4. The apparatus according to claims 1, further comprising:

auxiliary knowledge storing means for storing auxiliary knowledge for judging whether or not the supplemental segment should be created between the end points determined by said end points determining means, and judging means for judging whether or not the supplemental segment should be created on the basis of said auxiliary knowledge, said supplemental segment creating means creating the supplemental segment when said judging means judges that the supplemental segment should be created.

5. The apparatus according to claim 4, further comprising:

said auxiliary knowledge storing means storing a plurality of types of auxiliary knowledge, drawing data feature extracting means for extracting the features of the two-dimensional drawing data, and auxiliary knowledge selecting means for selecting a suitable type of auxiliary knowledge out of the plurality of types of auxiliary knowledge stored in said auxiliary knowledge storing means on the basis of said extracted features of the two-dimensional drawing data.

6. The apparatus according to claims 1, further comprising:

command inputting means for inputting a command to eliminate an unnecessary supplemental segment out of created supplemental segments or a command to create a supplemental segment lacking for the created supplemental segments, and eliminating/creating means for eliminating or creating the supplemental segment in the two-dimensional drawing data on the basis of the command inputted by said command inputting means.

7. The apparatus according to claim 4, further comprising:

command inputting means for inputting a command to eliminate an unnecessary supplemental segment out of created supplemental segments or a command to create a supplemental segment lacking for the created supplemental segments, and updating means for updating said auxiliary knowledge on the basis of the command from said command inputting means.

8. The apparatus according to claims 1, wherein said apparatus for automatically creating a supplemental segment in two-dimensional drawings is constituted by a computer system.

9. A method of automatically creating a supplemental segment in two-dimensional drawings, comprising the steps of:

previously storing in a drawing data storage device two-dimensional drawing data concerning at least three views depicted based on orthogonal projection;

previously storing in a knowledge storage device knowledge for recognizing a three-dimensional model restored on the basis of said two-dimensional drawing data;

applying the knowledge stored in said knowledge storage device to the two-dimensional drawing data stored in said drawing data storage device, to recognize the three-dimensional model restored on the basis of the two-dimensional drawing data;

determining an area where the supplemental segment is to be created in the two-dimensional drawings on the basis of said recognized three-dimensional model;

determining at least two end points of the supplemental segment to be created in said determined area; and creating the supplemental segment connecting said determined end points.

10. The method according to claim 9, wherein said recognized three-dimensional model includes a circular cylinder, a circular cone, a sphere, a torus, and a tilted circular cylinder.

11. The method according to claim 9, wherein said supplemental segment comprises a straight line segment, a circle, an arc, an ellipse, and an elliptic arc.

12. The method according to claims 9, further comprising the steps of:

previously storing in an auxiliary knowledge storage device auxiliary knowledge for judging whether or not the supplemental segment should be created between said determined end points, and judging whether or not the supplemental segment should be created on the basis of said auxiliary knowledge, and creating said supplemental segment when it is judged that the supplemental segment should be created.

13. The method according to claim 12, further comprising the steps of:

previously storing in said auxiliary knowledge storage device a plurality of types of auxiliary knowledge, extracting the features of the two-dimensional drawing data, and selecting a suitable type of auxiliary knowledge out of the plurality of types of auxiliary knowledge stored in said auxiliary knowledge storage device on the basis of said extracted features of the two-dimensional drawing data.

14. The method according to claims 9, further comprising the step of:

eliminating or creating, on the basis of a command to eliminate an unnecessary supplemental segment out of created supplemental segments or a command to create a supplemental segment lacking for the created supplemental segments which is issued from the exterior, the supplemental segment in the two-dimensional drawing data.

15. The method according to claim 12, further comprising the step of:

updating said auxiliary knowledge on the basis of a command to eliminate an unnecessary supplemental segment out of created supplemental segments or a command to create a supplemental segment lacking for the created supplemental segments which is issued from the exterior.

16. The method according to any one of claims 9, wherein said method of automatically creating a supplemental segment in two-dimensional drawings is carried out by a computer system.

17. A CAD/CAM system having a function of automatically creating a supplemental segment in two-dimensional drawings, comprising:

drawing data storing means for storing two-dimensional drawing data concerning three views depicted based on orthogonal projection;

knowledge storing means for storing knowledge for recognizing a three-dimensional model restored on the basis of said two-dimensional drawing data;

recognizing means for applying the knowledge stored in said knowledge storing means to the two-dimensional drawing data stored in said drawing data storing means, to recognize the three-dimensional model restored on the basis of the two-dimensional drawing data;

supplemental segment area determining means for determining an area where the supplemental segment is to be created in the two-dimensional drawings on the basis of the three-dimensional model recognized by said recognizing means;

end point determining means for determining at least two end points of the supplemental segment to be created in the area determined by said supplemental segment area determining means; and supplemental segment creating means for creating the supplemental segment connecting the end points determined by said end point determining means.

18. An apparatus for automatically creating a supplemental segment for enhancing the understanding of two-dimensional drawings on two-dimensional drawing data representing a three-dimensional model, comprising:

means for detecting an area where said supplemental segment appears on said two-dimensional drawing data on the basis of the three-dimensional model; and means for determining the position where the supplemental segment is provided in the area on said two-dimensional drawing data which is detected by said detecting means and creating data representing the determined supplemental segment.

19. A method of automatically creating a supplemental segment for enhancing the understanding of two-dimensional drawings on two-dimensional drawing data representing a three-dimensional model, comprising the steps of:

detecting an area where said supplemental segment appears on said two-dimensional drawing data on the basis of the three-dimensional model; and determining the position where the supplemental segment is provided in the detected area on said two-dimensional drawing data and creating data representing the determined supplemental segment.

20. An apparatus for automatically creating a supplemental segment for enhancing the understanding of two-dimensional drawings representing a three-dimensional model on the two-dimensional drawings, comprising:

means for detecting an area where said supplemental segment appears on said two-dimensional drawings on the basis of the three-dimensional model; and means for determining the position where the supplemental segment is provided in the area on said two-dimensional drawings which is detected by said detecting means and creating the determined supplemental segment.

21. A method of automatically creating a supplemental segment for enhancing the understanding of two-dimensional drawings representing a three-dimensional model on the two-dimensional drawings, comprising the steps of:

detecting an area where said supplemental segment appears on said two-dimensional drawings on the basis of the three-dimensional model; and determining the position where the supplemental segment is provided in the detected area on said two-dimensional drawings and creating the determined supplemental segment.

22. The apparatus according to claim 20, wherein said supplemental segment includes a boundary line segment and a silhouette line segment.

* * * * *